(12) United States Patent
Henry et al.

(10) Patent No.: US 12,361,249 B2
(45) Date of Patent: Jul. 15, 2025

(54) ASSET TAG AND METHODS AND DEVICES FOR RESTOCKING AND ASSET TRACKING

(71) Applicant: INVENTOR-E LIMITED, Solihull (GB)

(72) Inventors: Dean Charles Henry, Solihull (GB); John Venter, North West Leicestershire (GB)

(73) Assignee: INVENTOR-E LIMITED, Solihull (GB)

( * ) Notice: Subject to any disclaimer, the term of this patent is extended or adjusted under 35 U.S.C. 154(b) by 0 days.

(21) Appl. No.: 18/487,178

(22) Filed: Oct. 16, 2023

(65) Prior Publication Data

US 2024/0037364 A1 Feb. 1, 2024

Related U.S. Application Data

(60) Continuation of application No. 17/160,685, filed on Jan. 28, 2021, now Pat. No. 11,847,517, which is a
(Continued)

(30) Foreign Application Priority Data

May 2, 2017 (GB) ..................................... 1707024
May 3, 2017 (GB) ..................................... 1707036

(51) Int. Cl.
*G06K 19/07* (2006.01)
*G06Q 10/087* (2023.01)
(Continued)

(52) U.S. Cl.
CPC ..... *G06K 19/0716* (2013.01); *G06K 19/0723* (2013.01); *G06Q 10/087* (2013.01);
(Continued)

(58) Field of Classification Search
CPC . G06K 19/0716; G06K 19/0723; H04W 4/35; H04W 4/029; H04W 4/80; G06Q 10/087; G08C 17/02
(Continued)

(56) References Cited

U.S. PATENT DOCUMENTS 6,151,536 A 11/2000 Arnold et al.
6,964,372 B1 11/2005 Peterson
(Continued)

FOREIGN PATENT DOCUMENTS

CN 1023394010 A 2/2012
DE 10 2015 101 058 A1 7/2015
(Continued)

OTHER PUBLICATIONS

Office Action dated Feb. 15, 2023, corresponding to Canadian Patent Application No. 3,003,836. per MPEP 609. submitted in parent U.S. Appl. No. 17/160,685.
(Continued)

*Primary Examiner* — Daniel A Hess
(74) *Attorney, Agent, or Firm* — SQUIRE PATTON BOGGS (US) LLP

(57) ABSTRACT

An asset tag adapted to be mounted to an asset. The asset tag comprises a first component encoded with a first ID unique to the asset tag, the first component having a first wireless interface and transmitting first broadcast signals via said first wireless interface over a first range, the first broadcast signals including the first ID. The asset tag further comprises a user-actuatable button. The asset tag further comprises processing circuitry, coupled to the button and to at least the first wireless interface. The processing circuitry is configured for (i) determining whether a predetermined gesture has been performed by a user using the button and (ii) if the predetermined gesture has been performed, transmitting via
(Continued)

the first wireless interface to a wireless access point a restock message, the restock message including the first ID and indicating that restocking is required of assets corresponding to the first ID.

12 Claims, 35 Drawing Sheets

Related U.S. Application Data division of application No. 15/969,447, filed on May 2, 2018, now Pat. No. 10,949,724.

(51) Int. Cl.
    *G08C 17/02*     (2006.01)
    *H04W 4/35*     (2018.01)
    *H04W 4/029*     (2018.01)
    *H04W 4/80*     (2018.01)

(52) U.S. Cl.
    CPC .............. *G08C 17/02* (2013.01); *H04W 4/35* (2018.02); *H04W 4/029* (2018.02); *H04W 4/80* (2018.02)

(58) Field of Classification Search
    USPC ........................................................ 235/385
    See application file for complete search history.

(56) References Cited

U.S. PATENT DOCUMENTS

| | | |
|---|---|---|
| 2001/0056501 A1 | 12/2001 | Law et al. |
| 2002/0070846 A1 | 6/2002 | Bastian, II et al. |
| 2004/0153207 A1 | 8/2004 | Peck |
| 2005/0043850 A1 | 2/2005 | Stevens et al. |
| 2006/0163349 A1* | 7/2006 | Neugebauer ......... G06Q 20/387 235/383 |
| 2012/0150677 A1 | 6/2012 | Shuster |
| 2015/0222740 A1 | 8/2015 | Pan et al. |
| 2015/0294518 A1 | 10/2015 | Ford |
| 2015/0332382 A1 | 11/2015 | Aso et al. |
| 2015/0348158 A1 | 12/2015 | Besser et al. |
| 2016/0071052 A1 | 3/2016 | Henry et al. |
| 2016/0104109 A1 | 4/2016 | Singel et al. |
| 2016/0105762 A1 | 4/2016 | Singh et al. |
| 2016/0132758 A1 | 5/2016 | Connolly |

FOREIGN PATENT DOCUMENTS

| | | |
|---|---|---|
| EP | 2 312 509 A1 | 4/2011 |
| EP | 3 018 080 A1 | 5/2016 |
| EP | 3 273 401 A1 | 1/2018 |
| EP | 3 285 215 A1 | 2/2018 |
| GB | 2 438 290 A | 11/2007 |
| GB | 2529906 A | 3/2016 |
| JP | 2017036644 A | 10/2015 |
| WO | 2006/000016 A1 | 1/2006 |
| WO | 2007/076095 A2 | 7/2007 |
| WO | 2010/103972 A1 | 9/2010 |
| WO | 2014004930 A1 | 1/2014 |
| WO | 2015/076952 A2 | 5/2015 |
| WO | 2016/165609 A1 | 10/2016 |
| WO | 2017062775 A1 | 4/2017 |
| WO | 2017/211708 A1 | 12/2017 |

OTHER PUBLICATIONS

Nov. 15, 2021 Examination corresponding to GB Application No. 2019781.0, per MPEP 609, submitted in parent U.S. Appl. No. 17/160,685.

Oct. 27, 2021 Examination Report corresponding to GB Application No. 2019861.0. per MPEP 609. submitted in parent U.S. Appl. No. 17/160,685.

Nov. 8, 2021 Examination Report corresponding to GB Application No. 2019950.1. per MPEP 609. submitted in parent U.S. Appl. No. 17/160,685.

Dec. 23, 2021 Office Action corresponding to European Application No. 18 020 188.1. per MPEP 609. submitted in parent U.S. Appl. No. 17/160,685.

(GLUON), 2021, "Scanning Bluetooth Low Energy beacons with Gluon Charm Down", Available from https://gluonhq.com/scanning-bluetooth-low-energy-beacons-charm/ [Acessed Dec. 17, 2021]. per MPEP 609. submitted in parent U.S. Appl. No. 17/160,685.

British Examination Report under Section 18(3), corresponding to GB Application No. GB2019950.1, dated Jan. 7, 2022. per MPEP 609. submitted in parent U.S. Appl. No. 17/160,685.

British Search Report under Section 17(8), corresponding to GB Application No. GB2019950.1, dated Jan. 25, 2022. per MPEP 609. submitted in parent U.S. Appl. No. 17/160,685.

British Combined Search and Examination Report corresponding to GB Application No. GB2019861.0, dated Feb. 1, 2021. per MPEP 609. ubmitted in parent U.S. Appl. No. 17/160,685.

British Combined Search and Examination Report corresponding to GB Application No. GB2019781.0, dated Feb. 1, 2021. per MPEP 609. submitted in parent U.S. Appl. No. 17/160,685.

British Combined Search and Examination Report corresponding to GB Application No. GB2019950.1, dated Feb. 1, 2021. per MPEP 609. submitted in parent U.S. Appl. No. 17/160,685.

British Examination Report corresponding to GB Application No. GB2019781.0, dated Jul. 2, 2021. per MPEP 609. submitted in parent U.S. Appl. No. 17/160,685.

British Combined Search and Examination Report corresponding to GB Application No. GB2019861.0, dated Aug. 19, 2021. per MPEP 609. submitted in parent U.S. Appl. No. 17/160,685.

Summons to attend oral proceedings pursuant to Rule 115(1) EPC to European Patent Application 18020188.1, dated Jul. 20, 2021. per MPEP 609. submitted in parent U.S. Appl. No. 17/160,685.

British Examination Report corresponding to GB Application No. GB2019861.0, dated Jul. 8, 2021. per MPEP 609. submitted in parent U.S. Appl. No. 17/160,685.

British Examination Report corresponding to GB Application No. GB2019950.1, dated Jul. 2, 2021. per MPEP 609. submitted in parent U.S. Appl. No. 17/160,685.

Examination Report under Section 18(3) dated Jul. 16, 2020 corresponding to GB Application No. GB1807263.7. per MPEP 609. submitted in parent U.S. Appl. No. 17/160,685.

European Office Action corresponding to EP Appln. No. 18 020 188.1, dated Jan. 7, 2020. per MPEP 609. submitted in parent U.S. Appl. No. 17/160,685.

Anonymous: "Puck.js—Espuino", Nov. 29, 2016, XP055643097, 12 pages. per MPEP 609. submitted in parent U.S. Appl. No. 17/160,685.

Great Britain Examination Report issued in corresponding Great Britain Patent Application No. GB1807263.7 on May 15, 2020. per MPEP 609. submitted in parent U.S. Appl. No. 17/160,685.

Examination Report under Section 18(3) dated Dec. 4, 2019 corresponding to GB Application No. GB1807263.7. per MPEP 609. submitted in parent U.S. Appl. No. 17/160,685.

Brittany Sauser, Sep. 10, 2007, "A Helmet That Detects Hard Hits," MIT Technology Review [online], available from: https://www.technologyreview.com/s/408643/a-helmet-that-detects-hard-hits/. per MPEP 609. submitted in parent U.S. Appl. No. 17/160,685.

Amazon, Jul. 31, 2015, "Phantomlock Bluetooth Wireless Cabinet and Drawer Lock," Amazon UK [online], Available from: https://www.amazon.co.uk/Phantomlock-Bluetooth-Wireless-Cabinet-Lock/dp/B0134PAH04. per MPEP 609. submitted in parent U.S. Appl. No. 17/160,685.

Jinhe Want et al., "Dynamic Material Picking Schedule and Communication Protocols for Warehouse Picking System" 2009 ISECS International Colloquium on Computing, Communication, Control and Management, pp. 221-224. per MPEP 609. submitted in parent U.S. Appl. No. 17/160,685.

European Search Report for EP Appln No. 18020188.1, dated Oct. 9, 2018. per MPEP 609. submitted in parent U.S. Appl. No. 17/160,685.

(56) References Cited

OTHER PUBLICATIONS

GB Combined Search and Exam Report for GB Appln. No. GB1807263.7, dated Oct. 23, 2018. per MPEP 609. submitted in parent U.S. Appl. No. 17/160,685.

Laszlo Kajdocsi et al., "A Great Potential for Using Mesh Networks in indoor Navigation", IEEE 14th International Symposium and Informatics; Aug. 29-31, 2016, pp. 187-192. per MPEP 609. submitted in parent U.S. Appl. No. 17/160,685.

Andrew Ong, "Homebuilt: How to Assemble an Electronic Door Lock", IEEE Potentials, Sep./Oct. 2016, pp. 43-47. per MPEP 609. submitted in parent U.S. Appl. No. 17/160,685.

European Search Report for EP Appln. No. 18020188.1, dated Jan. 7, 2019. per MPEP 609. submitted in parent U.S. Appl. No. 17/160,685.

Great Britain Office Action corresponding to UK Application No. GB1807263.7, dated Nov. 17, 2020. per MPEP 609. submitted in parent U.S. Appl. No. 17/160,685.

(ACR Electronics), Mar. 2012, "ACR AquaLink 406 MHz GPS Personal Locator Beacon", Available from: https//www.acrartex.com/download-product-attachment?download_id=635 [Accessed Jan. 20, 2021]. per MPEP 609. submitted in parent U.S. Appl. No. 17/160,685.

(OROLIA), 2012, "FastFind Ranger PLB", Available from: http://www.mountainsafety.co.uk/mountainsafety/files/8487073.pdf [Accessed Jan. 20, 2021]. per MPEP 609. submitted in parent U.S. Appl. No. 17/160,685.

(RFID for Business), 2016, "Dual Frequency Active RFID Tag", Available from: http://www.rfidforbusiness.com/dual-frequency-active-rfid-tag/ [Accessed Jan. 20, 2021]. per MPEP 609. submitted in parent U.S. Appl. No. 17/160,685.

Mark Gibbs: "Hacking Amazon's Dash Button", Oct. 10, 2015, XP055326218, 4 pages. per MPEP 609. submitted in parent U.S. Appl. No. 17/160,685.

British Examination Report corresponding to GB Application No. GB1807263.7, dated May 10, 2021. per MPEP 609. submitted in parent U.S. Appl. No. 17/160,685.

\* cited by examiner

| User / PDA ID | Tag ID | | Asset ID | Description |
| --- | --- | --- | --- | --- |
| | NFC ID | BTID | | |
| Smith_J | ID007 | ID007 | BO_DRILL08 | Text text text... |
| | ID003 | ID003 | KA_WASH04 | Text text text... |
| | ID010 | ID010 | GE_WINCH91 | Text text text... |
| | ID011 | ID011 | KA_STEA72 | Text text text... |
| | ID023 | ID023 | BO_DRILL10 | Text text text... |
| | ID067 | ID067 | DR_CUTT15 | Text text text... |
| | ID014 | ID014 | ST_MILL19 | Text text text... |
| | ID009 | ID009 | ST_VACC23 | Text text text... |
| Jones_K | ID002 | ID002 | DR_CUTT11 | Text text text... |
| | ID016 | ID016 | BD_SAND15 | Text text text... |
| ... | | | | ... |
| Clarke_A | ID005 | ID005 | BO_DRILL17 | Text text text... |

FIG. 7

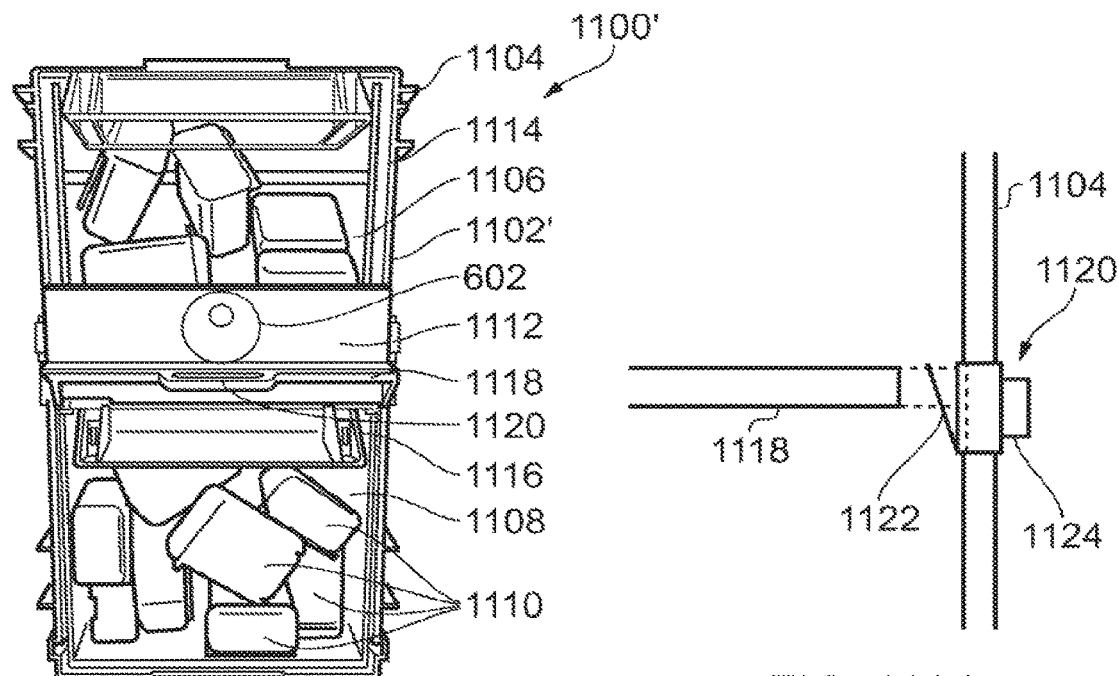
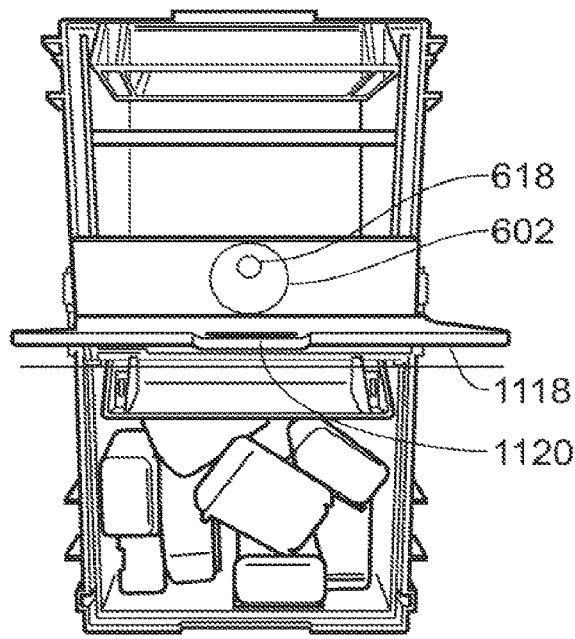
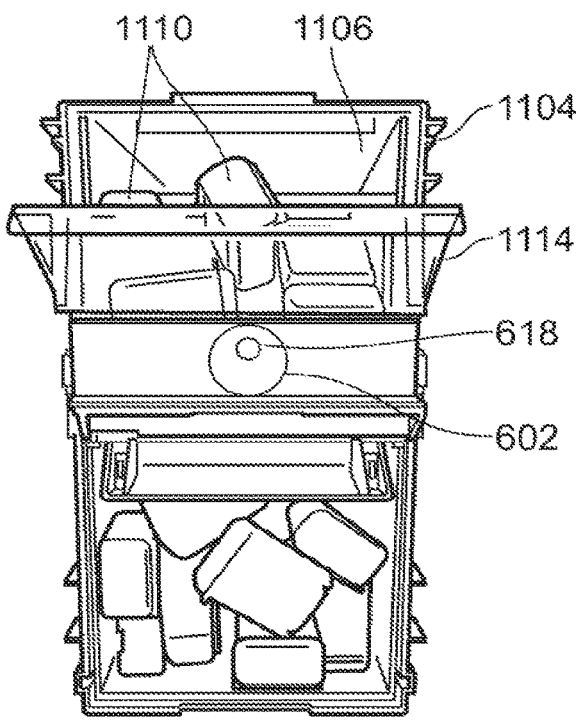
FIG. 10(a)
FIG. 10(c)
FIG. 10(b)
FIG. 10(d)

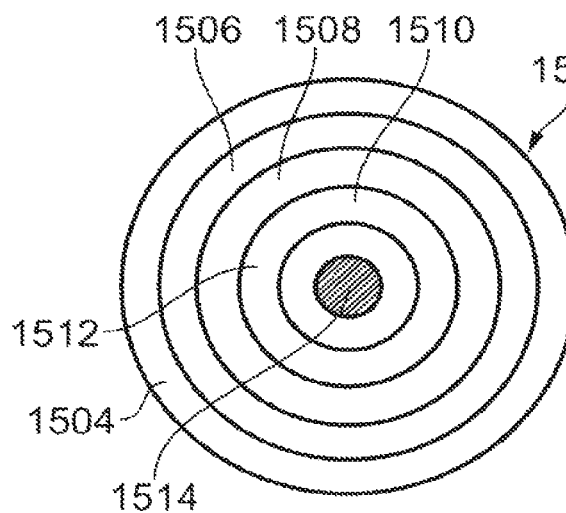
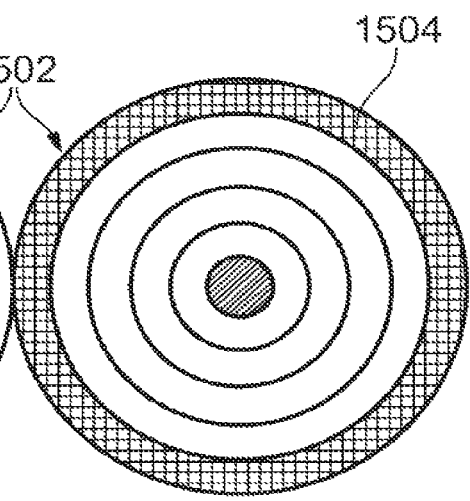
FIG. 15(a)    FIG. 15(b)
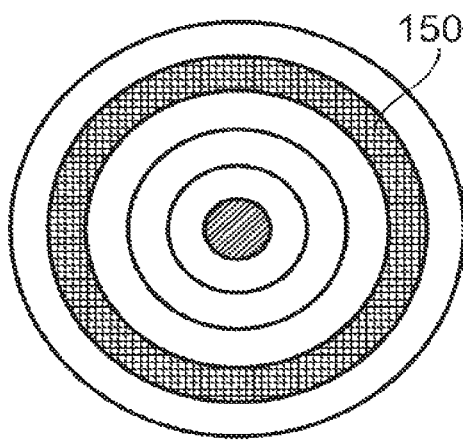
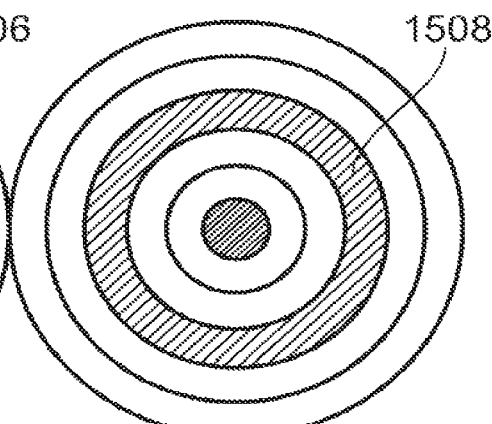
FIG. 15(c)    FIG. 15(d)
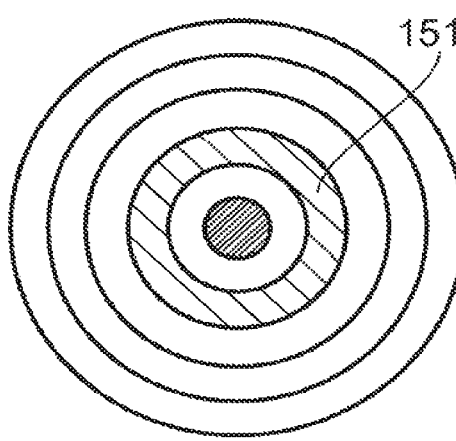
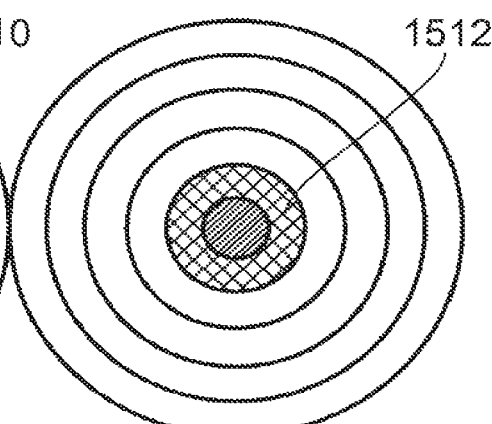
FIG. 15(e)    FIG. 15(f)

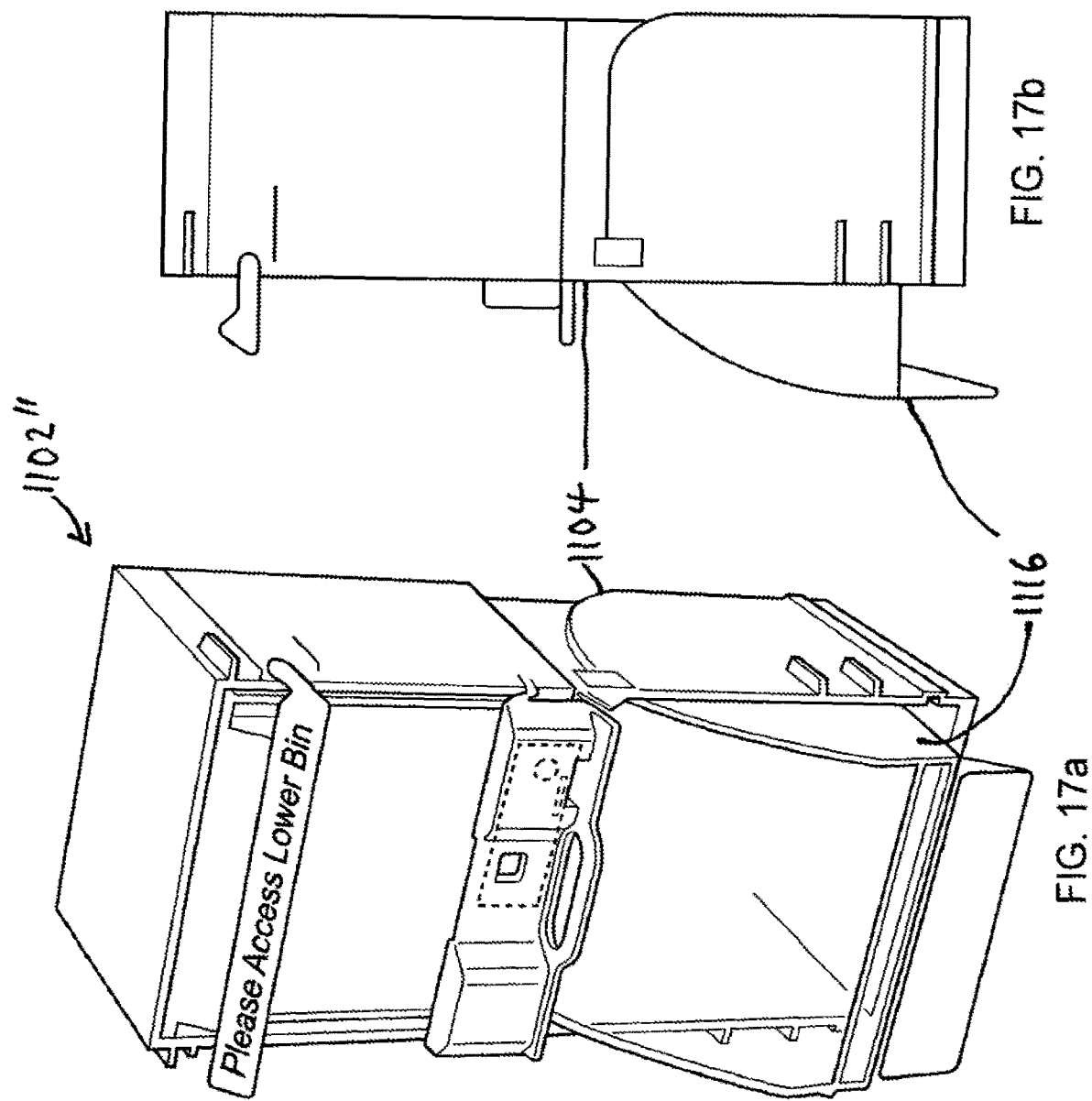

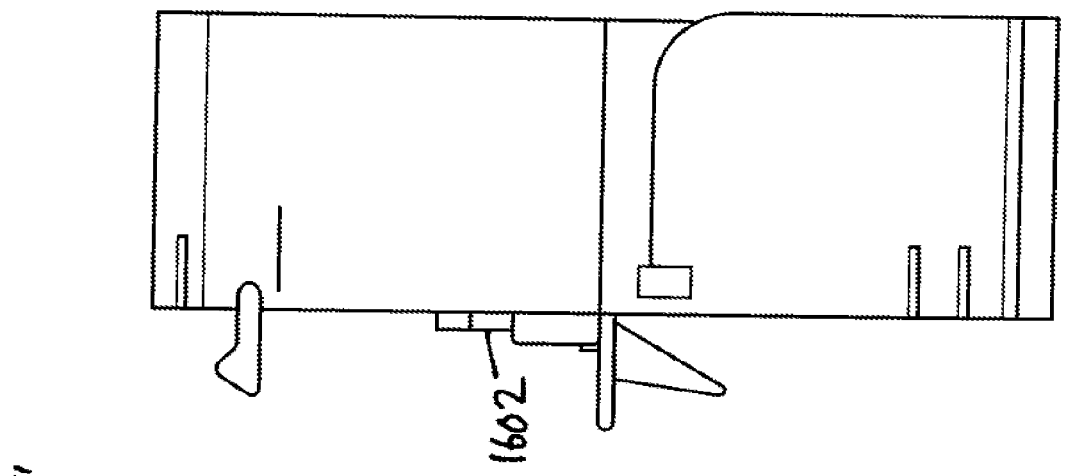
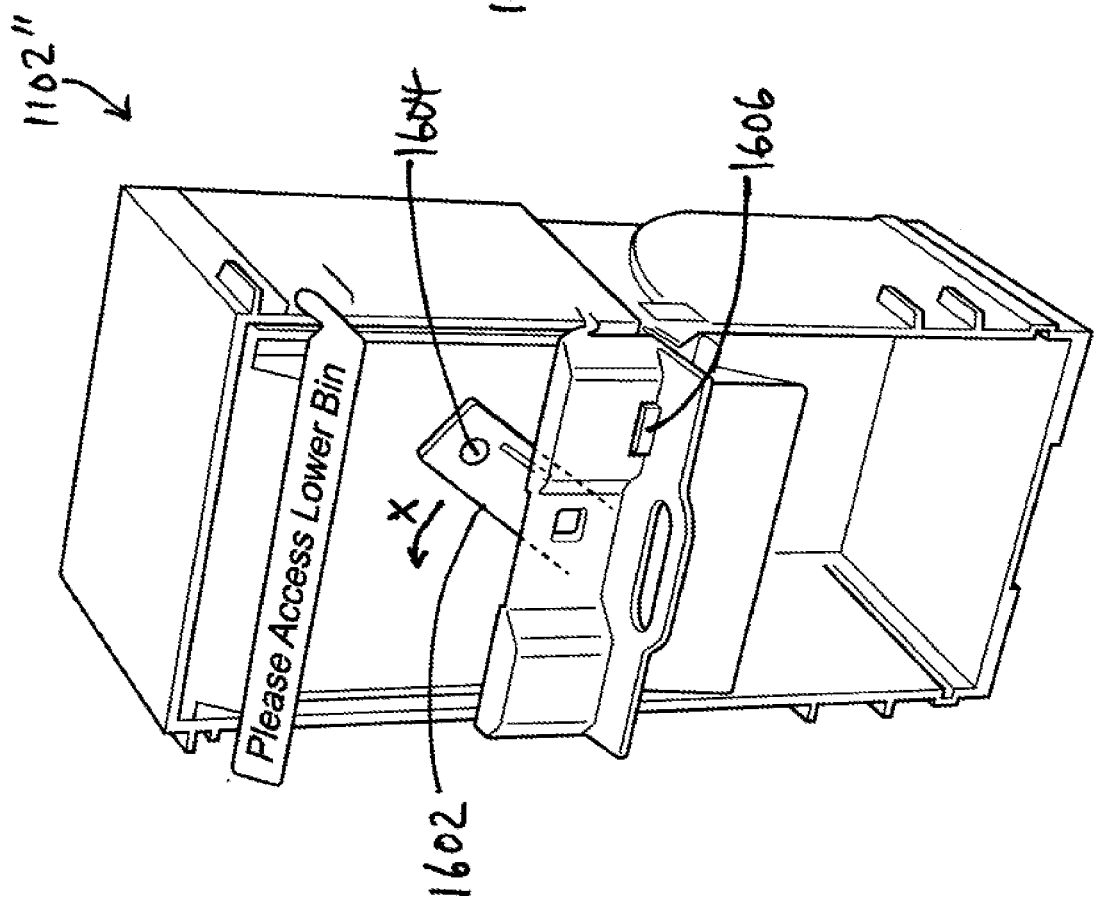
FIG. 18a
FIG. 18b

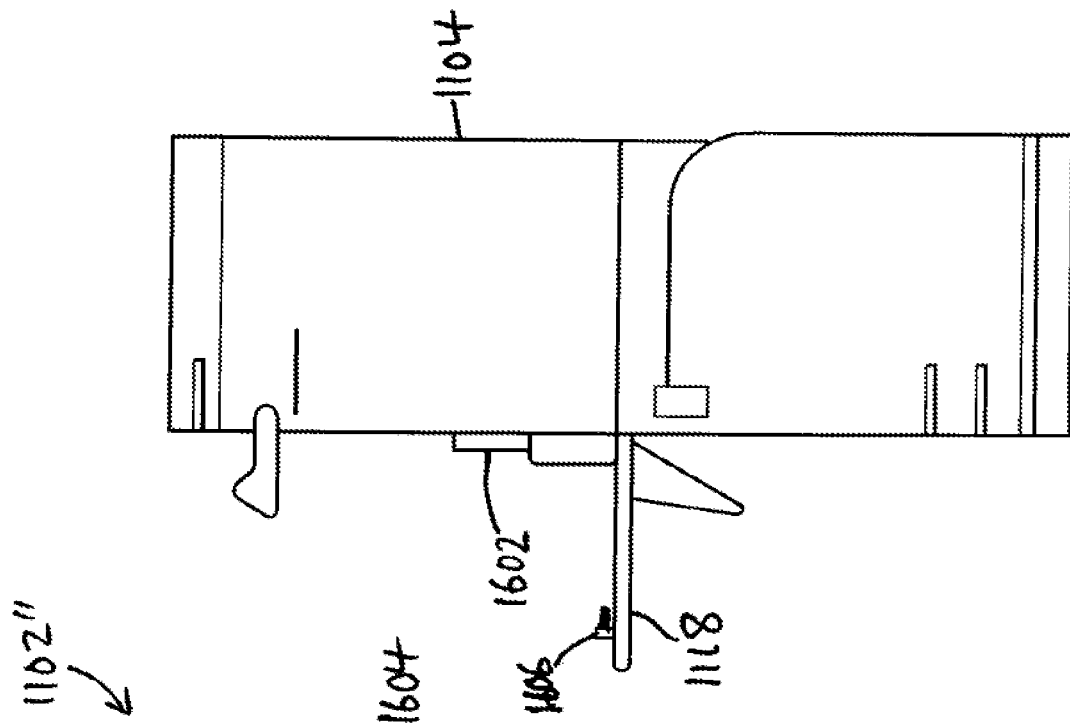
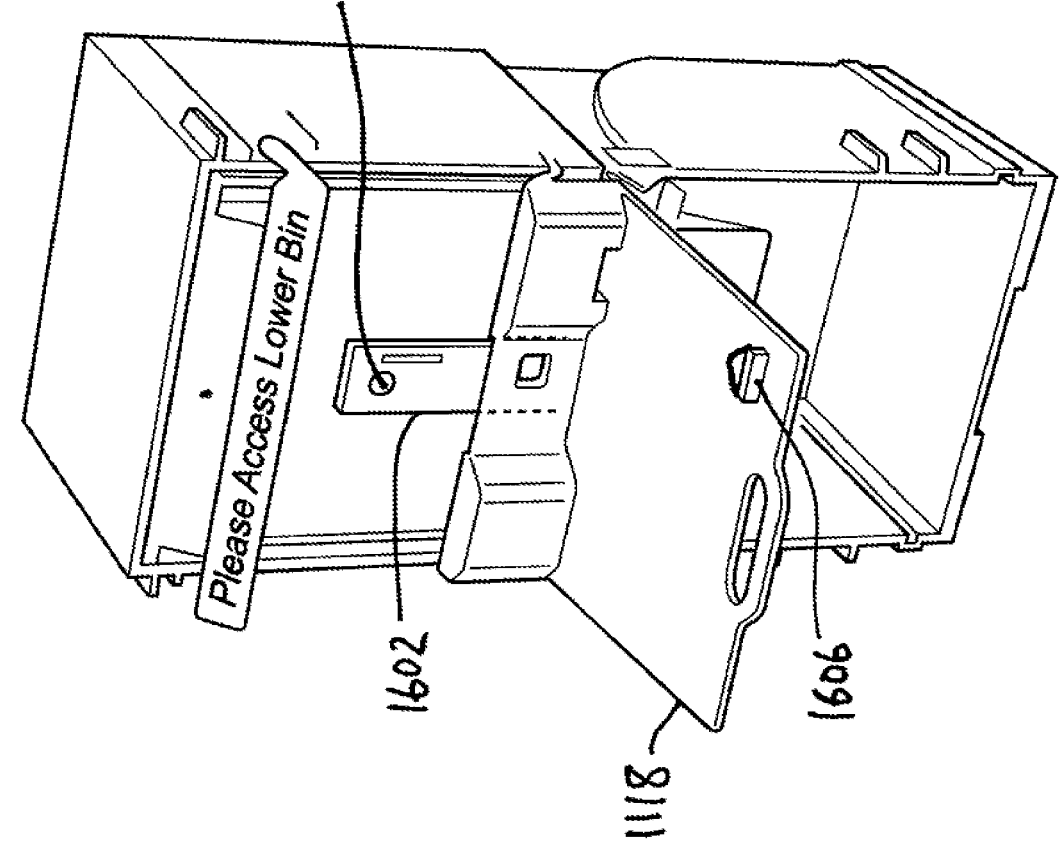
FIG. 19b
FIG. 19a

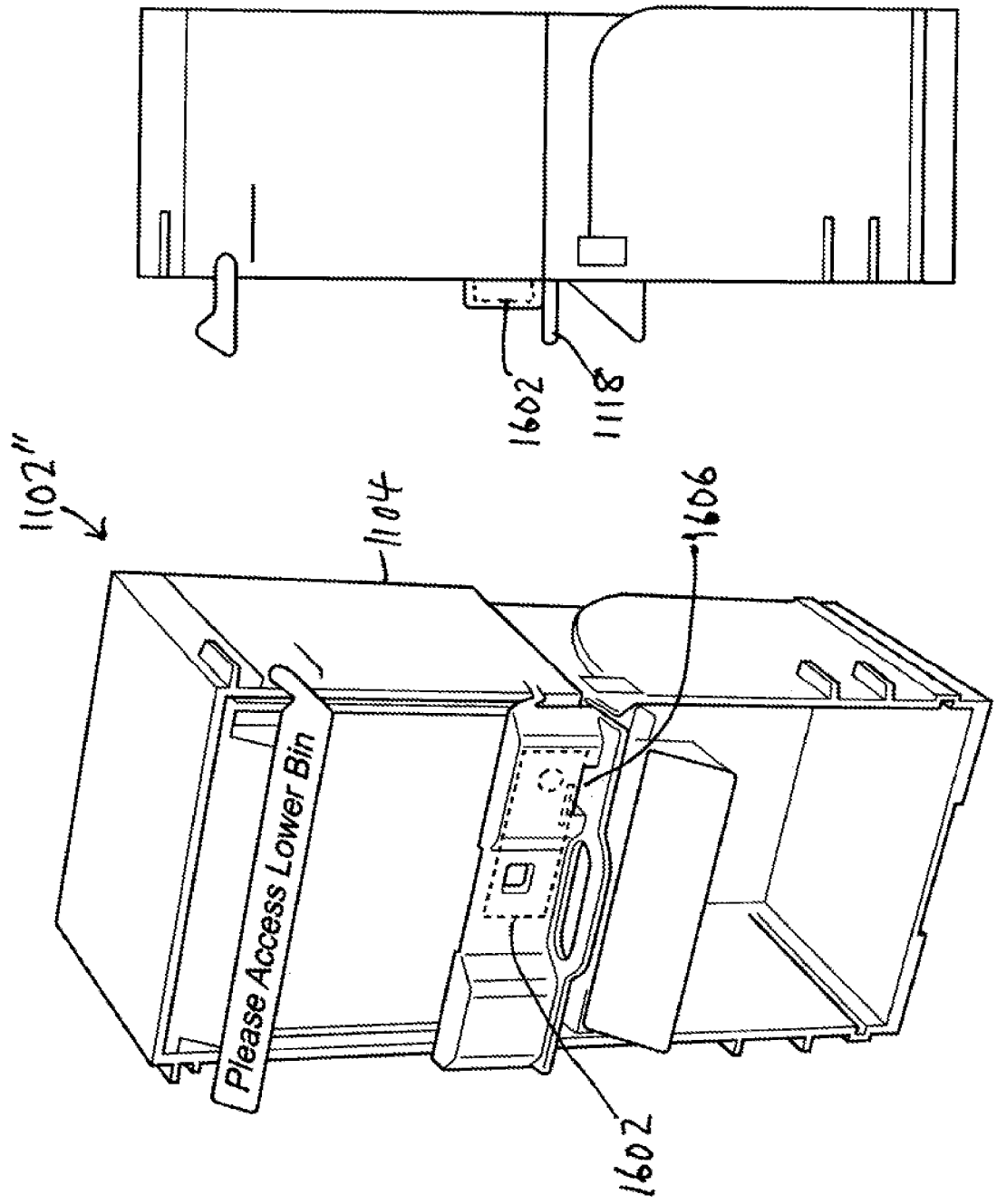

ASSET TAG AND METHODS AND DEVICES FOR RESTOCKING AND ASSET TRACKING

CROSS REFERENCE TO RELATED APPLICATION

This application is a Continuation of U.S. application Ser. No. 17/160,685, filed on Jan. 28, 2021, which is a Divisional of U.S. application Ser. No. 15/969,447 (now U.S. Pat. No. 10,949,724) filed on May 2, 2018, which claims priority to Application No. 1707024.4 filed in Great Britain, on May 2, 2017 and Application No. 1707036.8 filed in Great Britain, on May 3, 2017. The entire content of all of the above referenced applications are hereby incorporated by reference.

BACKGROUND

Field

The present invention relates to electronic stock or asset monitoring techniques, and more particularly to an asset tag and methods and devices for restocking and asset tracking.

Description of the Related Art

This invention concerns systems and methods for providing monitoring of quantities of stock or assets in an accurate and preferably secure manner, in storage environments where hand-portable stock items can be stored and accessed by a user or, more typically, a multitude of different users or employees. Such storage environments are typically found at manufacturing, construction, aerospace, healthcare and other sites. The assets may include tools, consumable materials, and single-use and reusable items. As used herein, "item", "product" and "asset" may be used interchangeably; and assets may be referred to generally as "indirect materials" or "inventory".

In prior art systems the amount of stock retrieved or removed from storage has been determined using tags. For example, WO2006/000016A1 discloses an apparatus for detecting removal of items from a compartment. The apparatus comprises a reader for reading Radio Frequency Identification (RFID) tags attached to items in the compartment and a processor, coupled to the reader, for identifying items removed from the compartment. US2016/071052A1 discloses a stock monitoring system, for monitoring items of stock in one or more storerooms for stock items using, inter alia, a reader and/or wireless transmitter being adapted for short-range communication. The reader, wireless transmitter and/or the first wireless transceiver may comprise a near field communication (NFC) device, and the tag may comprise a NFC RFID tag.

US2015/222740A1 discloses a wireless alerting system for personal area asset supervision; the system includes an observing device, using a host apparatus such as Bluetooth®, capable of monitoring at least one identifier device located within a selected proximity which encompasses an area in a selected radius of distance. The identifier device is a generic tag or customized to some extent in the system for attachment to any item.

US2016/105762A1 discloses an asset monitoring and tracking system with a distributed Bluetooth® low energy (BLE) sensor system of heterogeneous sensors over wireless networks. One or more Bluetooth® assets having a Bluetooth radio are associated with a specific set of business rules by enterprise users. Scan event data is received from at least one of a plurality of Bluetooth® sensors having Bluetooth® radios, wirelessly distributed around a communication network. The scan event data results from a scan event wherein the Bluetooth® asset was within range of the at least one Bluetooth® sensor. A BLE device comprises a Bluetooth tag, a Bluetooth device app, and a Bluetooth radio.

Thus, asset tagging and/or tracking techniques are known in which either NFC (RFID) tags or Bluetooth tags are used. However, a problem with such systems is that some organisations have thousands of assets across their sites, and the process of setting up the Bluetooth tags by a user is onerous and time consuming.

A further problem is that there is a requirement to read the Bluetooth signal into software or pair the tag with a mobile device using a button on the Bluetooth tag, complicating the setup of links. Also, the number of Bluetooth tags that can be paired with one mobile device is limited (traditionally, only up to six).

A further problem is that asset tags (especially Bluetooth) can be difficult to fabricate so as to be made waterproof. Also, with Bluetooth tags battery life can limit usage, due to depletion in use: asset management can be prevented when the battery is depleted in the Bluetooth tag. It can also be difficult to obtain the ID of a tag that requires battery changeout.

A further problem with Bluetooth tags is that unauthorised actors can connect to the Bluetooth component so that it is possible for the tag to be hacked.

A further problem with traditional tags is that booking of a particular asset/tool to a job for an operative using vehicles and/or moving between and sites is not readily provided.

A further problem is that suitable techniques do not exist for locating/tracking assets at a site using a portable device.

A further problem is that suitable techniques do not exist allowing automated reading of assets within a store, i.e. 'always on' technology.

Additionally, the (logging/tracking of the) "on the go" transfer of a tethered asset from one user (e.g. engineer) to another is not facilitated with conventional systems.

A further problem is that suitable techniques do not exist for identifying and/or locating tools that have been damaged and are no longer fit for use or require repair.

A further problem is that of how to facilitate timely communication of a restock request to a controller for arranging restocking of items/assets.

A further problem is that suitable techniques do not exist for enabling cardless access by users to secure containers for retrieval of assets from bins, in particular so as to facilitate unlocking by means of the same device used for booking out items/assets from a bin.

A further problem is that known techniques do not enable two-way communications between an asset tag and a stock monitoring and/or asset supply system.

A further problem is that of how to facilitate visual guidance presentation to a user, for guiding them to an asset they have found through an asset search.

SUMMARY

According to one embodiment of this disclosure, there is provided an asset tag adapted to be mounted to an asset. The asset tag comprises a first component encoded with a first ID unique to the asset tag, the first component having a first wireless interface and being adapted to transmit first broadcast signals via said first wireless interface over a first range, the first broadcast signals including the first ID. The asset tag comprises a user-actuatable button and processing circuitry, coupled to the button and to at least the first wireless interface. The processing circuitry is configured for (i) determining whether a predetermined gesture has been performed by a user using the button and (ii) if the predetermined gesture has been performed, transmitting via the first wireless interface to a wireless access point a restock message, the restock message including the first ID and indicating that restocking is required of assets corresponding to the first ID.

In one embodiment, determining whether a predetermined gesture has been performed comprises determining whether the button has been actuated twice within a first predetermined period.

In another embodiment, determining whether a predetermined gesture has been performed comprises determining whether the button has been actuated and held for a second predetermined period.

Preferably, the first predetermined period or the second predetermined period has a duration of 0.5 to 4 seconds, more preferably 1 to 3 seconds, and more preferably 1 to 2 seconds. The asset tag preferably further comprises a visual indicator element, the visual indicator element being illuminated, at a given time, in a colour indicative of current status. Preferably, the visual indicator element is configured to be illuminated, at a given time, in a respective colour corresponding to the current status being one of normal, restock pending and restock acknowledged and restock complete.

The asset tag may further comprise a second component encoded with a second ID unique to the asset tag, the second component having a second wireless interface and being adapted to transmit second broadcast signals via said second wireless interface over a second range, the second broadcast signals including the second ID. Preferably, the processing circuitry is coupled to the second wireless interface and configured for transmitting the restock message via the first wireless interface and/or second wireless interface, the restock message including the first ID and/or the second ID and indicating that restocking is required of assets corresponding to the first and/or second ID. Preferably, the first range and the second range are different. Preferably, the first ID and the second ID are identical.

The first wireless interface may be one or more of (i) a transmit-only wireless interface, (ii) adapted to transmit the first broadcast signals with a first periodicity T1, (iii) a battery-powered wireless interface and (iv) a Bluetooth interface.

The second wireless interface may be one or more of (i) a wireless transceiver, (ii) adapted to transmit the second broadcast signals with a second periodicity T2, (iii) a battery-powered wireless interface, (iv) a passive wireless interface, (v) adapted to transmit, upon interrogation by a corresponding reader device, a second broadcast signal and (vi) a NFC interface.

The asset tag may further include a write switch coupled to the processing circuitry; wherein the processing circuitry is configured, upon actuation of the write switch, to (i) obtain the first ID from the first component and write or rewrite the first ID to a storage element of the second component and (ii) turn off the second component. The asset tag preferably further includes a user-actuatable push button on a housing of the asset tag for actuating the write switch. Preferably, the first ID comprises a MAC address of the first component.

According to another embodiment of this disclosure, there is provided a hard hat, bicycle or motorcycle helmet incorporating an asset tag according to any of the preceding paragraphs, the asset tag including an accelerometer coupled to the processing circuitry; wherein the processing circuitry is configured to store time and/or amplitude data for any impacts recorded by the accelerometer above a threshold impact level.

According to another embodiment of this disclosure, there is provided a method of configuring an asset tag having a passive wireless interface as a second wireless interface, the method comprising, during manufacture and/or assembly of the asset tag, (i) obtaining the first ID from the first component and writing or rewriting the first ID to a storage element of the second component and (ii) turning off the second component.

Preferably, the first ID comprises a MAC address of the first component.

According to another embodiment of this disclosure, there is provided an asset supply arrangement, the asset supply arrangement comprising: one or more bins for holding assets, the or each bin having on a visible surface thereof an asset tag as described herein; wherein the first ID and/or second ID of the asset tag is associated in a database of a central control computer with the assets in a respective bin.

According to another embodiment of this disclosure, there is provided an asset supply system, the asset supply system comprising: an asset supply arrangement according to the preceding paragraph and a wireless access point located within the first range or within the second range, the wireless access point being coupled for communication with a central control computer; wherein an asset tag on the asset supply arrangement is configured to transmit the restock message to the central control computer via the wireless access point.

Preferably, the wireless access point is configured to (ii) receive the restock message transmitted by the first wireless interface and (ii) forward the restock message to the central control computer.

Preferably, the central control computer is configured to transmit a restock acknowledgement message to the asset tag or to the asset supply arrangement via the wireless access point.

In one embodiment, the wireless access point is a reader device or tablet computer.

Preferably, the wireless access point comprises a short-range wireless transceiver and/or a long-range wireless transceiver.

Preferably, the short-range wireless transceiver comprises a NFC device and the long-range wireless transceiver comprises a Bluetooth device.

Preferably, the wireless access point is located in a storeroom in which the asset supply arrangement is located.

According to another embodiment of this disclosure, there is provided a dual-bin arrangement, the dual-bin arrangement comprising: a housing in which an upper space and a lower space are defined, both the upper space and the lower space being adapted for holding assets; an asset tag as described herein provided on the housing; a divider configured to move between a first position, in which the divider forms a floor of the upper space, and a second position, in which the upper space and a lower space are contiguous, thereby enabling assets to fall from the upper space to the lower space; and a switch located on the housing and configured to be activated as the divider moves out of the first position, thereby triggering the sending of a restock message to a wireless access point for forwarding to a central control computer for ordering a restock of the dual-bin arrangement.

Preferably, (i) the restock message is transmitted by a long-range wireless interface of the switch to the wireless access point or (ii) a restock signal is transmitted to the tag, thereby triggering the sending of a restock message by the first wireless interface of the tag to a wireless access point.

The dual-bin arrangement may further comprise a flag member; wherein the flag member is movable between a latched position and an indicating position, the flag member being urged under bias into the indicating position; wherein the flag member is held in the latched position when the divider is in the first position; and wherein the flag member is released and movable under the bias as the divider moves out of the first position.

Preferably, the switch includes a reed switch and the flag member includes in or on a portion thereof a magnet; wherein the magnet acts to maintain the reed switch closed when the flag member is held in the latched position; and wherein the reed switch goes open as the flag member is released and moves out of the latched position.

Preferably, the flag member is rotatable so as to be substantially horizontal in the latched position and substantially vertical in the indicating position.

According to another embodiment of this disclosure, there is provided a secure asset supply cabinet, comprising: an asset supply arrangement contained in the asset supply cabinet, the asset supply arrangement comprising one or more bins for holding assets; one or more programmable locks, the or each programmable lock comprising processing circuitry and, coupled thereto, a short range wireless interface and at least one physical lock actuatable by the processing circuitry; wherein the processing circuitry is configured for (i) receiving an unlock code from a portable wireless device of a user via the short range wireless interface, the unlock code being based at least in part on credentials entered by the user on the portable wireless device, (ii) determining, based on one or more authentication and/or lock codes on the programmable lock, whether the unlock code is authenticated and (iii) if the unlock code is authenticated, actuating the or each physical lock to unlock the asset supply cabinet.

Preferably, the or each bin has on a visible surface thereof an asset tag, the first and/or second ID of the asset tag being associated in a database of a central control computer with the assets in a respective bin.

Preferably, wherein the short range wireless interface comprises a NFC interface.

According to another embodiment of this disclosure, there is provided a method of tracking the location of an asset at a site using a wireless portable device, the asset having mounted thereto an asset tag, the asset tag comprising a first component encoded with a first ID unique to the asset tag, the first component having a first wireless interface and being adapted to transmit first broadcast signals via said first wireless interface over a first range, the first broadcast signals including the first ID, the method comprising: receiving a first user input at the wireless portable device, the first user input selecting the asset; receiving via the receiver one or more of said first broadcast signals; determining the signal strength of said one or more of said first broadcast signals; deriving a measure based on the signal strength; and displaying one or more graphical elements indicating at least a distance from the wireless portable device to the asset.

Preferably, the one or more graphical elements comprise a ring structure, the ring structure having a plurality of concentric rings. Preferably, each of the plurality of concentric rings in the ring structure, when illuminated, has a respective, different colour. In one embodiment, the number of concentric rings in the ring structure lies in the range 2 to 8, 3 to 7, 4 to 6, or more preferably is 5.

The method preferably further comprises: determining which one ring of the plurality of rings is to be illuminated; wherein displaying one or more graphical elements comprises displaying the ring structure with said one ring illuminated.

Preferably, determining which one ring of the plurality of rings is to be illuminated comprises: determining, in respect of each of a plurality of successively higher thresholds, each threshold corresponding to one of a plurality of concentric rings in the ring structure, whether the measure lies between that threshold and an immediately lower threshold. Preferably, the number of thresholds lies in the range 2 to 8, 3 to 7, 4 to 6, or more preferably is 5.

In one embodiment, the wireless portable device includes an orientation-sensing device for providing an orientation signal; and the method further comprises determining the current orientation of the wireless portable device based on said orientation signal; and the one or more graphical elements include an orientation element indicating the current orientation. Preferably, the orientation element comprises a compass.

According to another embodiment of this disclosure, there is provided a wireless portable device for tracking the location of an asset at a site, the asset having mounted thereto an asset tag, the asset tag comprising a first component encoded with a first ID unique to the asset tag, the first component having a first wireless interface and being adapted to transmit first broadcast signals via said first wireless interface over a first range, the first broadcast signals including the first ID, the wireless portable device comprising: a receiver; a processor, coupled to the receiver, the processor being configured for: receiving a first user input at the wireless portable device, the first user input selecting the asset; receiving via the receiver one or more of said first broadcast signals; determining the signal strength of said one or more of said first broadcast signals; deriving a measure based on the signal strength; and displaying one or more graphical elements indicating at least a distance from the wireless portable device to the asset.

Preferably, wherein the one or more graphical elements comprise a ring structure, the ring structure having a plurality of concentric rings. Preferably, each of the plurality of concentric rings in the ring structure, when illuminated, has a respective, different colour. Preferably, the number of concentric rings in the ring structure lies in the range 2 to 8, 3 to 7, 4 to 6, or more preferably is 5.

Preferably, the processor is further configured for: determining which one ring of the plurality of rings is to be illuminated; wherein displaying one or more graphical elements comprises displaying the ring structure with said one ring illuminated.

Preferably, determining which one ring of the plurality of rings is to be illuminated comprises: determining, in respect of each of a plurality of successively higher thresholds, each threshold corresponding to one of a plurality of concentric rings in the ring structure, whether the measure lies between that threshold and an immediately lower threshold. Preferably, the number of thresholds lies in the range 2 to 8, 3 to 7, 4 to 6, or more preferably is 5.

In one embodiment, the wireless portable device further includes an orientation-sensing device for providing an orientation signal; and the processor is further configured for determining the current orientation of the wireless portable device based on said orientation signal; and the one or more graphical elements include an orientation element indicating the current orientation. Preferably, the orientation element comprises a compass.

According to another embodiment of this disclosure, there is provided a wireless portable device comprising a short-range (e.g. NFC) and/or long-range (e.g. Bluetooth) wireless transceiver, a display, an input device and processing circuitry, coupled to the short-range and/or long-range wireless transceiver, display, and input device; wherein the processing circuitry is configured for (i) receiving one or more user inputs via the input device, the one or more user inputs identifying an asset, a tag ID being associated in a database with the asset; and (ii) transmitting a search message to a wireless access point, the search message incorporating at least the tag ID.

According to another embodiment of this disclosure, there is provided an asset tracking system for use with the wireless portable device of the preceding paragraph, the asset tracking system comprising a wireless access point coupled in a network to a central control computer, the central control computer storing at least a copy of the database, the database storing, for each tag ID associated therewith, a location ID for a location at which an asset corresponding to the tag ID is stored and/or available; wherein the wireless access point is configured to receive the search message and incorporate a location ID of the wireless access point in the search message; and wherein the central control computer is configured for (i) receiving the search message, and (ii) querying the database to extract a location ID based on the tag ID.

Preferably, the asset tracking system is further configured for transmitting, by the central control computer, an illumination message incorporating the tag ID to a wireless access point associated with the location ID.

Preferably, the wireless access point is configured for forwarding, in response to receipt of the illumination message, the illumination message to a tag associated with a tag ID in the search message via a short-range and/or long-range wireless transceiver of the wireless access point, the illumination message being configured to command the tag associated with a tag ID to illuminate a visual indicator element thereof.

According to another embodiment of this disclosure, there is provided an asset tag adapted to be mounted to an asset and configured for use with the asset tracking system according to the three preceding paragraphs; wherein: the asset tag comprises an asset tag as described herein; wherein the asset tag further comprises a visual indicator element, the visual indicator element being illuminated, at a given time, in a colour indicative of current status; wherein the processing circuitry of the asset tag is configured for (i) receiving the illumination message via the first wireless interface and/or second wireless interface and (ii) in response, illuminating the visual indicator element in a predetermined colour to facilitate finding by the user.

According to another embodiment of this disclosure, there is provided a wireless portable device or server, the wireless portable device or server incorporating a processor, memory and at least one communications interface, the processor being configured to carry out any of the above methods set out in any of the appended claims or as described herein.

According to another embodiment of this disclosure there is provided a recordable, rewritable or recorded medium having recorded or stored thereon machine readable data defining or transformable into instructions for execution by processing circuitry and corresponding to at least the steps of the methods set out in any of the appended claims.

According to another embodiment of this disclosure there is provided a server computer incorporating a communications device and a memory device and being adapted for transmission on demand or otherwise of data defining or transformable into instructions for execution by processing circuitry and corresponding to at least the steps of any of the appended claims.

Implementation of the processing on the PDA (which is e.g. phone, tablet or other portable computing device) with NFC-RFID (Near Field Communication Radio Frequency Identification capability) and Bluetooth may be by means of an application that is downloaded to the PDA. The PDA may be linked in real time through 3G/4G/5G to cloud-based central computer (CC) software. The CC software may be an enterprise-wide asset or indirect materials management platform.

The (composite) asset tag disclosed herein is a unique asset and inventory management electronic tag combining both NFC (Near Field Communication) technology and short range wireless communication technology (e.g. Bluetooth) and in some circumstances RFID technology. This can be achieved using a combined Bluetooth NFC chip or simply combining a Bluetooth tag with an NFC tag but encoding the NFC tag with the Bluetooth identifier and adding an RFID tag.

The (composite) asset tag disclosed herein allows the following advantages:

1. The NFC component of the composite tag can be encoded with the Bluetooth (Short range wireless communication technology identifier (Media Access Control)) MAC address. The benefit is that it significantly speeds up the process of setting up the Bluetooth tags by a user making it a more convenient and user friendly process particularly for multiple tag set up for multiple assets with a mobile NFC capable device.

2. The NFC component of the composite tag allows the control of assets to a home store or van within a cloud based software using an NFC capable mobile device without the requirement to read the Bluetooth signal into the software or pair the tag with a mobile using a button on the Bluetooth tag (the traditional method).

3. Traditionally, only up to six Bluetooth tags can be paired with one mobile device. The NFC component of the composite tag removes the requirement for 'pairing' (two-way communication requirement) as the system is only listening for specific Bluetooth signals and therefore allows "virtual" tethering (within asset tracking software) of substantially more composite tags, and therefore assets, to a mobile device.

4. The additional benefit of NFC as the identifier (and avoiding using a button to pair the tag to the smart mobile device) is that the composite tag can be made to be waterproof and more cost effective. The conventional addition of a button makes waterproofing extremely difficult.

5. Another benefit of NFC component of the composite tag is that it increases the life of the battery, as the composite tag can work as a beacon-only, utilising one-way communication from the tag to the mobile device. I.e. the composite tag does not need to listen to any signals going to it and does not need to be 'paired'. This one-way communication increases the life in service of the composite tag between battery changes. With a button on a Bluetooth tag, it has to communicate in both directions with a mobile smart device.

6. The composite tag is also much more secure: anyone can listen to the composite tag as it only broadcasts. Effectively the composite tag cannot be hacked and settings changed, as no-one can connect to the Bluetooth component of the composite tag.

7. The NFC component of the composite tag allows the scanning of the composite tag to record data (about the asset, e.g. part number, serial number, description, calibration dates, inspection checks, training records of the inspector being up to date, information PDF's, how to use videos, the ability to photograph parts or all of the asset, to highlight issues on inspection etc.) to a cloud based software.

8. The NFC component of the composite tag allows the booking of a particular asset/tool to a job. E.g. an engineer takes a drill and an angle grinder from several assets on their vehicle. These can be booked to the job, so it records them going on to a particular site. When the engineer gets back to the vehicle he can scan them back onto the vehicle or home store. This gives a record and audit trail of the time specific tools are allocated to a job.

9. The Bluetooth or short range wireless communication component of the composite tag allows the composite tag to be tracked using signal strength by the Bluetooth network on a mobile device with Bluetooth capability.

10. The cloud based (asset monitoring/tracking) software allows the Bluetooth network of the whole community to track specific assets/tools, i.e. with anyone with their Bluetooth and PDA application enabled.

11. The Bluetooth and RFID element of the composite tag allows reader tiles—which can fit onto walls and into suspended ceilings using power over Ethernet and that have readers for both the Bluetooth and RFID element—to read both elements of the composite tags. The tiles can detect the proximity of passive RFID tagged assets (up to six metres radius) and Bluetooth tagged assets up to 50 metres. This allows automated reading of assets within a store, i.e. 'always on' technology, and when they are booked to an operative via a PDA application using the NFC component, they are automatically allocated to the operative and their vehicle (using Vehicle registration and operatives clock card using inventory management software).

12. The composite tag placed on an asset can be NFC scanned to tether the asset to a mobile device using the Bluetooth (short range wireless communication technology.)

13. The composite tags of a specific asset can be scanned by another engineer to show an asset/tool transfer from one engineer to another in the cloud based (asset monitoring/ tracking) software. This also automatically tethers the Bluetooth component of the composite tag to the new engineer's smart device; this allows the lending of tools between operatives to be a seamless process.

14. The Bluetooth and NFC components together ensure two ways of reading an asset into the cloud based (asset monitoring/tracking) software—a passive method by scanning by a user and an active Bluetooth method where the smart mobile device automatically reads the Bluetooth signal. This also means asset management can still be carried out even when the battery is depleted in the Bluetooth tag and requires changing. A NFC reader uses the battery of the mobile device to excite and read the tag.

15. The NFC component of the composite tag can be scanned and software used to highlight in cloud based software the composite tags that require battery changeout.

16. The NFC component allows the recording in the cloud based (asset monitoring/tracking) software of tools that have been damaged and are no longer fit for use or require repair.

17. The Bluetooth component of the composite tag can have sensors built in to record: temperature, humidity, pressure, motion (accelerometer), etc., which can record the start and stop time of an asset in use allocated to a particular user for white finger monitoring and record the physical state/condition of an asset.

BRIEF DESCRIPTION OF THE DRAWINGS

Embodiments of the invention will now be described in detail, by way of example, with reference to the accompanying drawings, in which:

FIG. 7 schematically illustrates an asset tracking database, showing the association of users and tag IDs of tags tethered to the users;

FIGS. 10(a)-10(d) show an asset supply arrangement 1100' affording "Restock request" message transmission, according to another embodiment;

FIGS. 15(a)-15(f) show examples of user interface views during the process of FIG. 14; and FIGS. 16(a) to 21(b) show a dual bin arrangement according to another embodiment, FIGS. 16(a), 17(a), 18(a), 19(a), 20(*a*) and 21(*a*) in perspective view and FIGS. 16(*b*), 17(*b*), 18(*b*), 19(*b*), 20(*b*) and 21(*b*) in side view, at various stages of operation.

DETAILED DESCRIPTION

In the following, like numerals will be used to denote like elements. Unless indicated otherwise, any individual design features, components or steps mentioned herein may be used in combination with any other features, components or steps disclosed herein.

Figure 1:
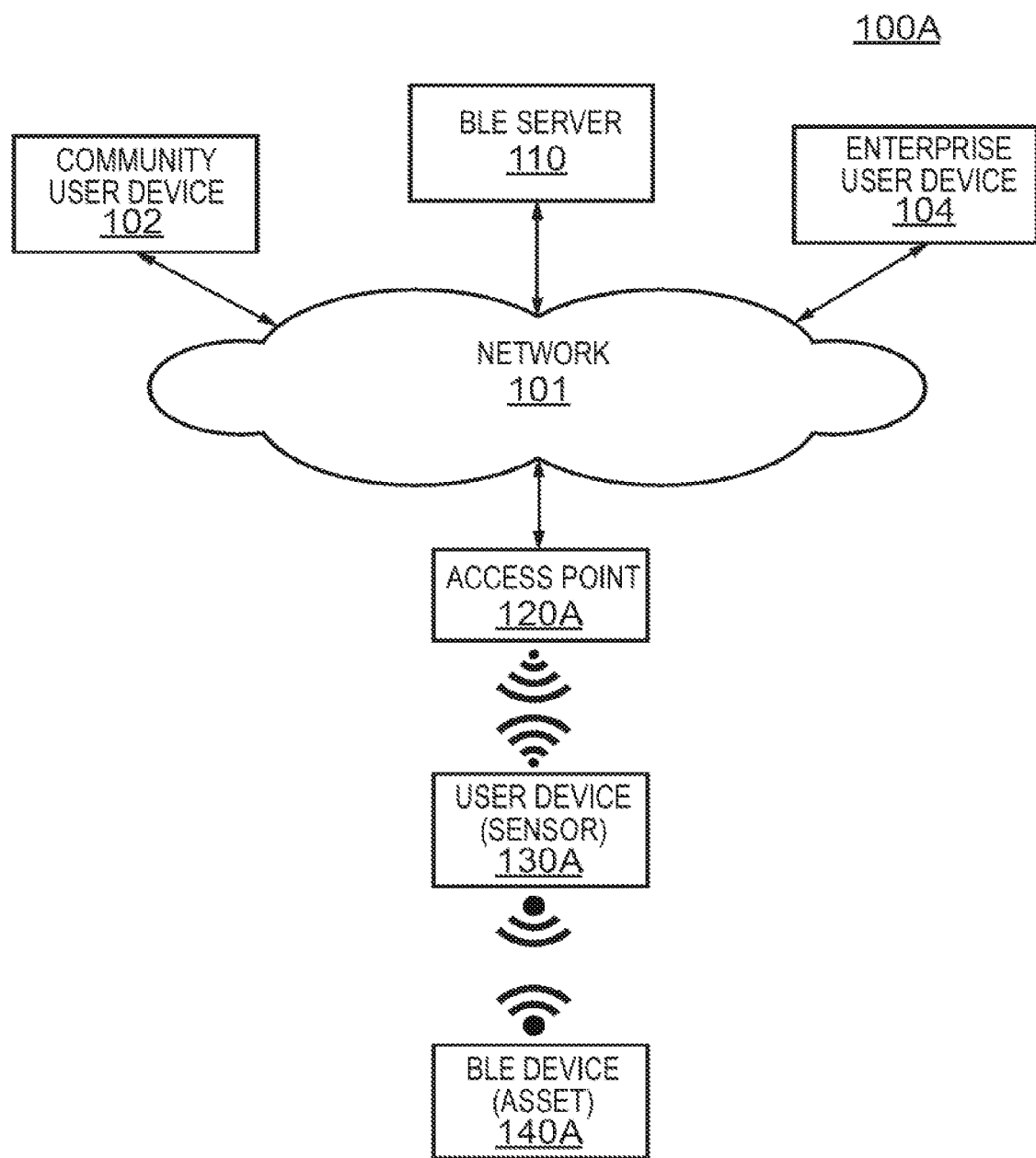
FIG. 1 (PRIOR ART) is a high-level block diagram illustrating a known distributed BLE sensor system aggregated over wireless networks.

FIG. 1 is a high-level block diagram illustrating a distributed BLE sensor system 100 aggregated over wireless networks. The system 100 comprises a BLE server 110, an access point 120A, a community user device 102 and an enterprise user device 104, coupled to a network 101 preferably over wired connections. A user device (sensor) 130A is wirelessly coupled to the access point 120A over a Wi-Fi connection, and is wirelessly coupled to a BLE device (asset) 140A over a Bluetooth connection. Additional network components can also be part of the system 100, such as firewalls, virus scanners, routers, switches, application servers, databases, as well as additional controllers, access points, access switches, controllers, stations, and the like. The network components can be implemented as hardware, software, or a combination of both.

In an embodiment, there are multiple different sensors in the system 100A. The more sensors reporting sensor events from different locations, the larger the coverage area for asset tracking. The sensors belong to independent and unassociated users. Different sensors can be different devices, the same devices from different manufacturers, or identical devices. An asset can be picked up by different sensors at different locations, the same sensor at different locations, or different sensors at the same locations. In some cases, sensor events are essentially random events because there is no relationship between the sensor and the asset other than both being associated generally with the system 100A (e.g., community asset tracking). In other cases, sensor events are planned (e.g., heartbeat monitoring).

The BLE server 110 receives and analyses sensor events from the user devices 120 coming into contact with BLE devices 130. One embodiment can format sensor event data in a data portion of a frame including a unique identifier, a time/date stamp, a location, and any additional information for an implementation. Raw sensor event data is stored in a searchable format for later reference. Business rules can be applied to raw data to determine aggregate sensor data for the system 100 as a whole or just a particular user. Real-time alerts or notifications are sent out based on certain triggers, such as when an asset is found, an asset is in danger, a location has changed, a connection heartbeat is lost, a certain number of a set of assets have reached a predetermined condition, and the like.

The BLE server 110 can be implemented in any of the computer devices discussed herein, a personal computer, a smart telephone, a server blade, a virtual storage network, or software as a service (SaaS), for example.

The access point 120A serves as a gateway to the network 101 for transmitting sensor events to the BLE sensor 110. Typically, the user device 130A is associated with a BSSID assigned to the user access point 120A. Alternatively, a router, repeater or other network component can provide Wi-Fi access to the network 101.

The user device 130A is a Bluetooth-enabled sensor that reads information from BLE devices 130 within radio range. For example, by enabling Bluetooth networking on a smart telephone, asset scanning occurs periodically as a user moves to different locations. Beacons are detected and include a unique identifier along with other data. In an embodiment, BLE devices 140A considered assets within the system 100A are assigned unique identifiers having a recognizable prefix (e.g., first four characters are common for the system 100A). The user device 130A locally processes beacon data by adding time/data stamp and location information. In some cases, the user device 130A applies local rules to analyse data. One rule locally monitors heartbeats. Another rule identifies an asset sought by the system 100 and, in response, pairs with the BLE device 140A to deliver data or interrogate for data, as discussed further below. Pairing can be limited to certain transactions and a certain amount of time because some sensors only support one Bluetooth pairing at a time.

The user device 130A comprises a mobile or stationary computerized device. The user device 130A can be a smart telephone, a tablet, a phablet, a personal computer, a server, or any other computing device (e.g., see FIG. 8). An embodiment includes a Wi-Fi radio and one or more Bluetooth radios. A software program or mobile app can be downloaded to and executed on the user device 130A, or be integrated to an operating system.

The BLE devices 130 advertise a presence over a Bluetooth channel to pass information to the BLE sensor server 110. Some BLE devices 130 have integrated Bluetooth capability while others are retrofitted. In one case, BLE tag comprises a small sticker with a (low-powered) Bluetooth transmitter, a small circuit, and a thin profile battery is attached to an item. The low power consumption can allow a battery life of months or years, and when the battery runs out, the sticker is detached, thrown away, and replaced. A security module can encrypt broadcast data. Some tags on stationary assets can be programmed with a fixed location for transmission to sensors that do not have integrated location technology (e.g., no GPS). Asset types can be encoded in unique identifiers (e.g., certain prefixes reserved).

In one embodiment, assets operate in a dual mode to also perform sensor functionality. In more detail, an asset can collect sensor events from other nearby assets and report to a sensor. For example, an asset placed at an intersection can collect sensor events from BLE enabled vehicles that drive by the intersection and then report data during its own interaction with a sensor.

Figure 2:
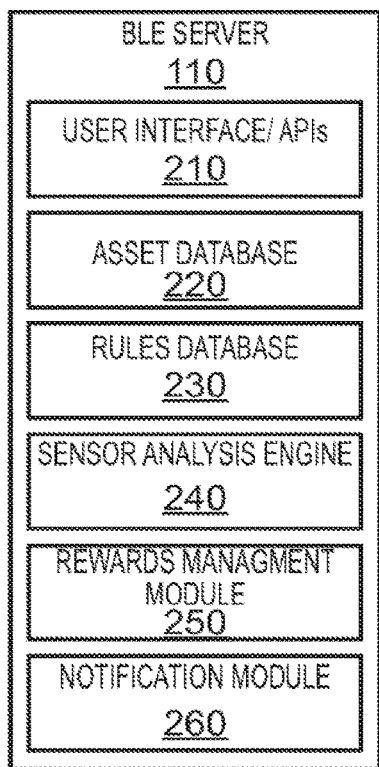
FIG. 2 (PRIOR ART) is a more detailed block diagram illustrating a BLE server of FIG. 1.

FIG. 2 is a more detailed block diagram illustrating a BLE server 110 of FIG. 1. The BLE server 110 may be in practice implemented by one or more servers, and may comprise a hosted (cloud/based) solution. Such a BLE server 110, collection or network of servers or hosted (cloud/based) solution are referred to herein variously as "central control computer (CCC)", "central control system (CCS)" and the like. The BLE server 110 comprises a user interface/APIs 210, an asset database 220, a rules database 230, a sensor analysis engine 240, a rewards management module 240, and a notification module 250, among other server software and hardware. Other examples can have different components. Further, the individual components can be locally stored and executed, be remotely executed by a software as a service, or be separate physical servers.

The user interface/APIs 210 provide an interaction portal for enterprise users and community users to log on to the BLE server 110. Interactions can be provided through a search engine that can search general types of assets and related movement and use data. Also, user profiles can provide private interactions and secure data. Enterprise users can individually register or upload a group of assets and also configure rules for the assets. In another embodiment, enterprise users can search event data, set analysis parameters, and configure heart beat monitoring and asset tracking. Additionally, external processes can interact with the BLTE server 110 utilizing the user interface/APIs 210. APIs for sensors can be publicly available, or can be provided to partners on a more limited basis.

The asset database 220 can store registered assets associated with specific users and preferences. As sensor events occur, analysis results are determined by the sensor analysis engine 240. A relational database or table formats data into a searchable form. A rules database 230 stores rules applied against the registered assets. Some rules are general and are preconfigured for asset tracking, lost and found, or any of the specific case uses. Some rules are customized for a particular user, for a particular asset type, for a particular movement behaviour, and the like.

Figure 3:
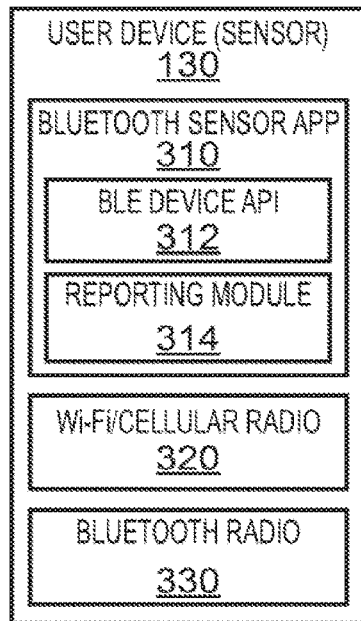
FIG. 3 (PRIOR ART) is a more detailed block diagram illustrating a user device (PDA) of FIG. 1.

FIG. 3 is a more detailed block diagram illustrating a user device 120 (generically referring to the access points 120A-C) of FIG. 1, according to an embodiment. The user device 120 comprises a Bluetooth sensor app 310, a Wi-Fi/cellular radio 320, and a Bluetooth radio 330.

Figure 4:
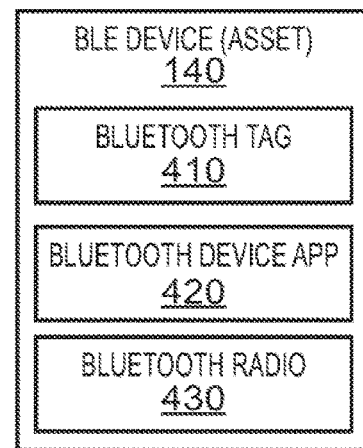
FIG. 4 (PRIOR ART) is a more detailed block diagram illustrating a BLE device of FIG. 1.

FIG. 4 is a more detailed block diagram illustrating a BLE device 130 (generically referring to the BLE devices 130A-D) of FIG. 1, according to an embodiment. The BLE device 130 comprises a Bluetooth tag 410, a Bluetooth device app 420, and a Bluetooth radio 430.

Figure 5:
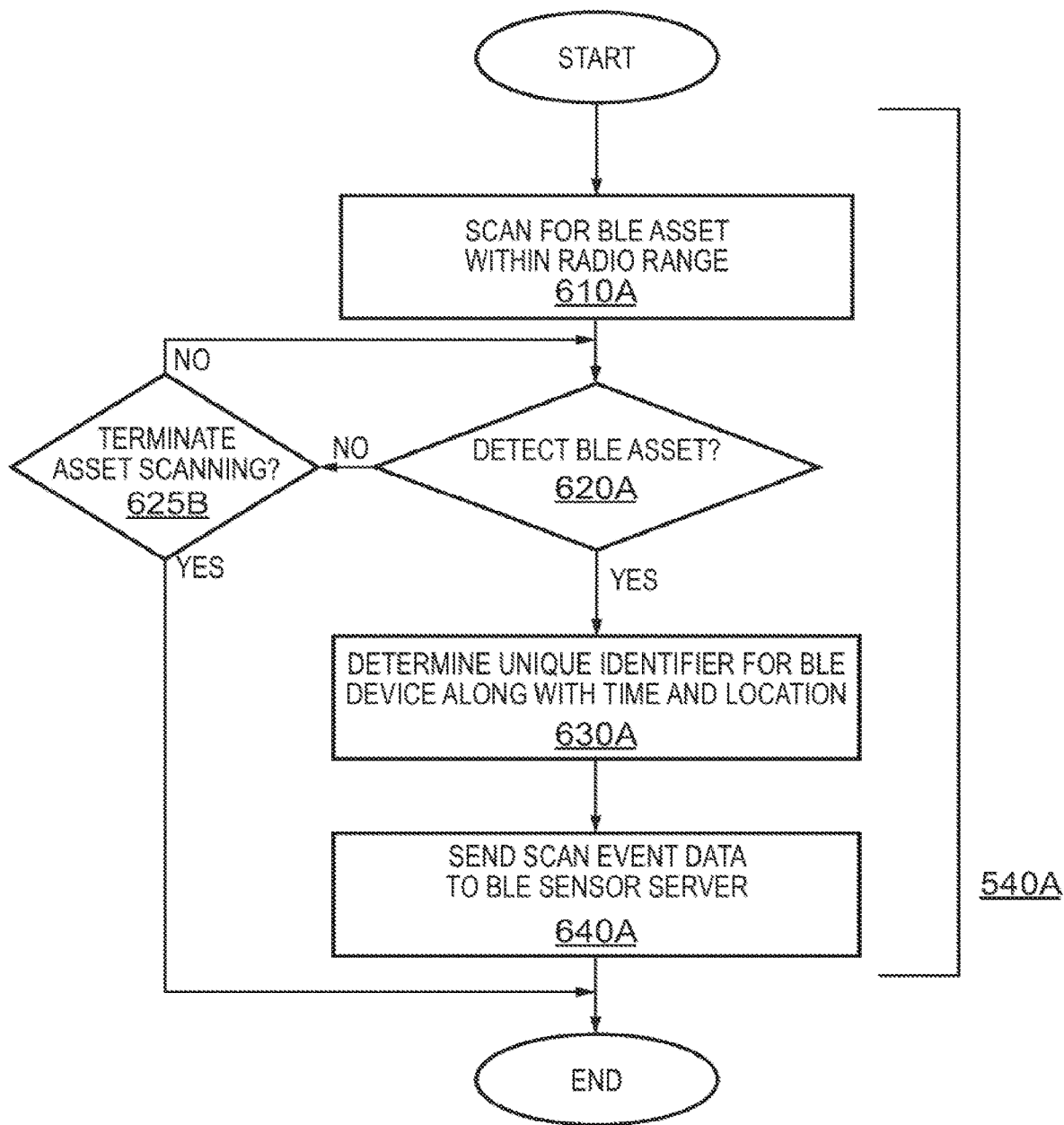
FIG. 5 (PRIOR ART) is a high-level flow chart illustrating a method of aggregating a distributed BLE sensor system over wireless networks.
Figure 6A:
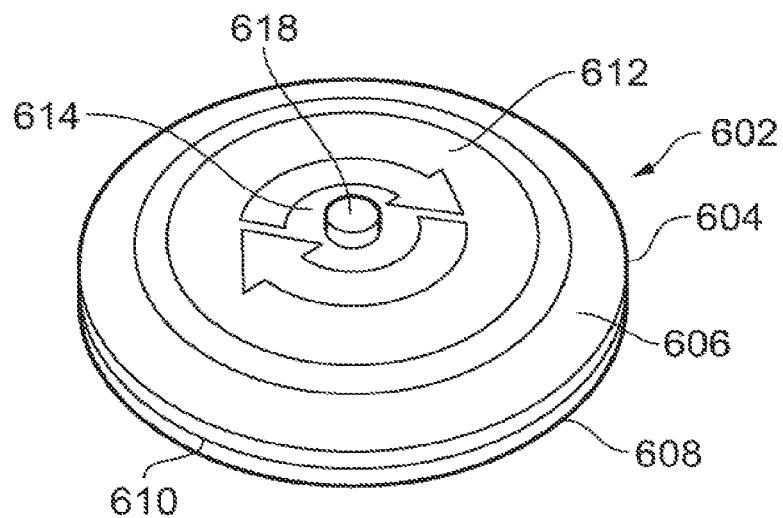
FIG. 6(a) shows an external perspective view of the housing of a composite tag according to an embodiment of the invention.
Figure 6B:
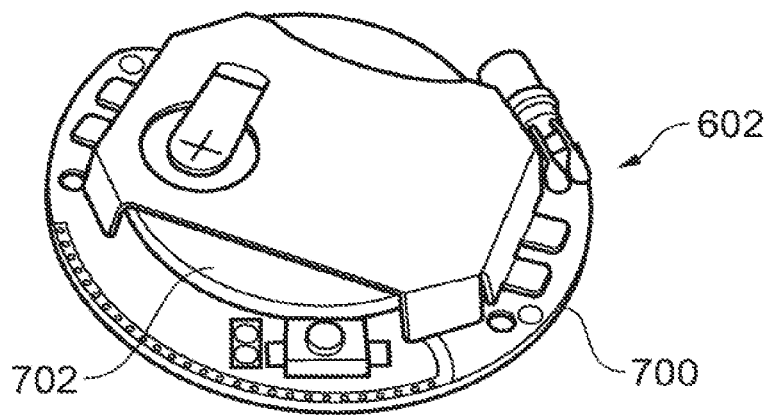
FIG. 6(b) shows the internal hardware of the tag of FIG. 6(a), showing a first sight of a circuit board.
Figure 6C:
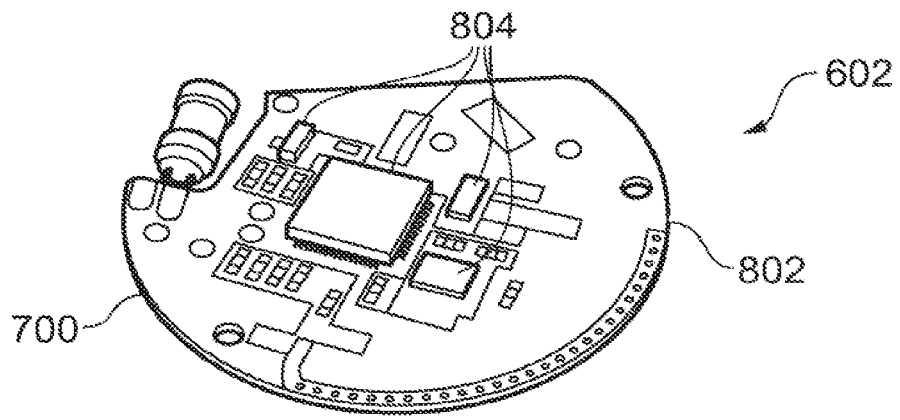
FIG. 6(c) shows the hardware of FIG. 6(b), from the opposite side of the circuit board.
Figure 6D:
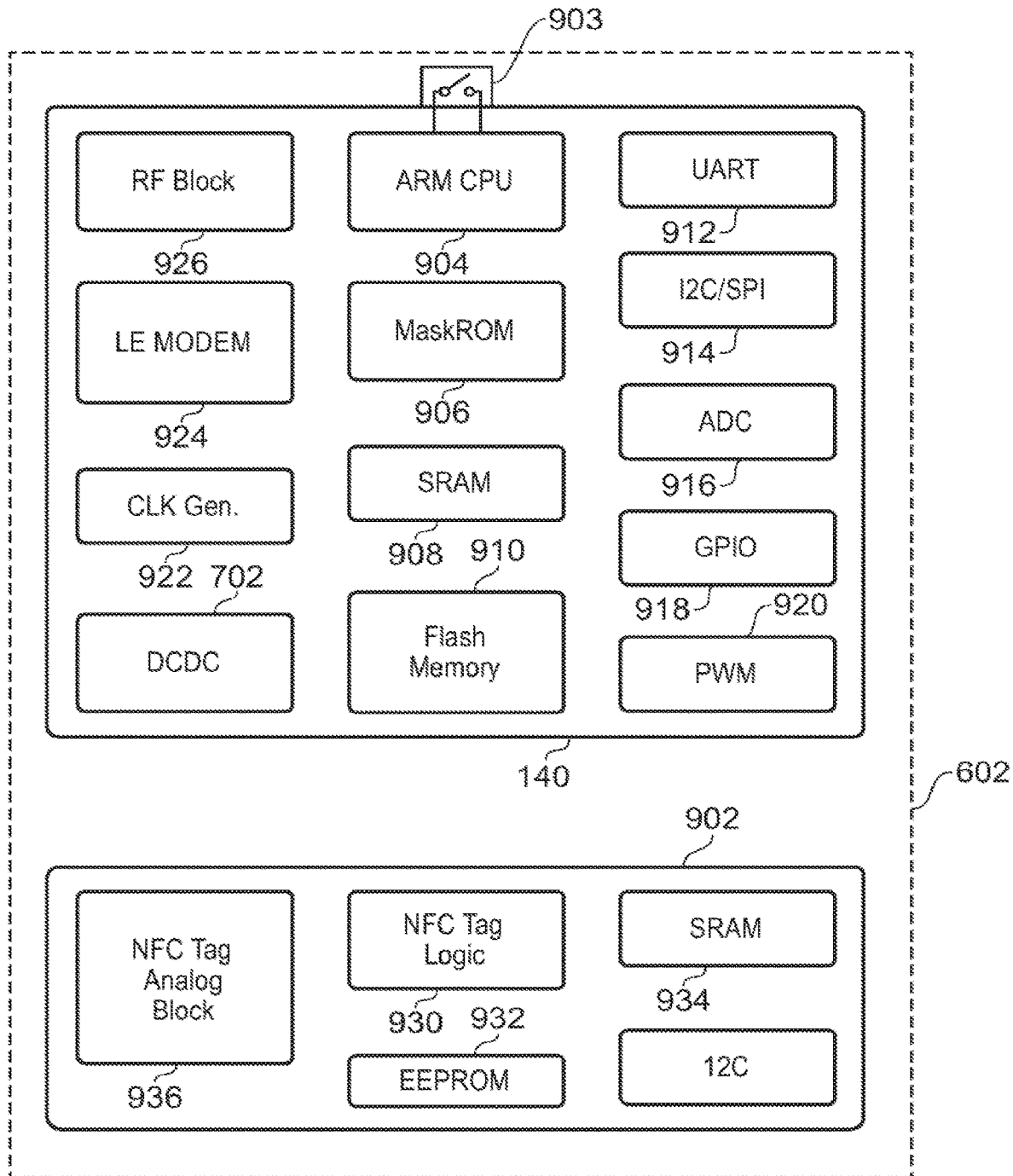
FIG. 6(d) is a schematic block diagram of the internal hardware of the composite tag of FIGS. 6(a) to 6(c)

FIG. 5 is a high-level flow chart illustrating a method 500 of aggregating a distributed BLE sensor system over wireless networks, according to an embodiment. The order of steps and grouping of functions in each step are only examples of many possible variations.

A user profile is created (step 510). An asset list associated with the user profile is uploaded and rules are configured (step 520). An item is enabled as a BLE asset (step 530). To do so, a BLE tag and/or software are set up at the BLE asset. Scan events for BLE assets are reported by distributed BLE sensors (step 540), as described in more detail below. Scan events are analysed using business rules by a BLE server (step 550), also as described below in more detail. Notifications and/or reports are sent based on the analysis (step 560).

In implementing the present invention, techniques disclosed in US 2016/0105762 A1 may be used as appropriate, except as described otherwise hereinafter.

FIG. 6(*a*) shows an external perspective view of the housing 604 of a composite tag 602 according to an embodiment of the invention. The housing 604 may be made of any suitable plastics material and formed by moulding techniques that are well known in the art. The housing 604 may be moulded as a unitary housing, or may be formed by an upper housing portion 606 and a lower housing portion 608 which are joined by suitable plastics welding techniques at joint 610.

In embodiments, the composite tag 602 includes a push button or momentary switch (not shown), operable by a user. Preferably, in order to actuate the switch, the upper housing portion 606 is axially slidable/movable relative to the lower housing portion 608, i.e. so as to act as a push button. Alternatively, ring surface portion 612 or central surface portion 616 is formed of touch sensitive material, or is formed of a resilient material allowing actuation of the switch beneath it by pressing. Further, in embodiments, the composite tag 602 includes, on the housing 604, a visual indicator element 618 that is selectively illuminable in one of a plurality of predetermined colours, e.g. red, green, blue, purple, etc. In one embodiment, the visual indicator element 618 comprises one or more LEDs (not shown) of different colours. In embodiments, the colour of the visual indicator element 618 indicates status (e.g. "restock required") at any given time of a bin or container for assets/inventory to which the composite tag 602 is mounted, as described in further detail below.

FIG. 6(*b*) shows the internal hardware of the tag of FIG. 6(*a*), showing a first side of a circuit board 700. The composite tag 602 includes a battery 702 for powering a Bluetooth™ component, or for pairing a Bluetooth component and an NFC component, which will be described in further detail below.

FIG. 6(*c*) shows the hardware of FIG. 6(*b*), from the opposite side of the circuit board 700. On this side of the circuit board 802 are various electronic components 804 making up the composite tag 602, as will be described in more detail hereinafter.

FIG. 6(*d*) is a schematic block diagram of the internal hardware of the composite tag 602 of FIGS. 6(*a*) to 6(*c*). In accordance with an embodiment of the invention, the composite tag 602 comprises a Bluetooth component 140 and an NFC component 902. The Bluetooth component 140 and the NFC component 902 may be fabricated as separate components and combined onto the same package (circuit board 700), or may be fabricated as an integrated device (chip) (not shown).

Within Bluetooth component 140, CPU 904 is interoperable with memory devices 906, 908 and 910. Further, inputs from the user can be received (by touching/pushing the housing portion 606, i.e. the front of the housing 604; see FIG. 6(*a*)) so as to actuate switch 903, which is coupled to CPU 904. Additional interfaces and/or components 912-920 are also coupled to and interoperable with CPU 904 in a conventional manner, as will be appreciated by persons skilled in the art. A clock signal is provided to the components by clock generator 922, and power is provided thereto by battery 702. Low energy modem 924 and RF block 926, operating under the control of CPU 904, form a Bluetooth wireless interface for the transmission of Bluetooth signals complying with the Bluetooth standard. Preferably, the latter is a two-way wireless interface, but in certain embodiments may be a one-way (transmit only or receive-only) interface. In accordance with embodiments of the invention, this Bluetooth wireless interface is operable in broadcast mode only (i.e. it is incapable of receiving).

The NFC component 902 includes NFC tag logic 930 interoperable with memory devices 932 and 934. An NFC analogue block 936, in use under the control of NFC tag logic 930, provides an NFC wireless interface broadcasting, in use, NFC signals complying with the NFC standard. Preferably, the latter is a two-way wireless interface, but in certain embodiments may be a one-way (transmit only or receive-only) interface.

In accordance with embodiments of the invention, both the Bluetooth component 140 and the NFC component 902 are encoded with an identifier (tag ID) unique to the tag 602, and the IDs for the Bluetooth component 140 and the NFC component 902 are the same.

The Bluetooth wireless interface of Bluetooth component 140 is operable to broadcast Bluetooth signals at intervals, with a periodicity T1. In embodiments, as well as including the tag ID, the Bluetooth signals include measurements detected by temperature, humidity, pressure and/or motion (accelerometer) sensors (not shown) which form part of the Bluetooth component 140 in embodiments of the invention.

The NFC wireless interface of NFC component 902, in use, may broadcast NFC wireless signals including the tag ID under battery power. In any event, NFC component 902 is operable as a passive component, and may, in use, be interrogated by an NFC reader (not shown), in response to which the NFC wireless interface broadcasts the NFC wireless signals including the tag ID.

An issue with some implementations is that the short-range (e.g. NFC) component is always on in order that an asset can be addressed with a short-range (e.g. NFC) reader on an app of the PDA 130. This can places a significant drain on the battery and shorten the battery life.

According to an embodiment, during the manufacturing/assembly process of the tag 602 the short-range (e.g. NFC) component writes the ID (e.g. MAC address) of the long-range (e.g. BLE) component to a passive tag contained in the tag 602 dual bin arrangement and then turns off.

In another embodiment, alternatively or additionally, a write button can also be added on the tag 602 so the short-range (e.g. NFC) component is activated to write/rewrite to the short-range (e.g. NFC) passive tag and then turn off.

This increases the read range/strength of the composite tag and/or dual bin arrangement and means there is no drain on the battery when in use and there is still the flexibility to activate the passive tag again if it was not written to the first time. This provides an important benefit as it solves or reduces battery drain issues while maintaining an improved addressable functionality and still uses the short-range (e.g. NFC) component for initiation within the long-range (e.g. BLE) module.

In another embodiment, a tag 602 is incorporated in a hard hat, bicycle or motorcycle helmet. This enables the tag 602 to record any significant impacts to or drops of the hat/helmet with the integrated accelerometer. In this way, the user may know whether they should purchase a new one, to ensure full protection.

FIG. 7 schematically illustrates an asset tracking/management database (also referred to herein as "asset database") 220, showing the association of users and tag IDs of tags tethered to the users. It can be seen that associated with each user ID 1002, 1004, 1006 are one or more tag IDs generally designated as 1008. Uniquely associated with each tag ID 1008 is an asset ID 1010. There may also be provided in asset database 220 a description 1012 of the asset corresponding to the asset ID 1010. In the particular embodiment illustrated, a first user 1006 (Clarke_A) has one asset (BO-_DRILL 17) associated with him, whereby a single tag ID 1008 (ID 005) is tethered to that user 1006. A second user 1004 has two tag IDs 1008 (ID 002 and ID 016) tethered to his wireless portable device (PDA) 130. However, the first listed user 1002 (Smith_J) has eight tag IDs 1008 tethered to his PDA. That is, in the latter case, a large number of Bluetooth IDs (BTID) are virtually associated with the user (PDA) 1002.

Figure 8A:
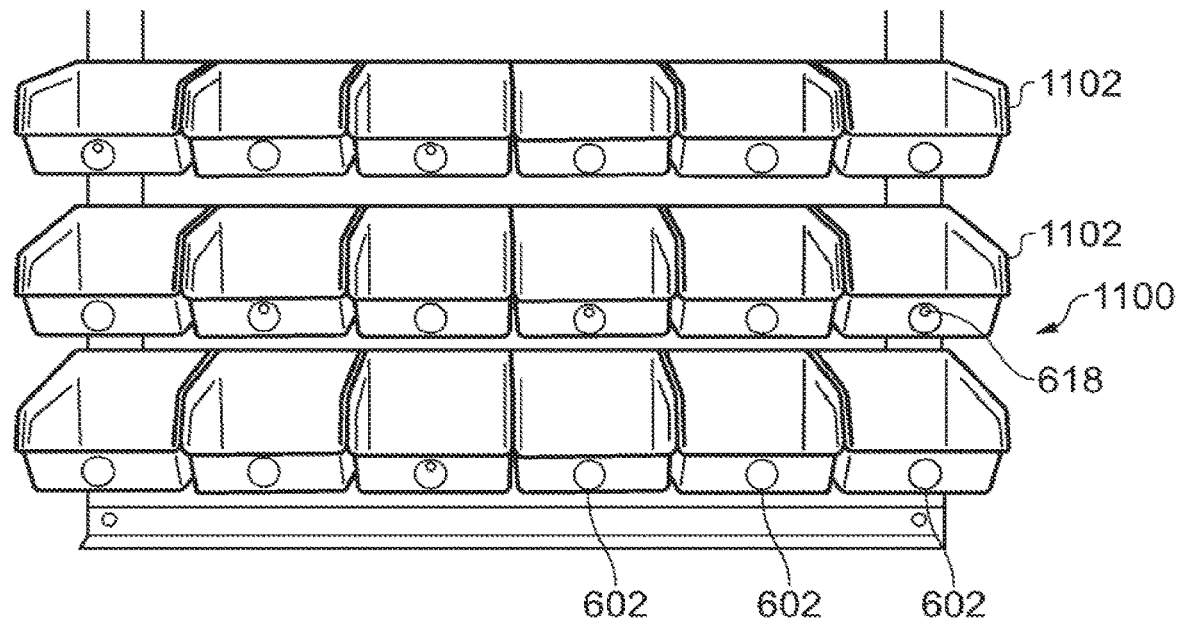
FIG. 8(a) shows a stores arrangement or asset supply arrangement, generally designated 1100, according to an embodiment of the invention.
Figure 8B:
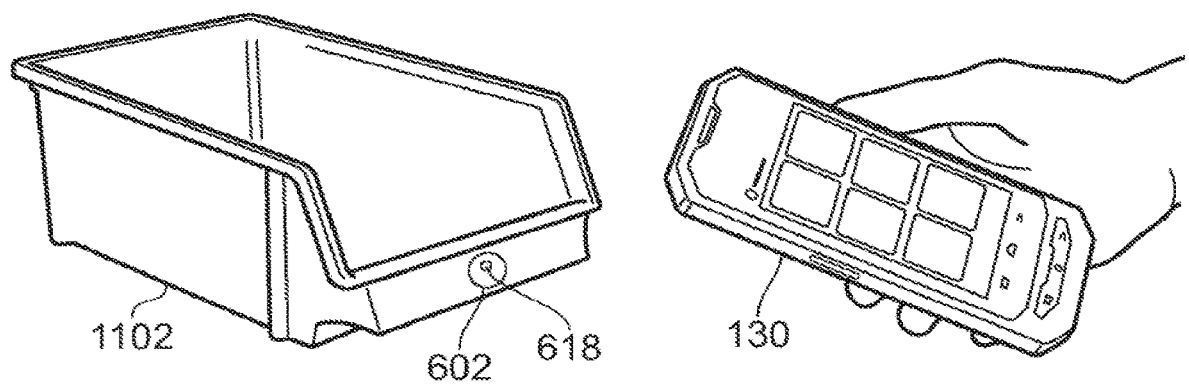
FIG. 8(b) shows the use of a PDA 130 operated by a user in retrieving and returning assets.

FIG. 8(*a*) shows a stores arrangement or asset supply arrangement, generally designated 1100, according to an embodiment of the invention. The asset supply arrangement 1100 comprises a plurality of bins 1102 (here, eighteen) for holding stock items/assets/inventory (not shown) for retrieval or return by a user, and which periodically need to be restocked. For each bin 1102, on a front surface 1104 is mounted a composite tag 602 as described hereinabove, including a visual indicator element 618. FIG. 8(*b*) shows the use of a PDA 130 operated by a user in retrieving and returning assets, the PDA 130 including a short-range (e.g. NFC) interface enabling interaction and communication between composite tag 602 and PDA 130 when the latter is "tapped" on the former, as well as a (e.g. touchscreen) user interface.

For example, in relation to the assets held in a respective bin 1102 corresponding to composite tag 602, such techniques may be used as are described in published UK patent application no. GB2550326—for (i) adding an asset to the asset tracking database of FIG. 7, (ii) for setting up a tether between an asset and a user in the asset tracking database of FIG. 7 and (iii) recording the transfer of an asset from a first user to a second user in the asset tracking database of FIG. 7 of that published UK patent application.

As mentioned above, periodically restocking of bins 1102 is required, and it can be beneficial for this to be performed as soon as possible—to improve productivity and site performance, to expedite repairs and maintenance and even prevent accidents. A problem exists in how to facilitate the notification to a central control computer of the need for a restock of assets in a given bin 1102. In accordance with embodiments of the invention, techniques for such restock notification/alerting are provided.

FIG. 9 is a flow chart showing processing and communication steps involved in restocking of the asset supply arrangement 1100 of FIG. 8, according to an embodiment, i.e. (a) at a composite tag 602, (b) at a wireless access point 120, (c) at a central control computer (BLE server) 110 and (d) at a user device (PDA) 130. The wireless access point 120 may comprise a Bluetooth enabled access point, and/or may comprise a wireless and/or Bluetooth enabled tablet computer or fixed reader tile device. More particularly, the wireless access point 120 may comprise a Bluetooth enabled Android access point.

In this embodiment, a user is able (e.g. upon seeing that they have removed the last asset from a bin 1102, or upon arriving to find no assets remaining in the desired bin 1102), by pushing button 903 on composite tag 602 twice within a predetermined period (or another gesture, such as a push and hold for a predetermined period), to trigger the sending of a "Restock request" message by the composite tag 602 to the central control computer (BLE server) 110. The message may be sent via the wireless access point 120 and/or via one or more further composite tags 602 functioning in a mesh network.

In the following, where reference is made to a hardware entity performing a task, it will be appreciated that this is implemented, where appropriate, by processing circuitry of that entity. Further, in each of the flow charts, it will be appreciated that, where appropriate, acts or blocks may be performed in a different order, and not all acts or blocks are necessarily essential, but depend on the functionality being provided.

Returning to FIG. 9(*a*), initially, the tag 602 waits for a communications (comms) input from one of its interfaces (block 901). If such input is received, it is determined what type of input is received (block 902).

If it is determined at block 902 that the PDA (i.e. PDA's App) has scanned (the tag 602), the tag 602 sends the Tag ID via short range interface (e.g. NFC) to the PDA (App) (block 903). Next, it is determined (block 904) whether the PDA (App) has sent a Setup or Restock Complete message. If it is a Setup message, no action is required as the Tag ID is already broadcast, as indicated at block 909.

If on the other hand, it is determined at block 904 that the PDA (App) has sent a Restock Complete message, then the tag 602 Receive valid NFC restock complete message from App (block 905), Set Status to Restock Complete (block 906) and Set Status to Normal after a set time (e.g. midnight) (block 907).

Returning to block 902, if the communication input received is that a button on the tag 602 has been pushed once (for Status), processing proceeds to block 910 where a determination is made as to the current status. In this embodiment, if the status is Restock Pending, the tag 602 lights its visual indicator elements (e.g. LEDs) to a first predetermined colour (e.g. orange) for a predetermined period of time, e.g. 10 seconds (block 911). If the status is Restock Acknowledged, the visual indicator elements are lit by the tag 602 in a second predetermined colour (e.g. purple) for the predetermined period (block 912). If, on the other hand, the status is Restock Complete, the tag 602 lights the visual indicator elements to a third predetermined colour (e.g. green) for the predetermined period (block 913). Finally, if the status is Normal, the tag 602 lights the visual indicator elements to a fourth predetermined colour (e.g. blue) for the predetermined period (block 914).

In embodiments, the status indications by the visual indicator element may be described as follows.

- No lit LED's signify that it is inactive. Pressing the button once will activate the LED to display procurement status.
- A quick flashing orange LED indicates that the access point 120 has been activated through pressing the tag twice. The tag transmits a reorder signal to the CCC 110.
- A slow flashing purple LED indicates that the tag has received a message from the CCC 110, acknowledging that it has received the reorder message.
- To replenish the bin the restocker scans the NFC component of the tag and selects restock in an app on his PDA 130. A green flashing LED indicates restocked and normal status.
- The LED automatically flashes blue to show a normal status at midnight on the day of a restock. The app can also flash a tag blue when the bin/item is being searched.

Referring to FIG. 9(*a*) (Continued), if it is determined at block 902 that the communication input received corresponds to a button on the tag 602 being pushed twice (for Replenishment), processing proceeds to block 915 where a determination is made as to the current status. If it is determined that the status is Restock Pending or Restock Acknowledged, then no action is required as the tag 602 has already requested a restock (indicated at block 916), and if the user presses the button repeatedly, the visual indicator elements are turned off for a predetermined time period (block 917).

If, however, the status determined at block 915 is Normal or Restock Complete, then the tag sets the status to Restock Pending (block 918) and sends its Tag ID and Restock Pending status to the wireless (e.g. Bluetooth) access point 120 (block 919).

If the communication input is determined at block 902 to be sensor data (including, e.g., battery level), then the tag acquires the sensor/battery information at timed intervals or in response to an event (block 920). Then, the tag 602 sends its Tag ID and sensor data to the wireless access point 120 (block 921).

If the communication input is determined at block 902 to be a message received from the wireless access point 120, a determination is made (block 922) as to what the message is that has been received. If the message is a firmware update message, then the firmware is updated at block 923. If the message is a message to light or illuminate a visual indicator element (e.g. LED), the visual indicator element is lit by the tag 602 in a colour corresponding to the current status for a predetermined period at block 924. If the message received is a Restock Acknowledged message, the tag updates the tag status to Restock Acknowledged (block 925).

Referring to FIG. 9(*b*), this shows the processing carried out at the (wireless) access point 120. First, the access point 120 waits for a communications input (block 926). If a communication is received, a de-termination is made (block 927) as to whether the communication (message) is from the CCS 110 (e.g. via the internet) or from the tag 602 (e.g. via Bluetooth). If the message is from the tag 602, the access point 120 receives the Tag ID, sensor data and restock status (block 928). Next, the Tag ID, sensor data (reading) and status update are sent to the CCS 110 (e.g. via the internet).

If, on the other hand, it is determined at block 927 that the message is from the CCS 110, a determination is made at block 930 as to what type of message has been received. If the received message indicates (as well as Tag ID) that the status is Restock Acknowledged, then the status update (Restock Acknowledged) is sent to the tag 602 (e.g. via Bluetooth). If, on the other hand, it is determined at block 930 that the message is an illumination message (i.e. commanding the lighting of a visual indicator element), then the access point 120 sends the illumination message (light LED command) to the tag 602 (e.g. via Bluetooth) (block 932).

Referring to FIG. 9(*c*), this shows the processing carried out at the central control system (CCS) 110. Initially (block 933), the CCS 110 waits for a communications input. If a communication is received, a de-termination is made (block 934) by the CCS 110 as to what function has been performed. If the function is to add a user, part or location, then the user, part and/or location are added or amended by the CCS 110 (e.g. via internet browser) (block 935). Next, the user and/or parts (and possibly location) are added to (or amended in) the appropriate database at block 936; the latter may include a parts data-base 937, a users database 938 and/or a location database 939. Once the parts/users information has been added to the database(s), the user, parts and/or location data is sent to the PDA (App), e.g. via the internet, either at timed intervals or when a synchronisation (sync) is requested from the PDA (App) (block 940).

Returning to block 934, if it is there determined that the function that has been performed is the receipt of a message from the wireless (Bluetooth) access point 120, then at block 941 a location field is updated (in location database 939) with status and/or sensor information (reading). Next, a determination is made by the CCS 110 as to whether the tag status is Restock Pending (block 942). If the status is not Restock Pending, then the process ends.

If, on the other hand, the status is determined at block 942 to be Restock Pending, then the CCS 110 sends the Tag ID and status Restock Confirmed to the wireless access point (block 943). Then, the CCS 110 places the part, location and fixed Reorder Quantity for the part on a Restock Report (block 944), which is output at block 945.

Referring to FIG. 9(*c*) (Continued), if it is determined at block 934 that the function that has been per-formed is a receipt of a message from the PDA (App) 130, then processing proceeds to block 946. Here, a determination is made as to what type of message has been received. If the message is a New Tag Setup message, then at block 947 a location reference (location ID), Tag ID and/or part assigned are received. Next, the Tag ID, (assigned) part number are added to the relevant location (entry) in a location table in the location database 939 (block 948).

If at block 946 it is determined that the received message is a Restock Complete message, then at block 949 a field in the location database 939 is updated to flag a bin or part with the tag number (Tag ID) that has been set to status Normal. Then, the part, location and fixed Reorder Quantity are re-moved for this part from the Restock Report based on the part and location (ID) received from the location database 939 (block 950).

If it is determined at block 946 that the received message is an illumination message (e.g. to light a visual indicator element) of a tag 602, then an illumination message (request) with the appropriate Tag ID is sent to the wireless access point (bock 951).

Figure 9A:
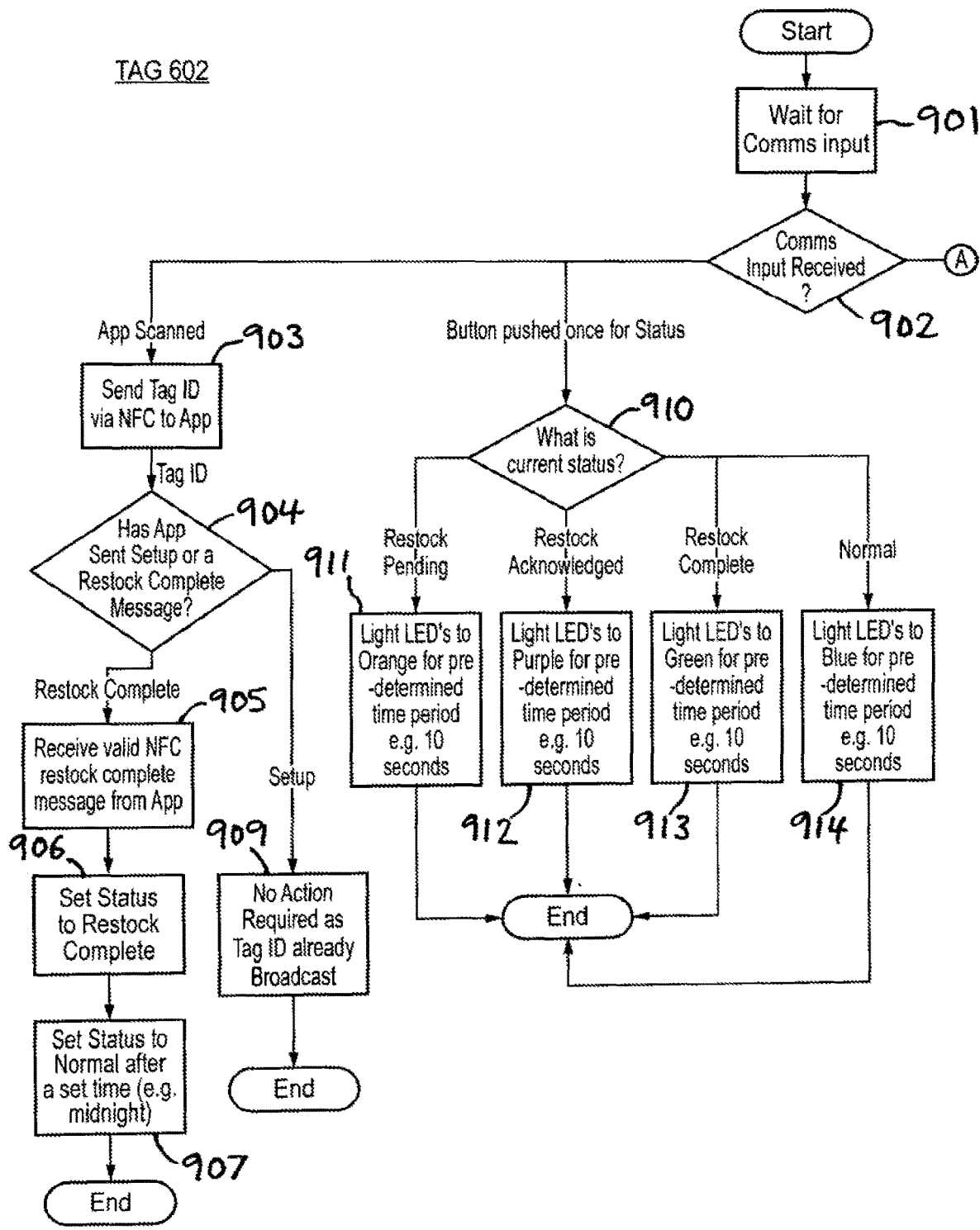
FIG. 9(a)-9(d) are examples of flow charts showing processing and communication steps involved in restocking of the asset supply arrangement 1100 of FIG. 8(a), according to an embodiment.
Figure 9A:
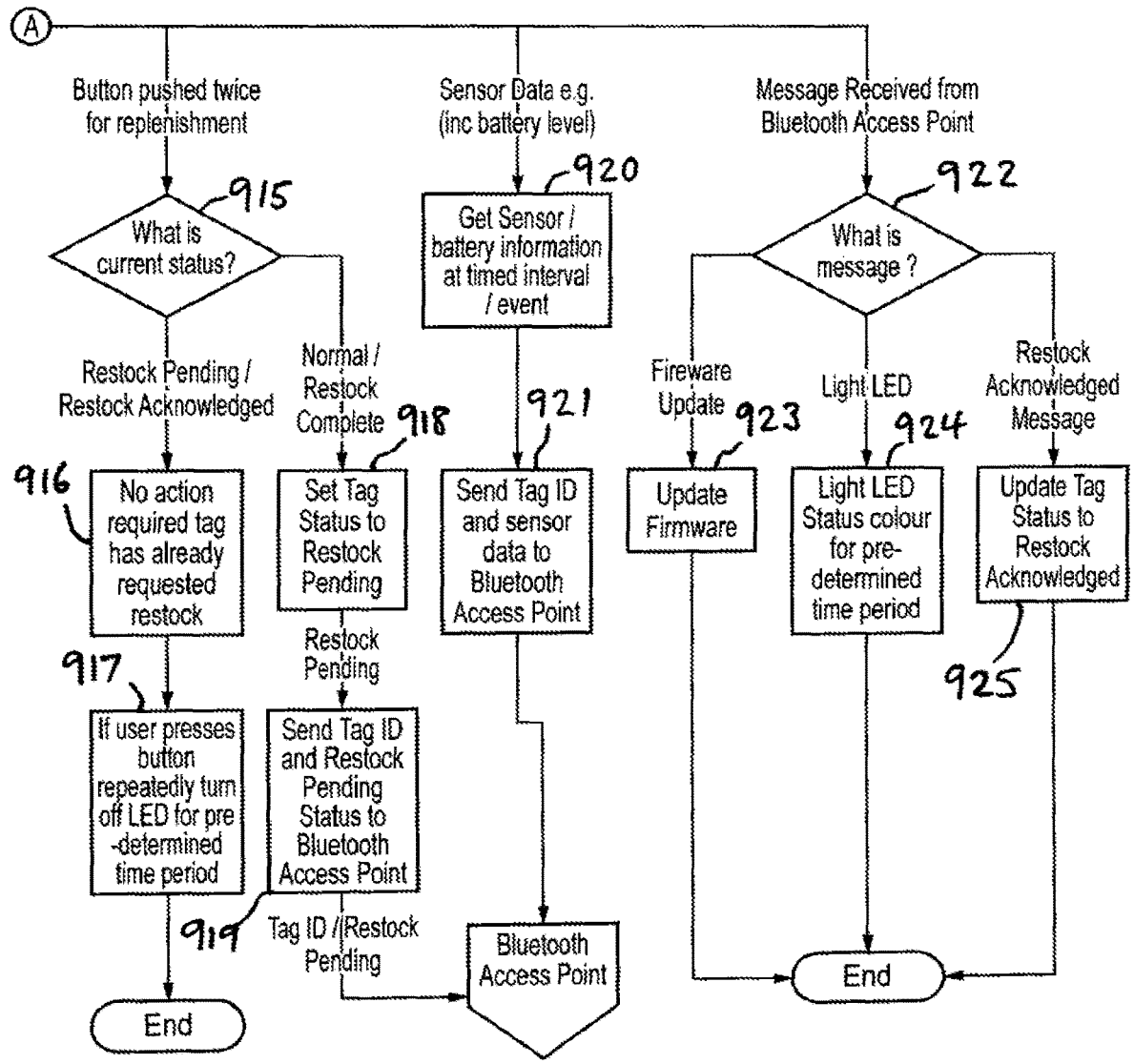
Figure 9B:
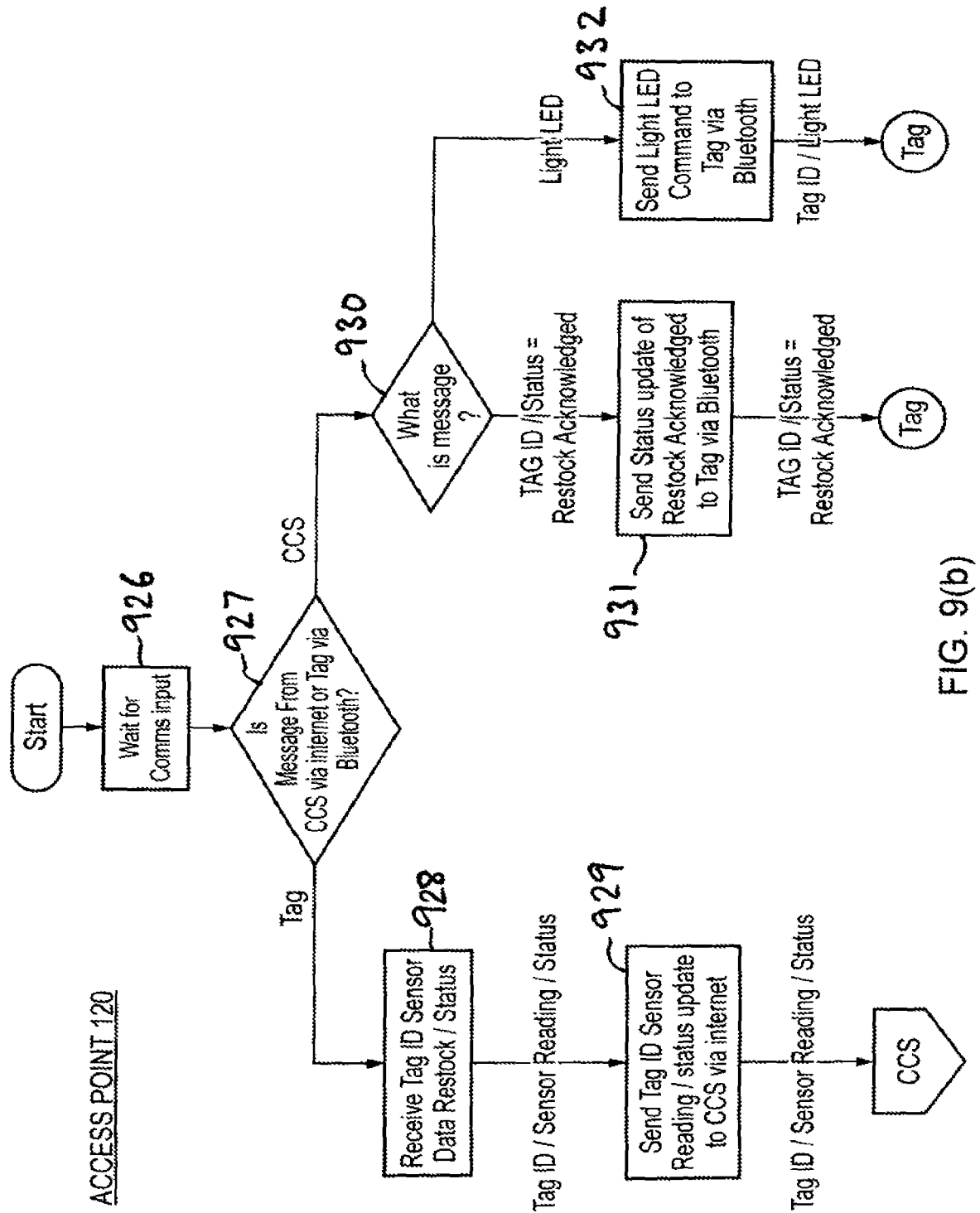
Figure 9C:
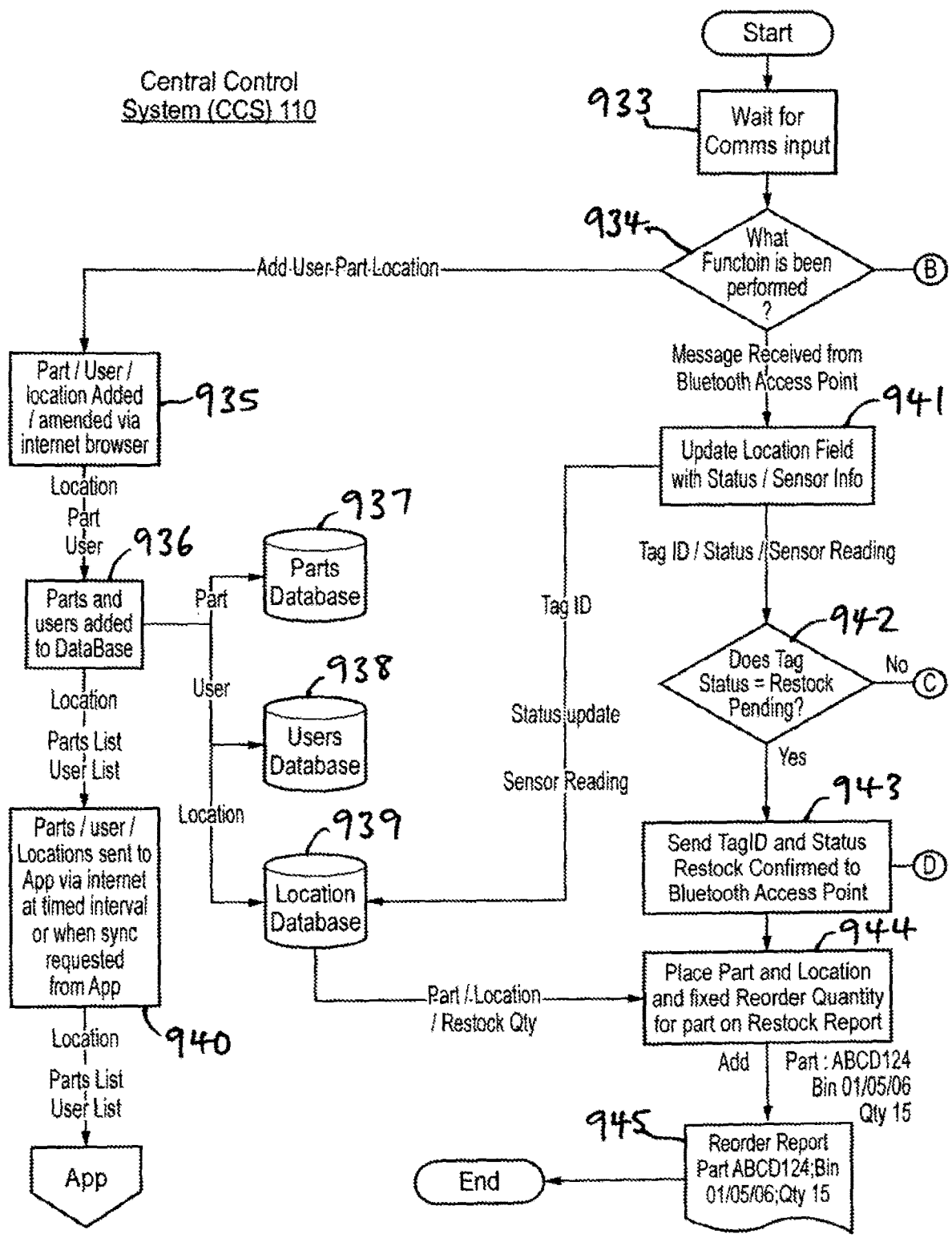
Figure 9C:
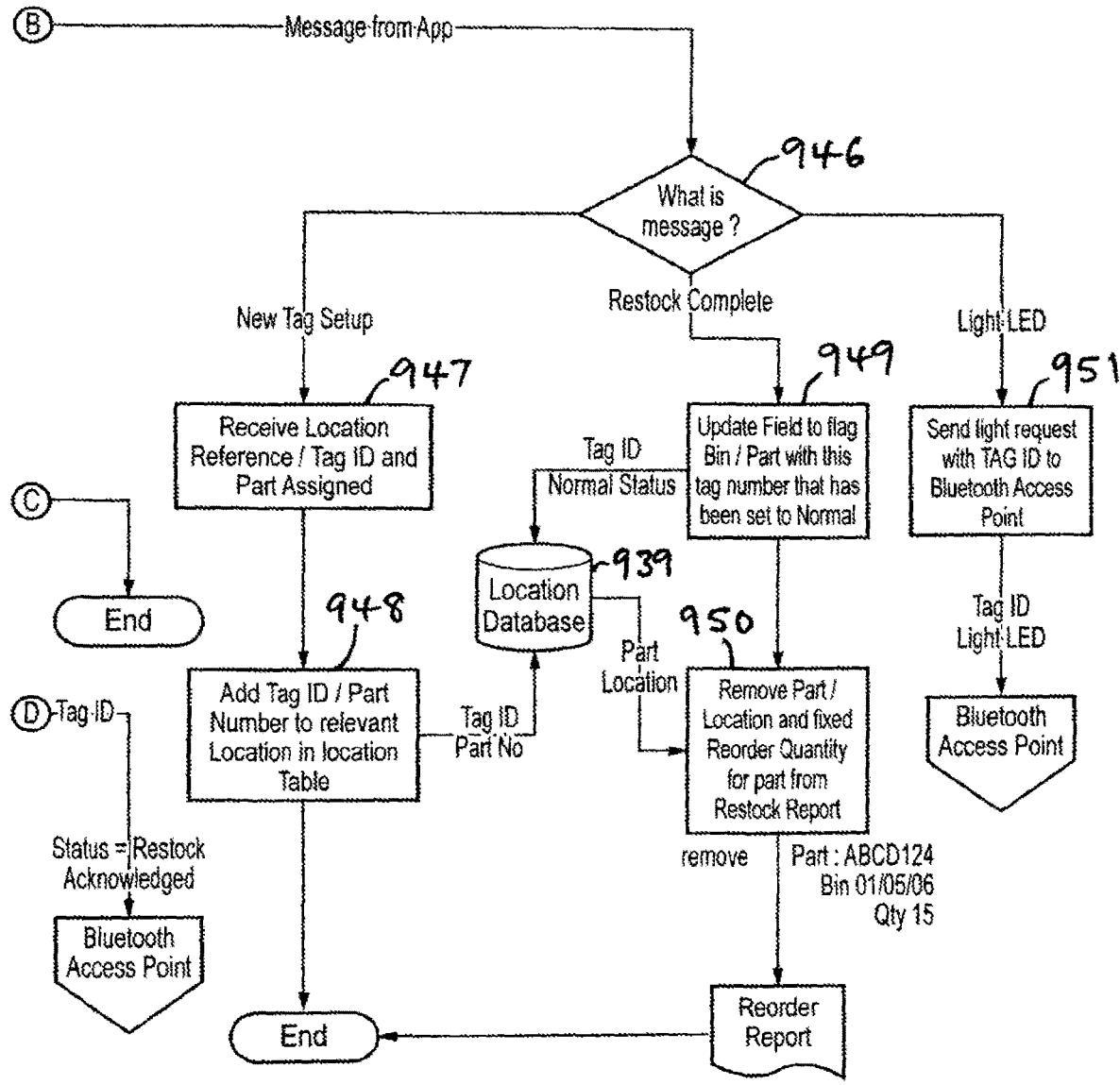
Figure 9D:
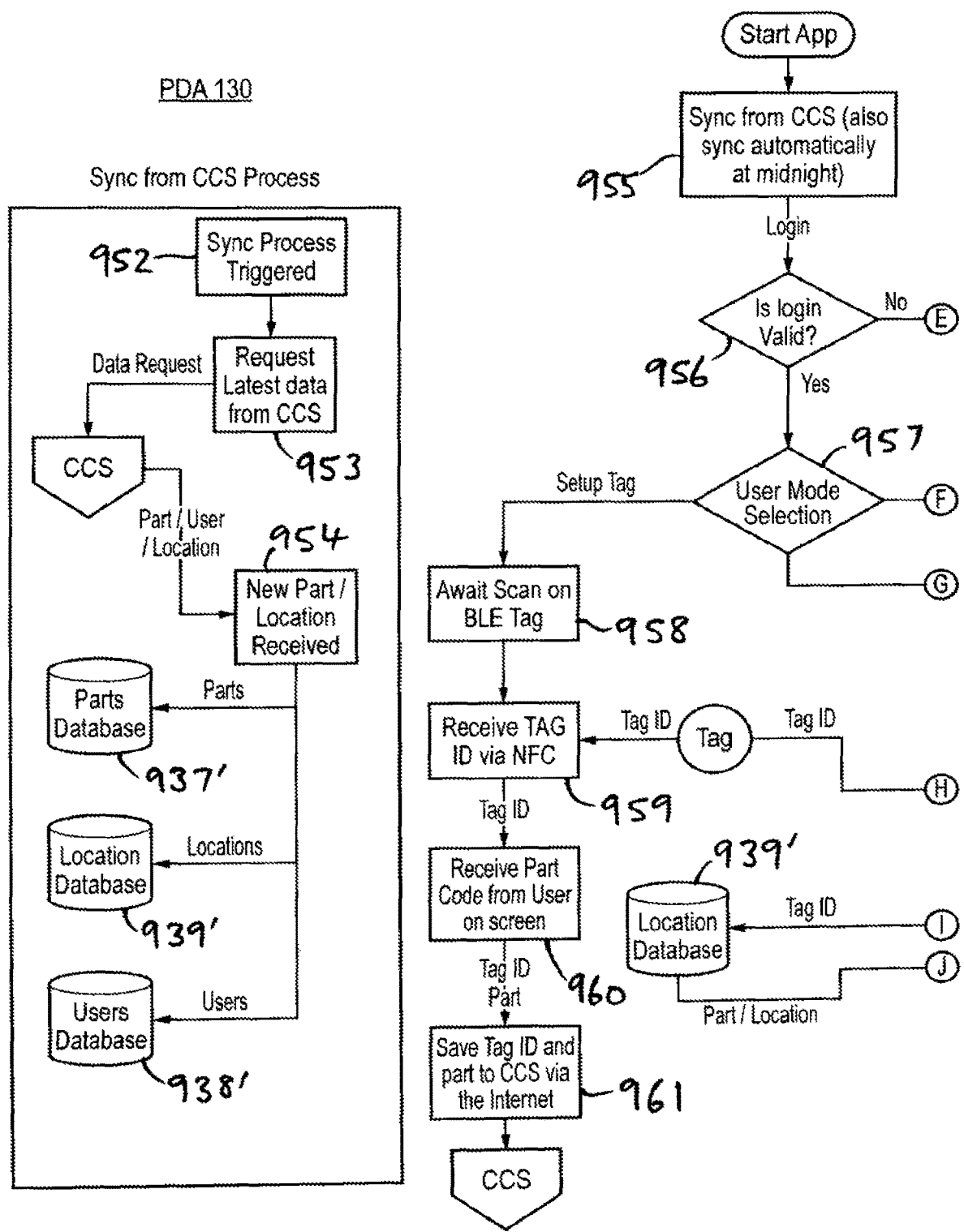
Figure 9D:
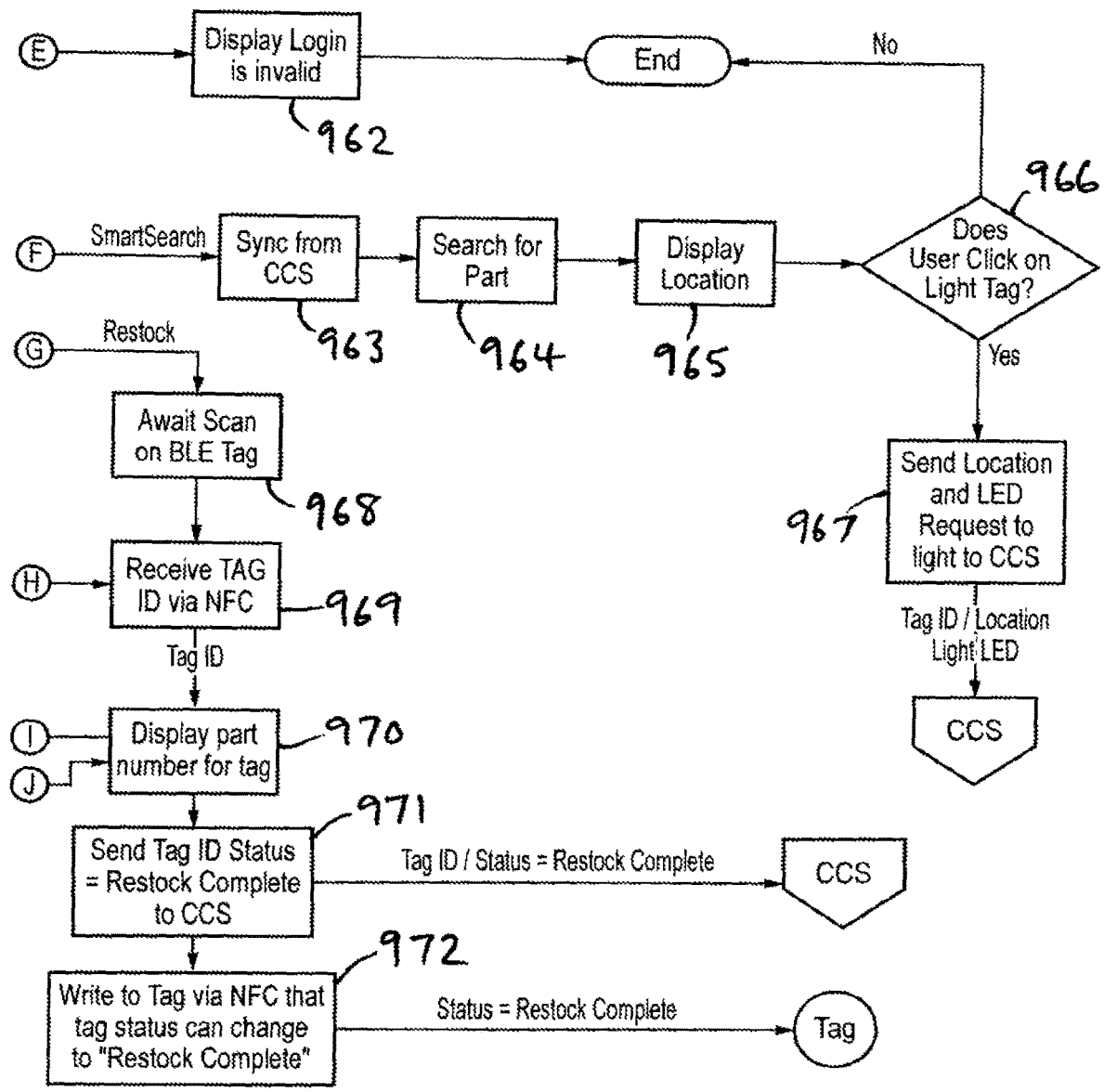

Referring to FIG. 9(d), this shows the processes carried out at the PDA 130. On the left-hand side in FIG. 9(d) are illustrated the steps for syncing from the CCS process. In particular, the sync process is triggered at block 952 and a request is sent by the PDA 130 to the CCS to request the latest data (part, user and/or location) (block 953). The new part, location and/or user data is received from the CCS at block 954 and may be written to a parts database 937', location database 939' and/or users database 938', mirroring the corresponding databases 937-939 of the CCS 110.

Referring to the right-hand side in FIG. 9(d), first a sync is initialised from the CCS 110 at block 955. As noted, a sync may also automatically occur, for example daily, at midnight. Next, a determination is made (block 956) as to whether the login at the PDA 130 is valid. If it is not valid, a message "Login is invalid" is displayed to the user (block 962), as indicated in FIG. 9(d) (Continued).

If, on the other hand, it is determined at block 956 that the login is valid, a determination is then made (block 957) as to what mode has been selected by the user. If the mode selected is Setup Tag, the PDA awaits the scan of a tag (e.g. via BLE) at block 958. Next, the PDA 130 receives a Tag ID via its short-range interface (e.g. NFC) at block 959. Then, the PDA 130 receives a part code from the user via the screen (which may be a GUI-based touchscreen user interface) at block 960. The Tag ID and part (code) are then saved to the (appropriate database of the) CCS 110, for example via internet communication at block 961.

If it is determined at block 957 that the mode selected by the user is a search function (e.g. "SmartSearch"), then a sync from the CCS is performed at block 963. Then, a search is performed for a part indicated in the search request received from the user at block 964. Upon receipt of the search results, the part (ID) or multiple parts (IDs) are displayed to the user on the PDA 130 in association with a location at which they may be found (block 965). The PDA 130 then awaits further input from the user. A determination is made (block 966) as to whether the user has selected (e.g. by clicking on an element of the graphical user interface) indicating a desire to indicate (e.g. illuminate) the tag 602 (corresponding to the desired part). If such a selection has not been made by the user, then the process ends. However, if it has been determined at block 966 that the user has made such a selection (to light a tag 602), then at block 967 the PDA 130 sends a location (ID) and an illumination request (message) to the CCS 110 requesting that the tag 602 of the desired part be illuminated, e.g. via its visual indicator element (e.g. LED).

If it is determined at block 957 that a mode selected by the user on the PDA 130 is RESTOCK, indicating a desire to restock or replenish a bin, for example, then the PDA 130 awaits the scan of a tag 602 at block 968, e.g. via BLE. Next, at block 969, the PDA 130 receives the Tag ID from the tag 602 via its short-range wireless interface, e.g. NFC. The part number for that tag is then displayed by the PDA 130 at block 970. This part number may be acquired by the PDA 130 by sending the Tag ID as a query to the location database 939' and receiving in response the part and/or location ID (as seen in FIG. 9(d)).

Returning to FIG. 9(d) (Continued), after block 970 the PDA 130 then sends the Tag ID and status "Restock Complete" to the CCS at block 971. Finally, at block 972, the PDA 130 writes to the tag 602 via its short-range interface (e.g. NFC) that the tag status can change to "Restock Complete".

FIG. 10(a) shows an asset supply arrangement 1100' affording "Restock request" message transmission, according to another embodiment. In this embodiment, a dual-bin arrangement 1102' is used, the dual-bin arrangement 1102' having a housing 1104 in which an upper space 1106 and a lower space 1108 are defined. Both the upper space 1106 and the lower space 1108 are able to hold assets 1110. On a visible (here, front) surface 1112 of the housing 1104 there is mounted an asset tag (i.e. composite tag 602 as described hereinabove). In use, a storeman can restock upper space 1106 via (lockable) transparent flap 1114, and users can remove and return assets 1110 from lower space 1108 via transparent flap 1116.

Referring especially to FIG. 10(b), divider 1118 having user operable handle 1119 is configured to move between a first position (dotted line in FIG. 10(c)), in which the divider 1118 forms a floor of the upper space 1106, and a second position, in which the upper space 1106 and a lower space 1108 are contiguous, thereby enabling assets 1110 to fall from the upper space 1106 to the lower space 1108. As seen especially in FIG. 10(c), a switch 1120 located on the housing 1104 is activated as the divider moves out of the first position. That is, reed 1122 moves from a closed position (dotted line in FIG. 10(c)) to an open position (solid line), whereupon a restock signal is transmitted to the tag 62, thereby triggering the sending of a restock message by the tag 602 to the wireless access point 120, as described above. In one embodiment, the restock signal is sent wirelessly from switch 1120 to tag 602 by wireless (e.g. NFC-based) transmitter 1124. Once sent, the visual indicator element may change colour (e.g. from green to orange) to indicate that a restock is pending. As seen in FIG. 10(d), the storeperson may restock upper space 1106 with assets 1110 by opening upper flap 1114. Following such restock, the visual indicator element may change colour (e.g. from orange to green) to indicate that a restock has been done and the arrangement is in a "system ready" state.

Referring briefly to FIGS. 16 to 21, these show a dual bin arrangement according to another embodiment, (a) in perspective view and (b) in side view, at various stages of operation.

In this embodiment, within the tag-based module of the dual bin arrangement 1102" a reed switch can be disposed on a side (e.g. right hand side) of the module and a pop up flag member 1602 contains the magnet 1604 towards the end thereof. This means when the slider (divider) 1118 is pulled out, the flag member 1602 pops, up breaks the circuit, and activates the wireless access point 130 for a reorder (i.e. Restock Request).

Figure 16B:
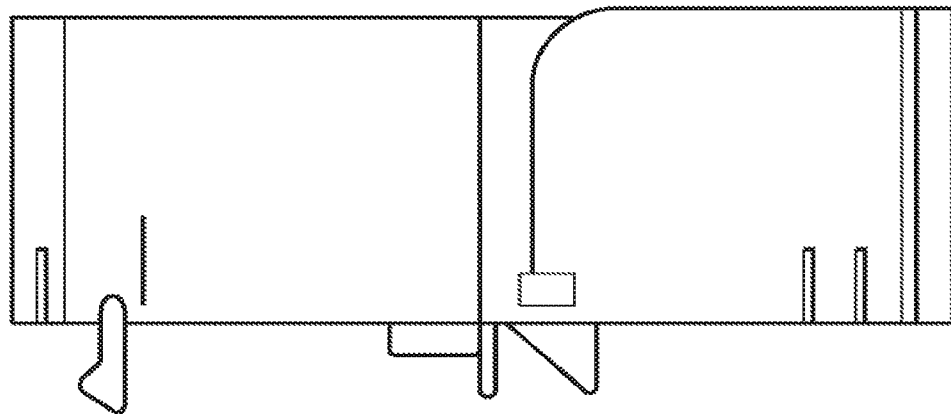
Figure 16A:
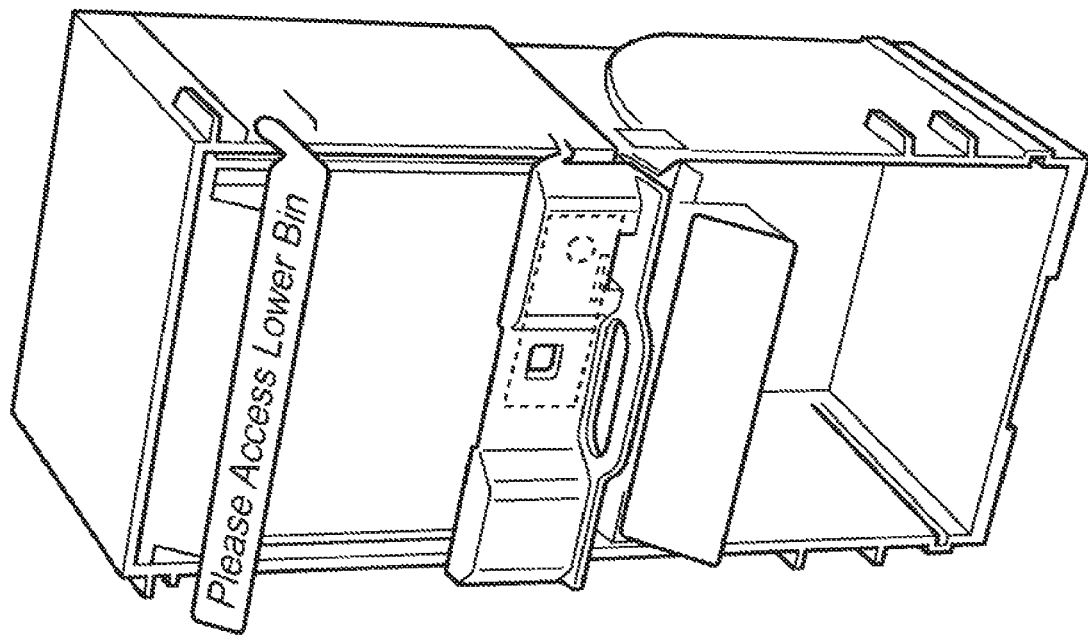
Figures 20A, 20B:
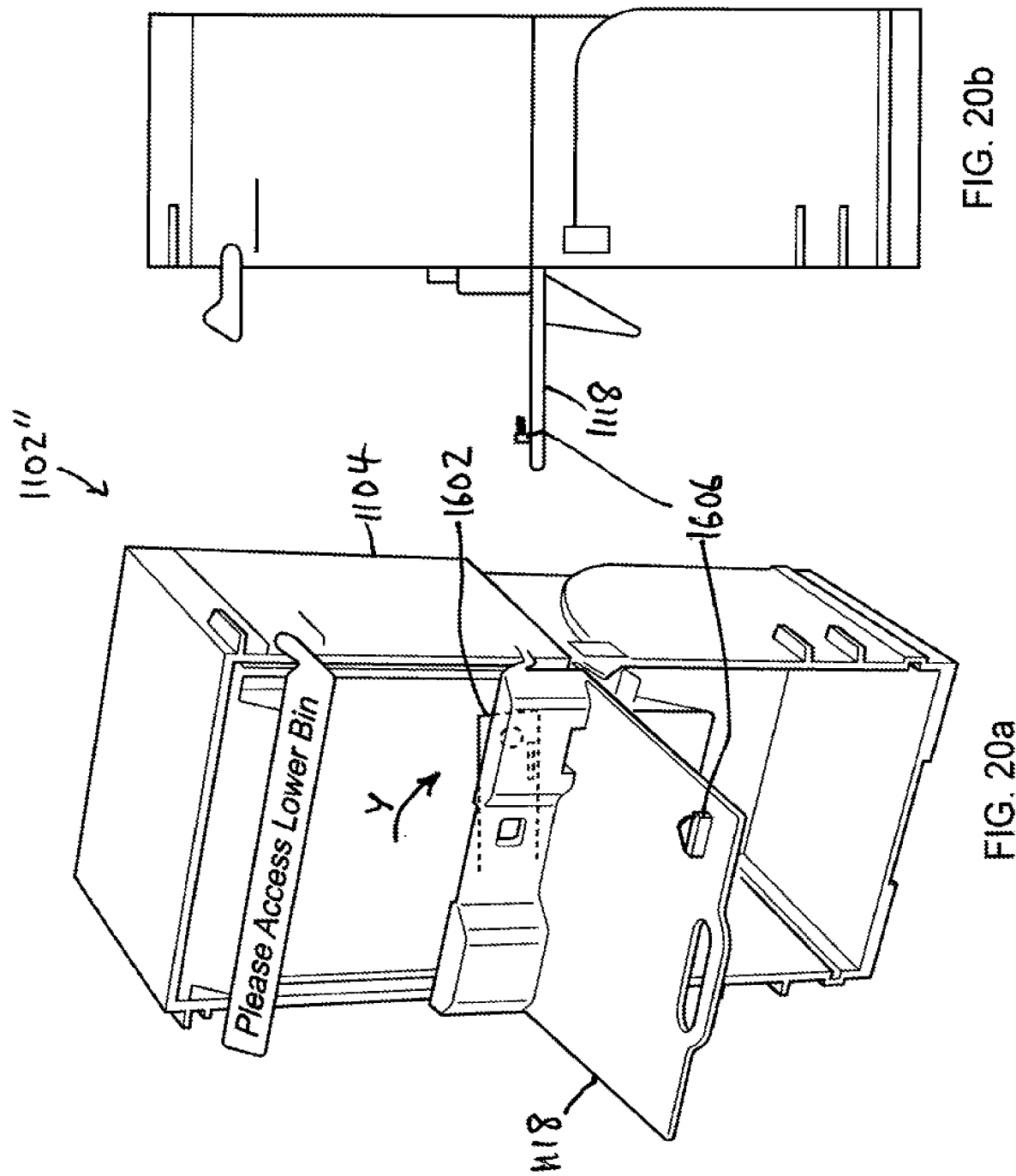

More particularly, and referring to FIGS. 16 to 21, a flag member 1602 is movable between a latched position (FIG. 16(a)) and an indicating position (FIG. 19(a)). The flag member may be urged under bias (e.g. spring (not shown), such as a coil spring) into the indicating position. The flag member 1602 may be rotatable (about an axis through point A in FIG. 16(a)) so as to be substantially horizontal in the latched position and substantially vertical in the indicating position The flag member 1602 may be held in the latched position by a tag 1606 on the divider 1118 when the divider 1118 is in a first (inserted) position. The flag member 1602 is released and movable (in the direction of arrow X in FIG. 18(a)) under the bias as the divider 1118 moves out of the inserted position. After restocking in the upper bin, the flag member 1602 may be returned to its latched position (FIG. 21) by rotating the flag member 1602 in the direction of arrow Y in FIG. 20, while the divider is reinserted so that the tag 1606 engages the flag member 1602.

A switch (not shown), e.g. including short-range and/or long-range wireless interfaces, is installed in the housing 1104, e.g. adjacent the distal end of the flag member 1602. The switch includes a reed switch and the flag member 1602 includes in or on a portion thereof a magnet 1604. The magnet may act to maintain the reed switch closed when the flag member 1602 is held in the latched position. The reed switch may go open as the flag member 1602 is released and moves out of the latched position.

In an embodiment, the flag member 1602 is rotatable so as to be substantially horizontal in the latched position and substantially vertical in the indicating position.

Returning to FIG. 11, this is a flow chart showing processing and communication steps involved in restocking of the asset supply arrangement 1100 of FIG. 10, or the dual bin arrangement of FIGS. 16 to 21, according to an embodiment, i.e. (a) at a composite tag 602, (b) at a wireless access point 120, (c) at a central control computer (BLE server) 110 and (d) at a user device (PDA) 130. This is the same as the embodiment of FIG. 9, with the exception, essentially, that the "Restock request" message is triggered via actuation of the switch 1120 as acted upon by (motion of) divider 1118. The wireless access point 120 may comprise a Bluetooth enabled access point, and/or may comprise a wireless and/or Bluetooth enabled tablet computer or fixed reader tile device. More particularly, the wireless access point 120 may comprise a Bluetooth enabled Android access point.

Figure 11A:
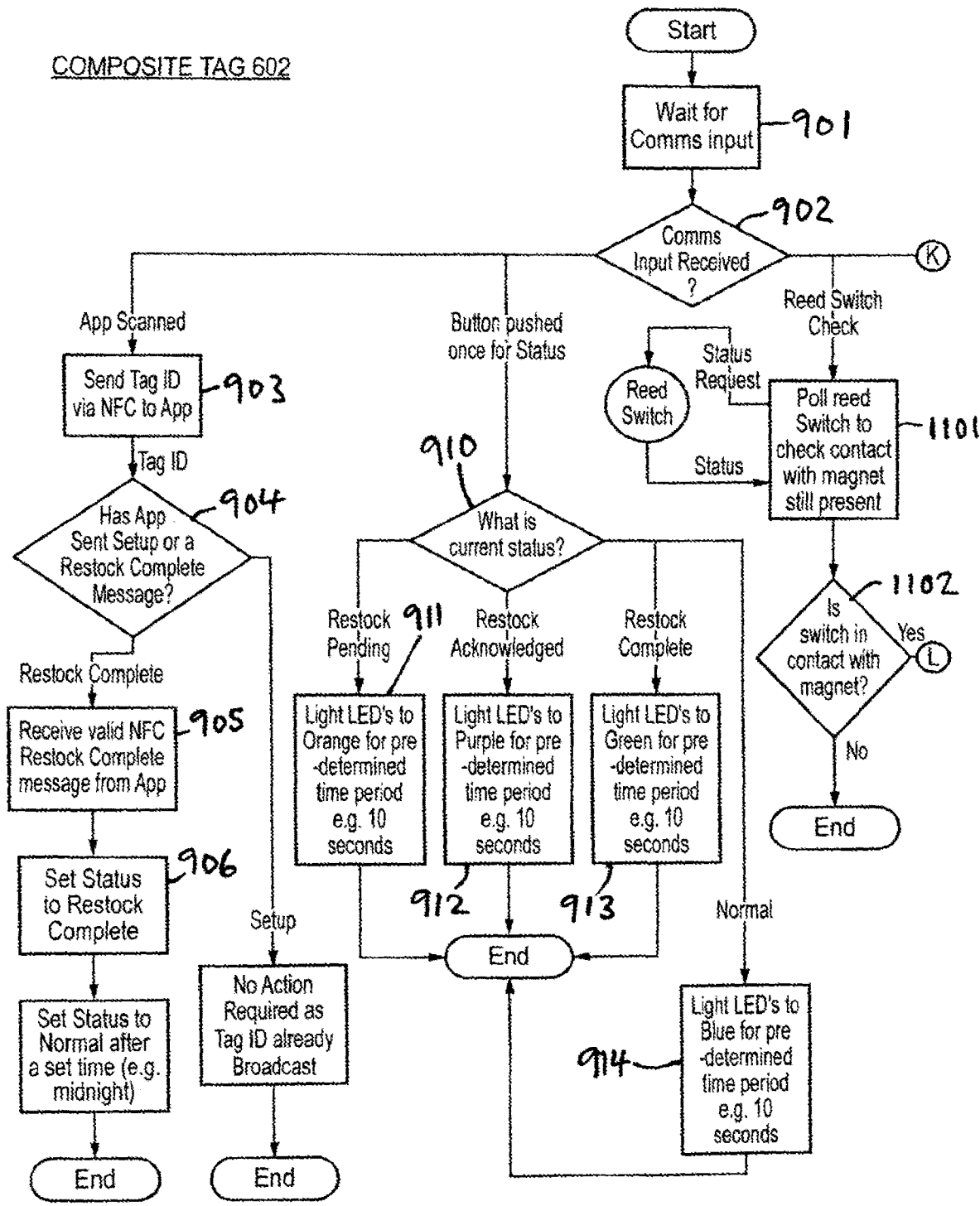
FIGS. 11(a)-11(d) are examples of flowcharts showing processing and communication steps involved in restocking of the asset supply arrangement 1100 of FIGS. 10(a)-10(d), according to an embodiment.
Figure 11A:
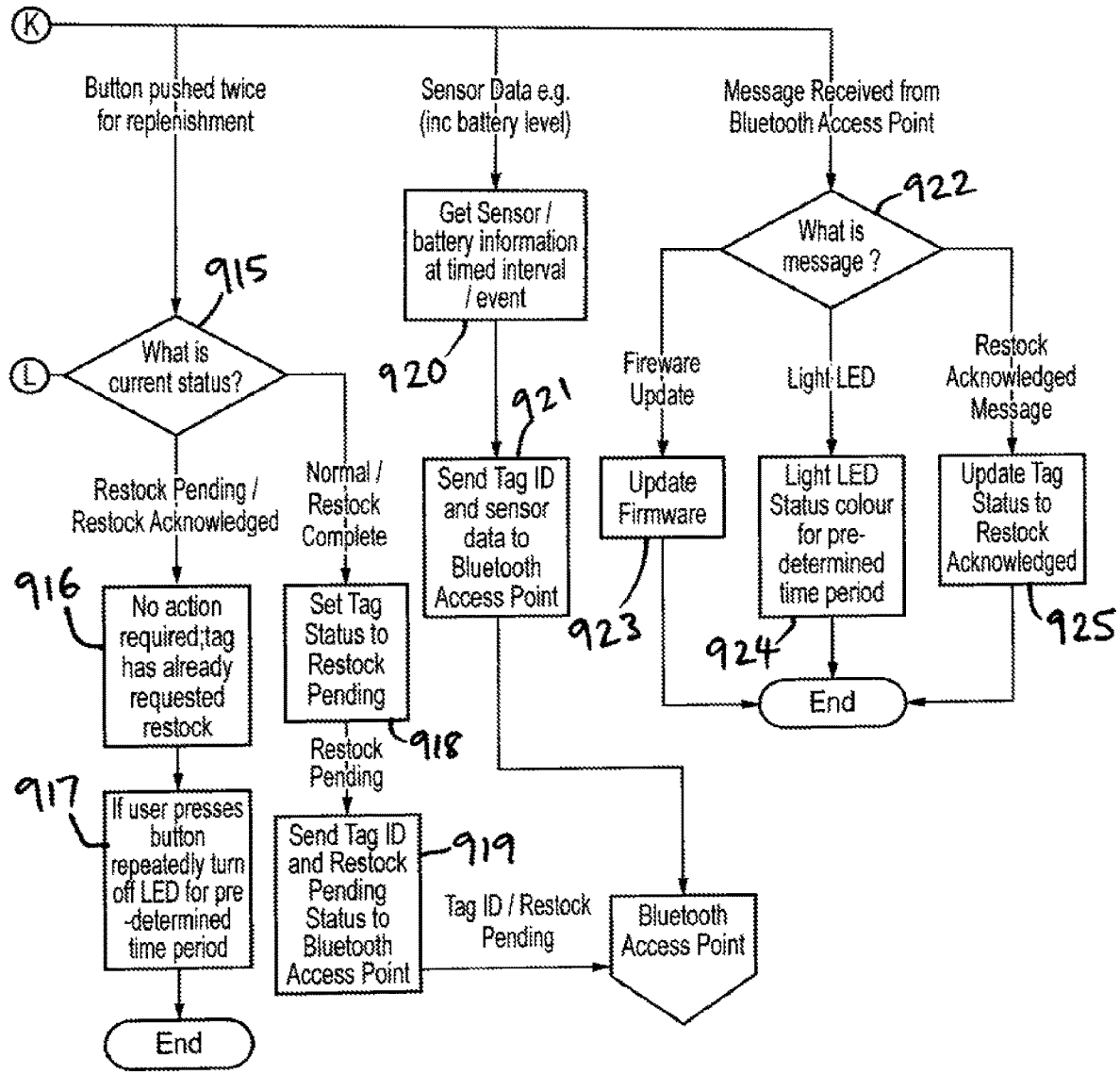
Figure 11B:
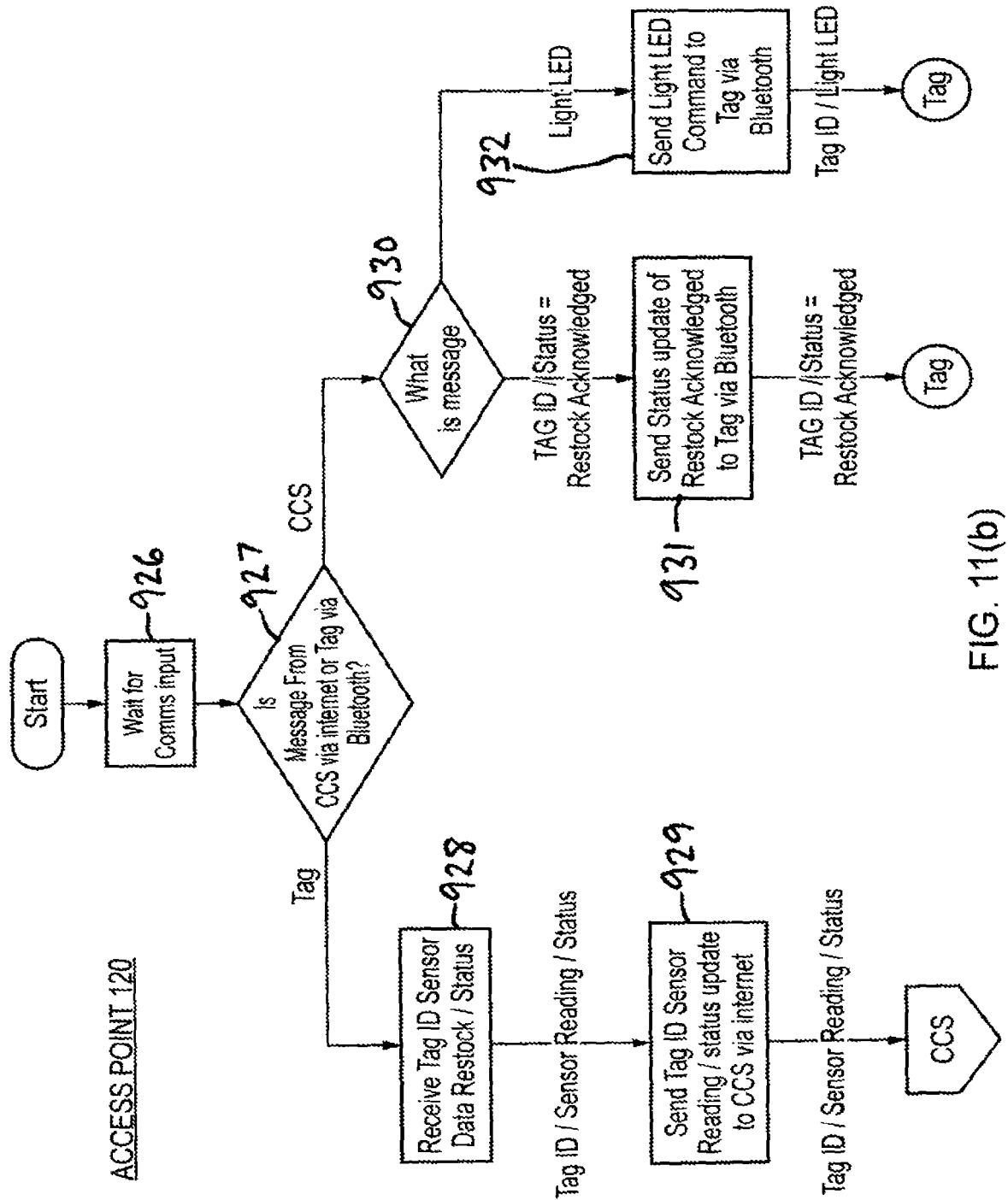
Figure 11C:
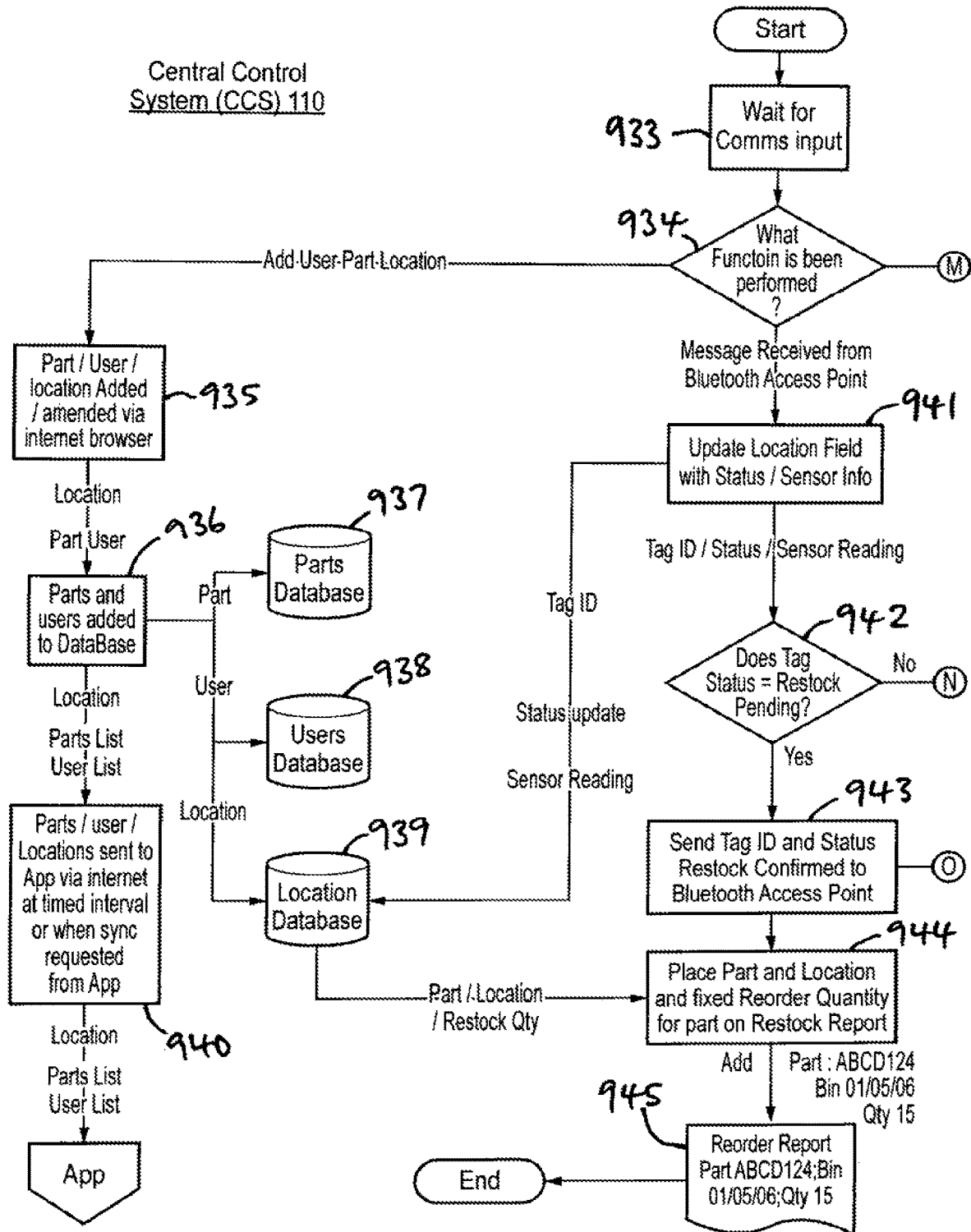
Figure 11C:
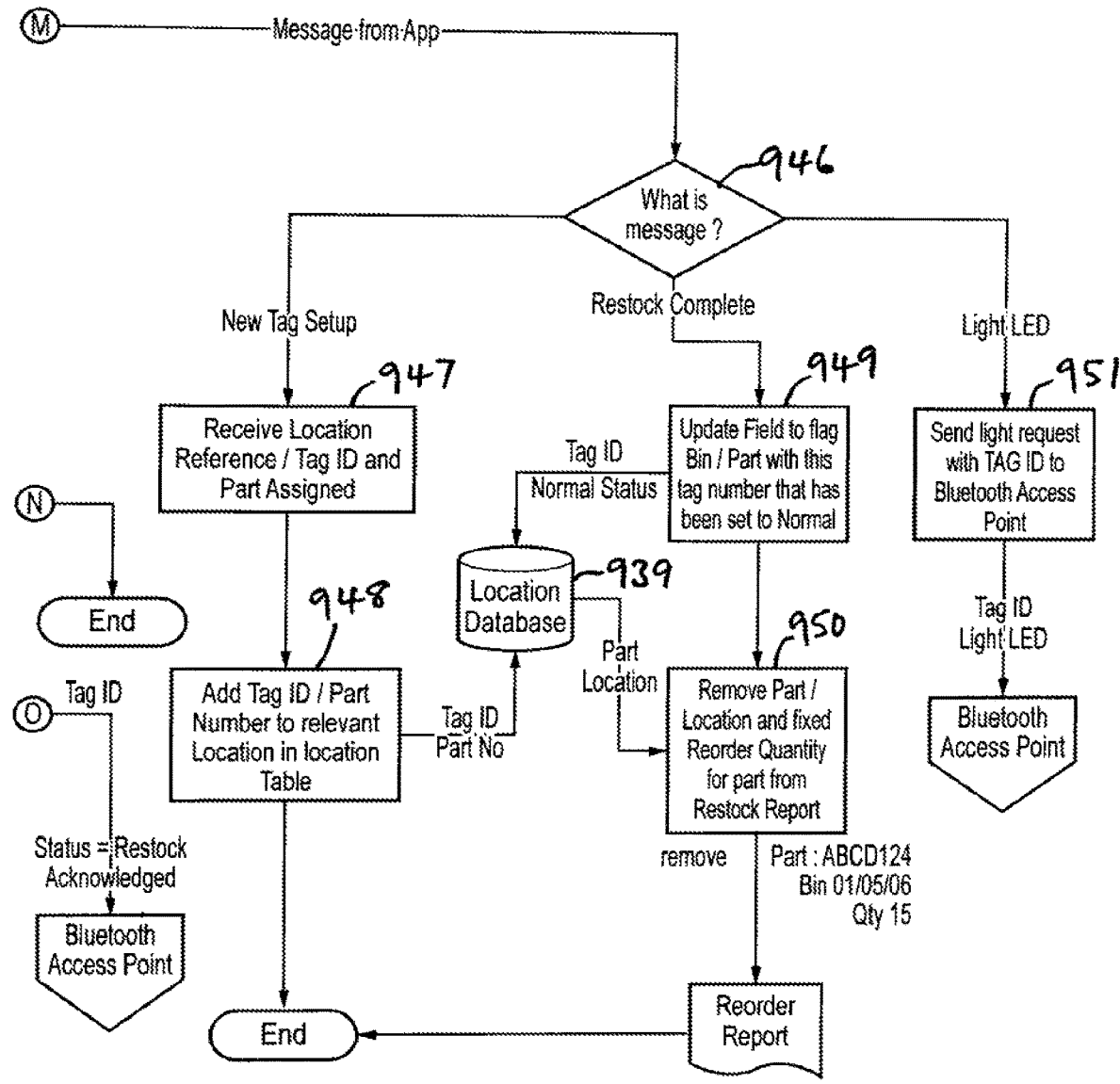
Figure 11D:
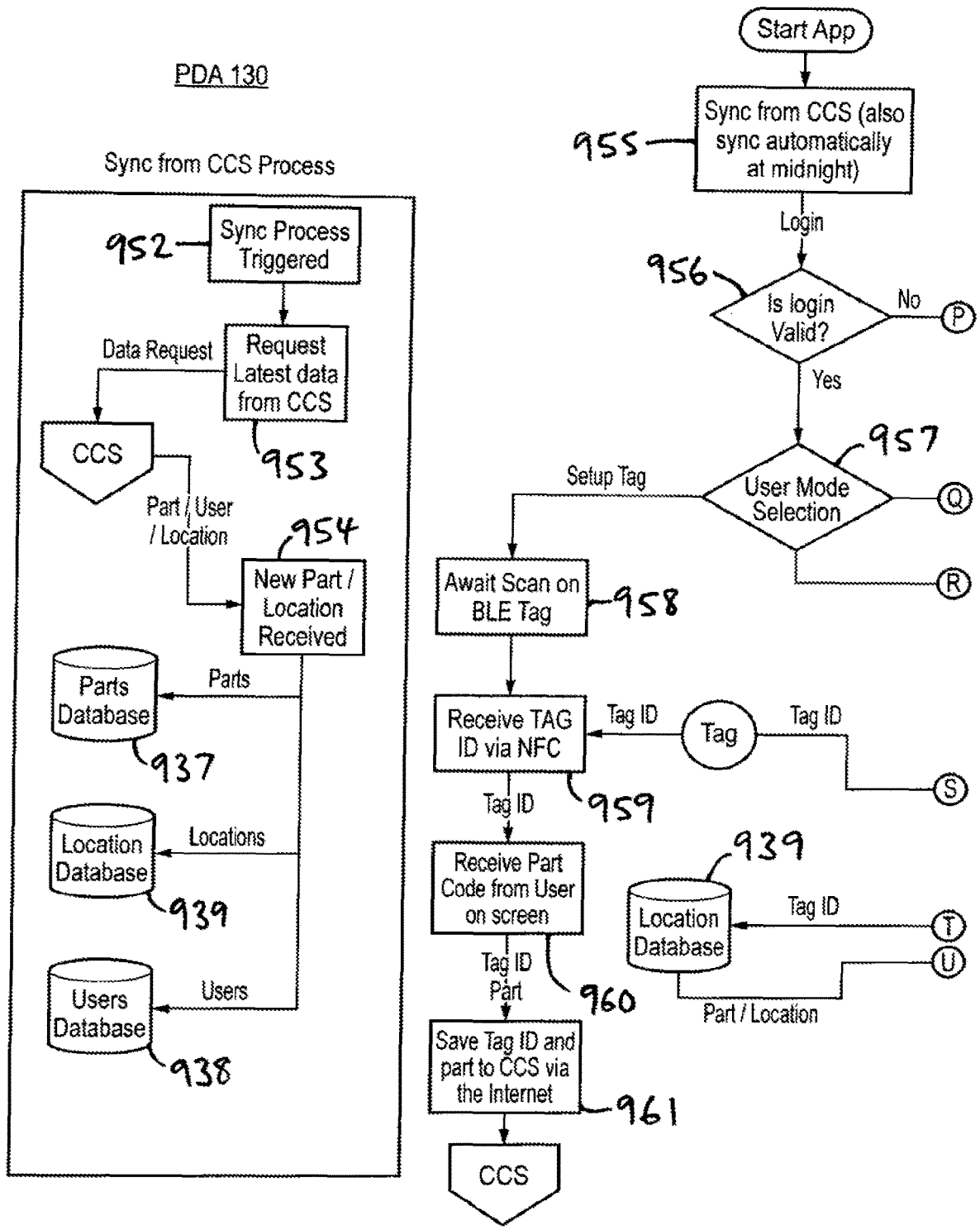
Figure 11D:
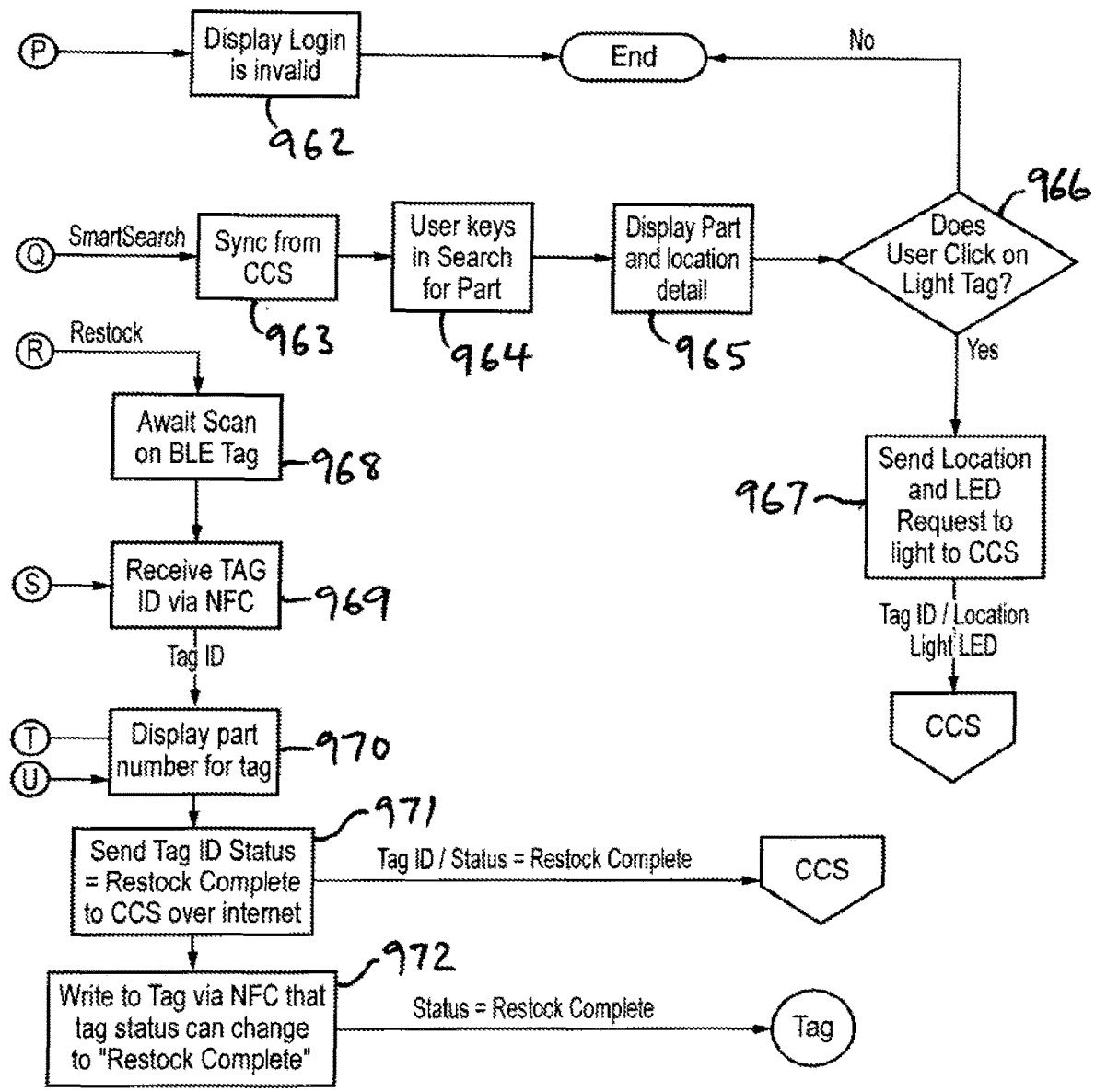

Referring to FIG. 11(a), this shows the processing at (composite) tag 602 according to an embodiment of the invention, in particular for use in the dual bin arrangement of FIG. 10 or the dual bin arrangement of FIGS. 16 to 21. The processing in FIGS. 11(a) to 11(d) is identical to the processing described hereinabove in relation to FIGS. 9(a) to 9(d), except as described otherwise hereinafter, and like numerals are used to denote like elements. The description will not be repeated in full, for brevity.

In the process of FIG. 11(a), at block 902, in determining whether communications input has been received, there is additionally implemented a check on the reed switch (e.g. of the dual bin arrangement 1102' of FIG. 10 or 1102" of FIGS. 16 to 21). In particular, the switch of the dual bin arrangement is polled at block 1101 to determine whether the contact of the reed switch is in a closed position with the magnet still present (proximal). In response to this status request, the switch responds with the status of the reed switch. Then, at block 1102, a determination is made as to whether the reed switch is in contact with the magnet (i.e. reed switch in closed condition). If not in contact, the process ends. If, on the other hand, contact is still present, processing proceeds to block 915 (FIG. 11(a) (Continued)), i.e. per the description above in relation to FIGS. 9(a) to 9(d).

Figures 12A, 12B:
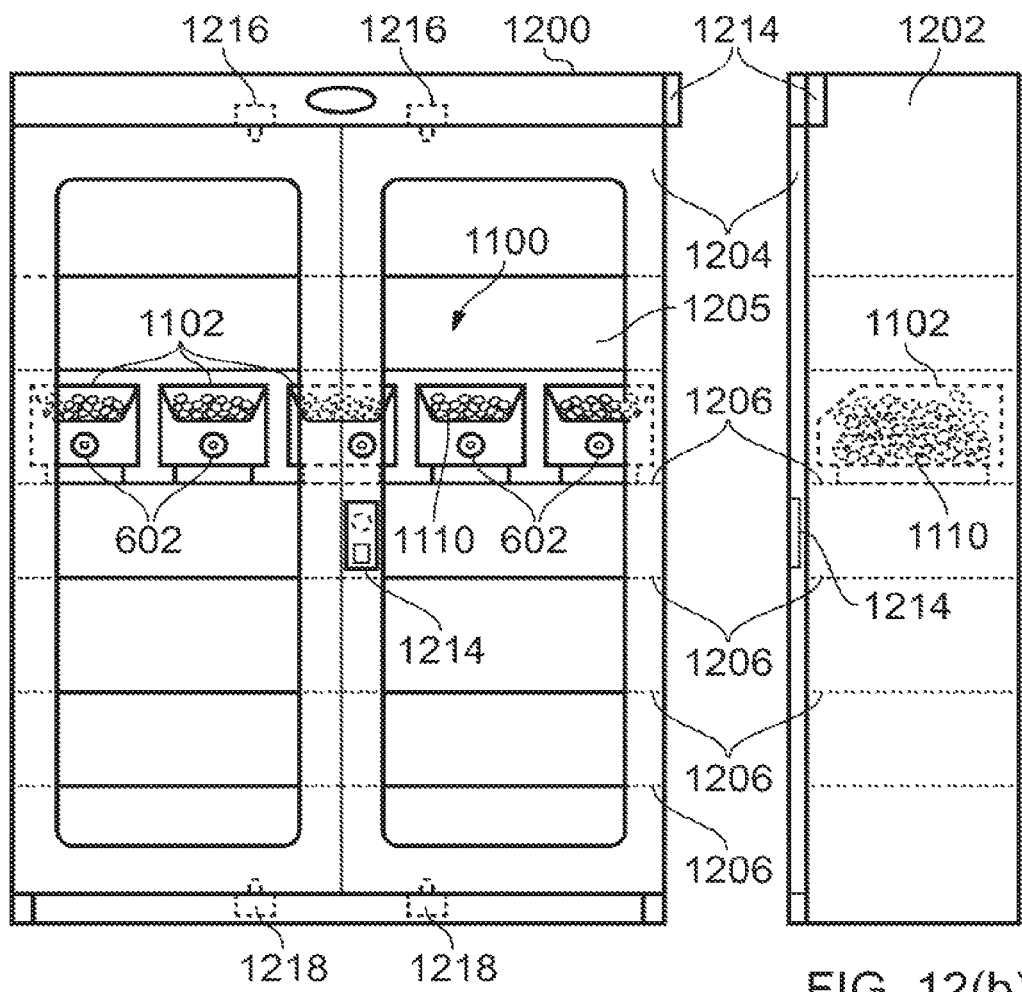
FIGS. 12(a) and 12(b) show in front view and side view, respectively, a secure asset supply cabinet 1200 according to one embodiment of the invention.
Figure 12C:
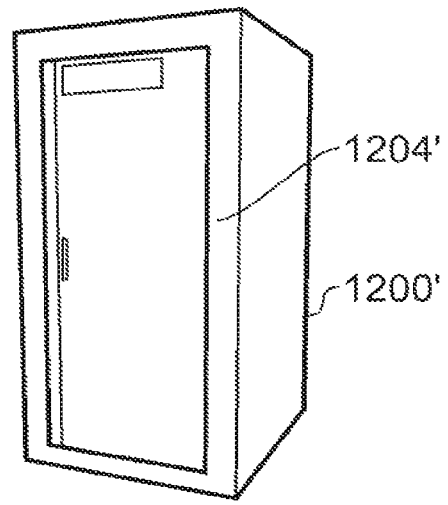
FIG. 12(c) shows a secure asset supply cabinet 1200' according to another embodiment of the invention.
Figure 12D:
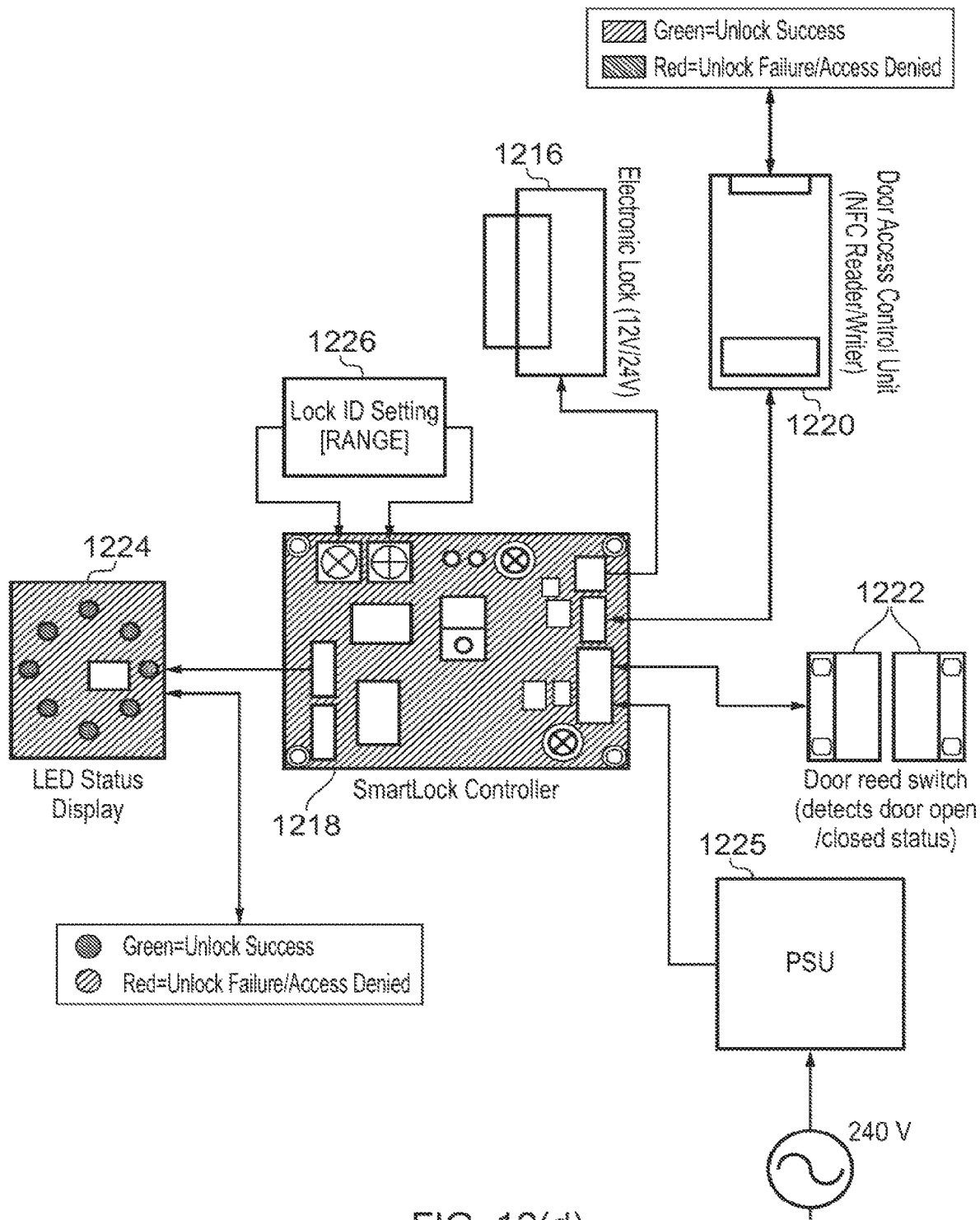
FIG. 12(d) is a schematic diagram of a programmable lock used in the cabinet of FIG. 12(a) or 12(c)

FIGS. 12(a) and 12(b) show in front view and side view, respectively, a secure asset supply cabinet 1200 according to one embodiment of the invention. FIG. 12(c) shows a secure asset supply cabinet 1200' according to another embodiment of the invention, and FIG. 12(d) is a schematic diagram of a programmable lock used in the cabinet of FIG. 12(a) or 12(c).

Referring to FIGS. 12(a) and 12(b), cabinet 1200 comprises a main body 1202 and a pair of doors 1204 having transparent (e.g. glass, Perspex) panels 1205. Here, two doors are illustrated, but one, three or more may be used. The doors 1204 and main body 1202 are suitably made of steel, but any other suitably strong and rigid material may be used.

A plurality of shelves 1206 are provided within the cabinet 1200, on each of which are mounted a plurality of storage bins 1102 (here, for simplicity, only one shelf 1206 is shown supporting bins). Each bin 1102 stores stock items 1110. Stock may be, for example, automotive components, electrical components or fasteners. In general, every item contained in each particular bin 1102 will be identical.

Optionally, provided at the top right corner of the cabinet 1200 is a swipe card reader 1214 which is able to read swipe cards belonging to users (e.g. factory employees) and, depending on the ID extracted from the swipe card, cause the doors to be released for opening by the user, or not. Although, in this embodiment, a swipe card reader is used, it will be appreciated that other means of obtaining the user ID may be used, including, for example, IR or short range radio based portable devices, barcode readers, RFID systems, biometric (e.g. fingerprint, retina scan) devices, and so forth. Dallas keys may also be used.

More particularly, in a preferred embodiment, a wirelessly activated programmable lock 1216 is built into or mounted onto cabinet 1200, e.g. on a side thereof or on a door 1205, as shown in FIG. 12(a). In another embodiment (FIG. 12(c)), the cabinet 1200' comprises a secure, all-metal cabinet having door 1205', as well as programmable locks (not shown).

In either embodiment, the secure asset supply cabinet 1200/1200' contains an asset supply arrangement 1100, the asset supply arrangement comprising one or more bins 1102 for holding assets 1110. One or more, or each, bin has on a visible surface thereof an asset tag 602 as described hereinabove. The ID of the asset tag 602 may be associated in a database of a central control computer (110; FIG. 1) with the assets 1110 in a respective bin 1102. As mentioned, the asset supply cabinet 1200 comprises one or more programmable locks 1214 coupled, wirelessly (e.g. NFC) or by wired connection, to one or more physical locks 1216.

Referring to FIG. 12(d), each programmable lock 1214 comprises processing circuitry 1218 which has coupled thereto a short range (e.g. NFC) wireless interface 1220 and at least one physical lock 1216 actuatable by the processing circuitry 1218. Status of the doors (open/closed) is sensed by door sensors (e.g. reed switches) 1222. The status of the programmable lock 1214 is indicated via status display 1224. The components of the programmable lock 1214 are powered via power supply unit 1225.

The processing circuitry 1218 may be configured for (i) receiving an unlock code from a portable wireless device (e.g. PDA) 130 of a user via the short range wireless interface 1220, the unlock code being based at least in part on credentials entered by the user on the portable wireless device 130, (ii) determining, based on one or more authentication and/or lock codes on the programmable lock 1214 (e.g. provided on a lock setting element 1226), whether the unlock code is authenticated, and (iii) if the unlock code is authenticated, actuating the or each physical lock to unlock the asset supply cabinet.

Figure 13A:
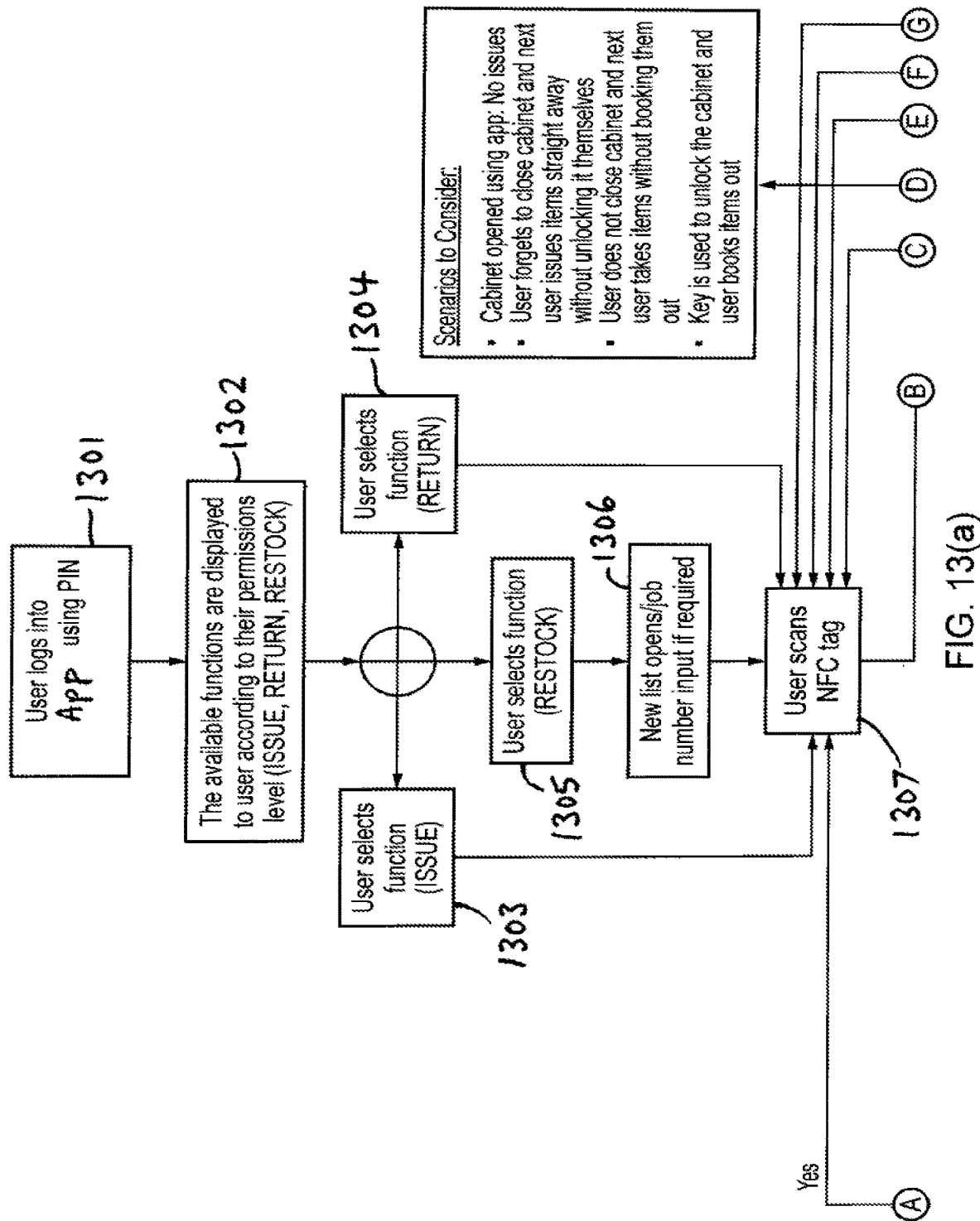
FIGS. 13(a)-13(c) are examples of flowcharts of the process for a user to obtain access to the secure asset supply cabinet 1200/1200', and for performing issue, return and/or restock functions using their PDA 130, according to an embodiment.
Figure 13B:
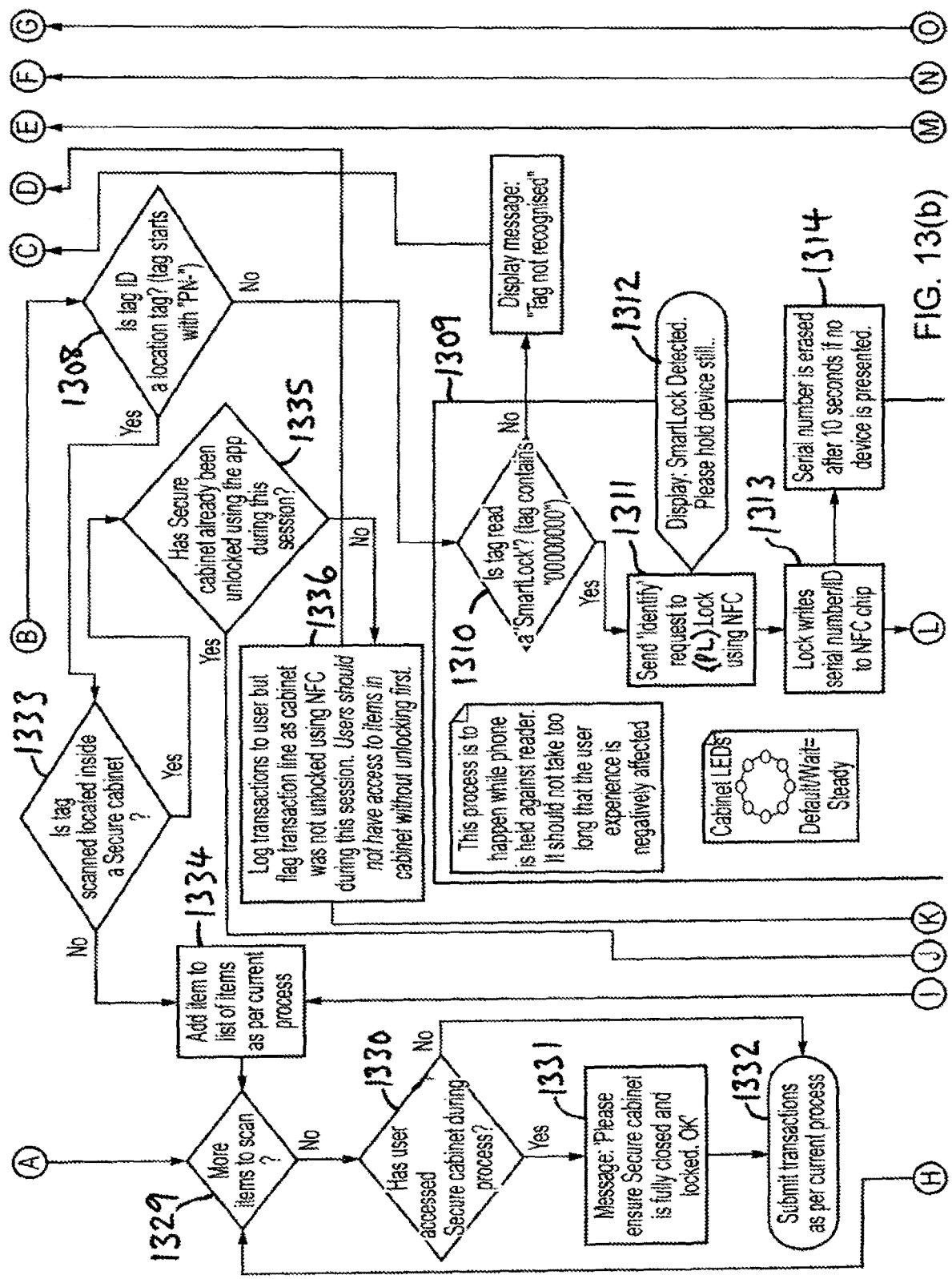
Figure 13C:
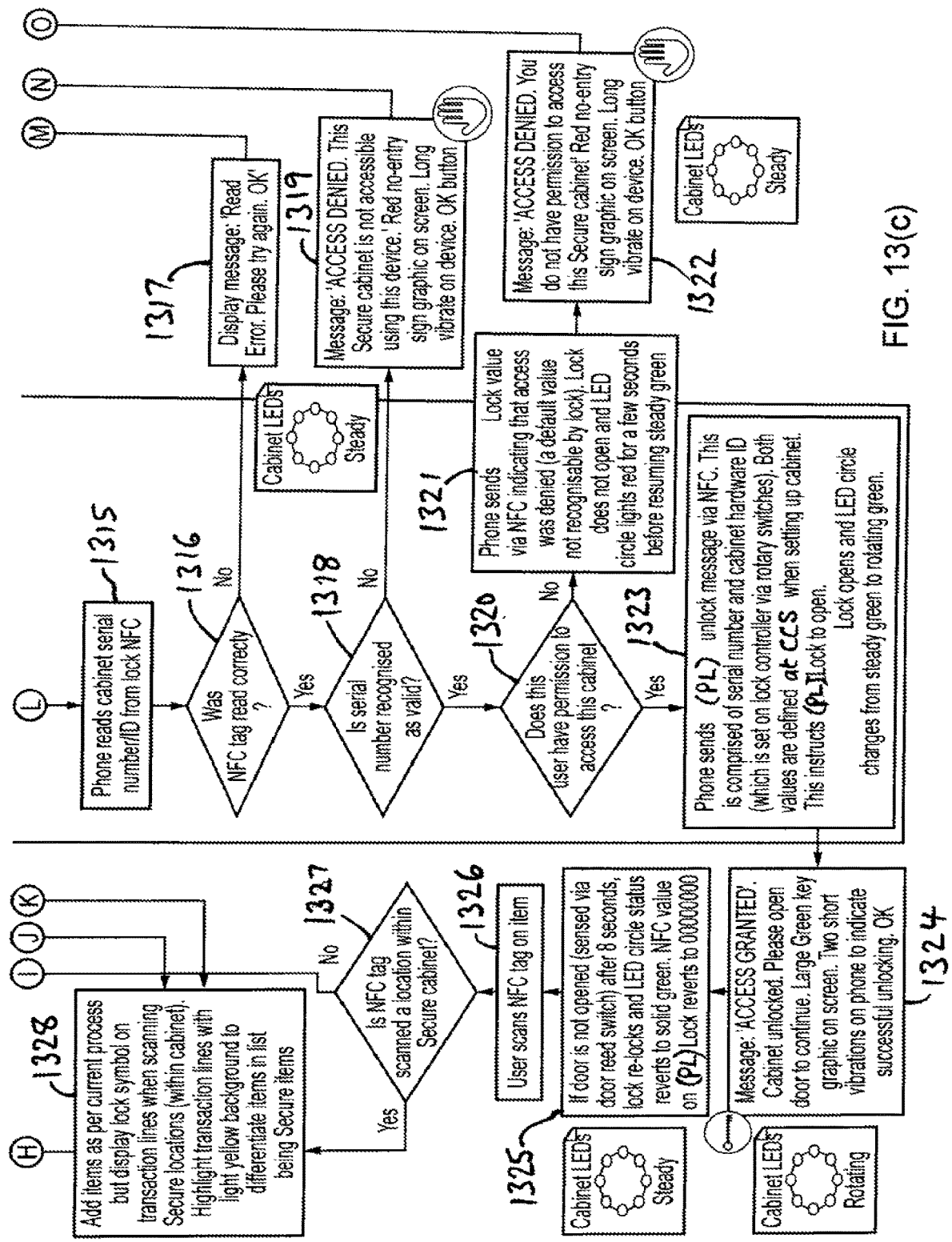

More particularly, FIG. 13 is a flowchart of the process for a user to obtain access to the secure asset supply cabinet 1200/1200', and for performing issue, return and/or restock functions using their PDA 130. However, it will be appreciated that, in particular embodiments, not all of the steps of FIG. 13 need to be performed, and/or they may be performed in a different sequence/order, where appropriate.

Referring to FIG. 13(*a*), the process begins with the user logging into the asset login and/or access software (App) on the PDA 130, for example using a PIN (block 1301). Next, the functions available to the user are displayed to the user on the PDA 130 according to the user's permissions level (block 1302). The available functions include ISSUE, RETURN and RESTOCK. Thus, the user may select ISSUE at block 1303, RETURN at block 1304 or RESTOCK at block 1305. In the latter case, a new list is opened in the graphical user interface of the PDA 130 and/or a job number is input by the user if required (block 1306). The PDA then awaits scanning of a tag via its short-range wireless interface, e.g. NFC interface. At block 1307, a tag is scanned by the user using the short-range wireless interface. Next, a determination is made (block 1308) as to whether a Tag ID obtained through the scanning at the previous step is a location tag. Such location tags may start with a predetermined character code sequence, in this embodiment "PN'".

If it is determined at block 1308 that the Tag ID is not a location tag, then processing proceeds to a tag analysis and/or access determination sub-process generally designated 1309. In the latter process, initially a determination is made (block 1310) as to whether the tag scanned (read) is a programmable lock-type tag, also referred to herein as a "SmartLock". As an example, the tag ID may contain "00000000", designating a SmartLock. Next, at block 1311, an "Identify" request is sent by the PDA 130 to the programmable lock (PL) via the PDA's short-range interface. At the same time, the PDA displays a message "SmartLock detected. Please hold the device still.", as indicated at block 1312. Next, at block 1313, the programmable lock writes the serial number/ID to the chip or memory device of its short-range wireless communication interface (block 1313). After this is done, the serial number/ID is erased after a predetermined period (e.g. 10 seconds) if no device (tag) is presented to the SmartLock (block 1314). Processing returns to block 1307.

If, however, at block 1316 it is determined that a tag was correctly read, a determination is made (block 1318) as to whether the serial number is recognised as a valid serial number. At the same time, the visual display elements are displayed with a steady illumination. If, at block 1318, the serial number is not recognised, a message is displayed at block 1319. The message may comprise, for example, "ACCESS DENIED. This Secure Cabinet is not accessible using this device". In addition, a No-Entry graphical sign may be displayed in red on the screen of the PDA. This may be accompanied by a long vibration on the PDA as well as the display of an OK button.

Returning to block 1318, if it is determined that the serial number is recognised as valid, a determination is then made (block 1320) as to whether this user (of the PDA 130) has permission to access this cabinet. If it is determined that the user does not have permission, the PDA sends a (PL) lock value via its short-range wireless interface, the lock value indicating that access was denied. The lock value may be a default value not recognisable by the lock. On the programmable lock, this does not open and its visual indicator elements (e.g. LEDs) may illuminate for a predetermined period (e.g. 1 to 5 seconds) in red, before resuming a steady green illumination (block 1321).

If, however, it is determined at block 1320 that the user does have permission to access the cabinet, then at block 1323 the PDA 130 sends a (PL) unlock message via its short-range wireless interface. The unlock message may include the serial number and/or cabinet hardware ID, the latter being for example manually set on the lock controller of the PL via switches. The unlock message instructs the programmable lock to open. The PL opens and a different visual indication is given by the PL, for example its visual display elements display a moving or rotating illumination in a predetermined colour, for example green, as opposed to a steady illumination.

At this point, a message is displayed to the user at block 1324. For example, the message may include "ACCESS GRANTED. Cabinet unlocked. Please open door to continue". In addition, a large graphic may be displayed on the screen of the PDA 130, for example in green. In addition, multiple short vibrations may be implemented by the PDA, for example two short vibrations. The latter indicate successful unlocking.

If the door is not opened within a predetermined period, for example 4-6 seconds, more particularly approximately 8 seconds, the programmable lock relocks and the visual display elements of the PL revert to a different illumination. For example, the visual display elements may revert to illumination in a solid (steady) green colour.

Next, the user scans with the PDA 130 a tag on an item within the cabinet, for example using the PDA's short-range wireless interface (block 1326). A determination is then made (block 1327) as to whether the tag scanned corresponds to a location within the secure cabinet. If the determination is negative, processing moves to block 1334, where items are added to a list of items/assets removed by the user.

If, however, at block 1327, it is determined that the scanned tag does correspond to a location within the secure cabinet, then items are added to the list for the user of items removed, but in this instance with an additional visual indication in the display of the PDA 130. For example, a lock symbol may be displayed on the transaction line for each item that has had its tag scanned indicating that it has been scanned from a secure location (within the cabinet). In one embodiment, such transaction lines are highlighted with a different colour background, for example yellow, to differentiate items in the list as being secure items (block 1328). Thereafter, processing moves to block 1329.

At block 1329, a determination is made as to whether there are more items to scan by the user.

Referring to FIG. 13(*b*), if it is determined at block 1308 that the Tag ID corresponds to a location tag, then a determination is made at block 1333 as to whether the tag that was scanned is located inside a secure cabinet. If it is not located inside a secure cabinet, processing proceeds to block 1334 at which the item (asset) is added to a list of items removed from the secure cabinet.

If, at block 1333, it is determined that the tag that was scanned is located outside the secure cabinet, then a determination is made (block 1335) as to whether the secure cabinet has already been unlocked using the PDA 130 (App) during this session. If it has not already been unlocked, then at block 1336 transactions are locked to the user with respective transaction lines flagged so as to indicate that for that transaction or transactions the cabinet was not unlocked using the short-range wireless interface of the PDA 130 during that session. Thereafter, processing returns to block 1328.

Figure 14:
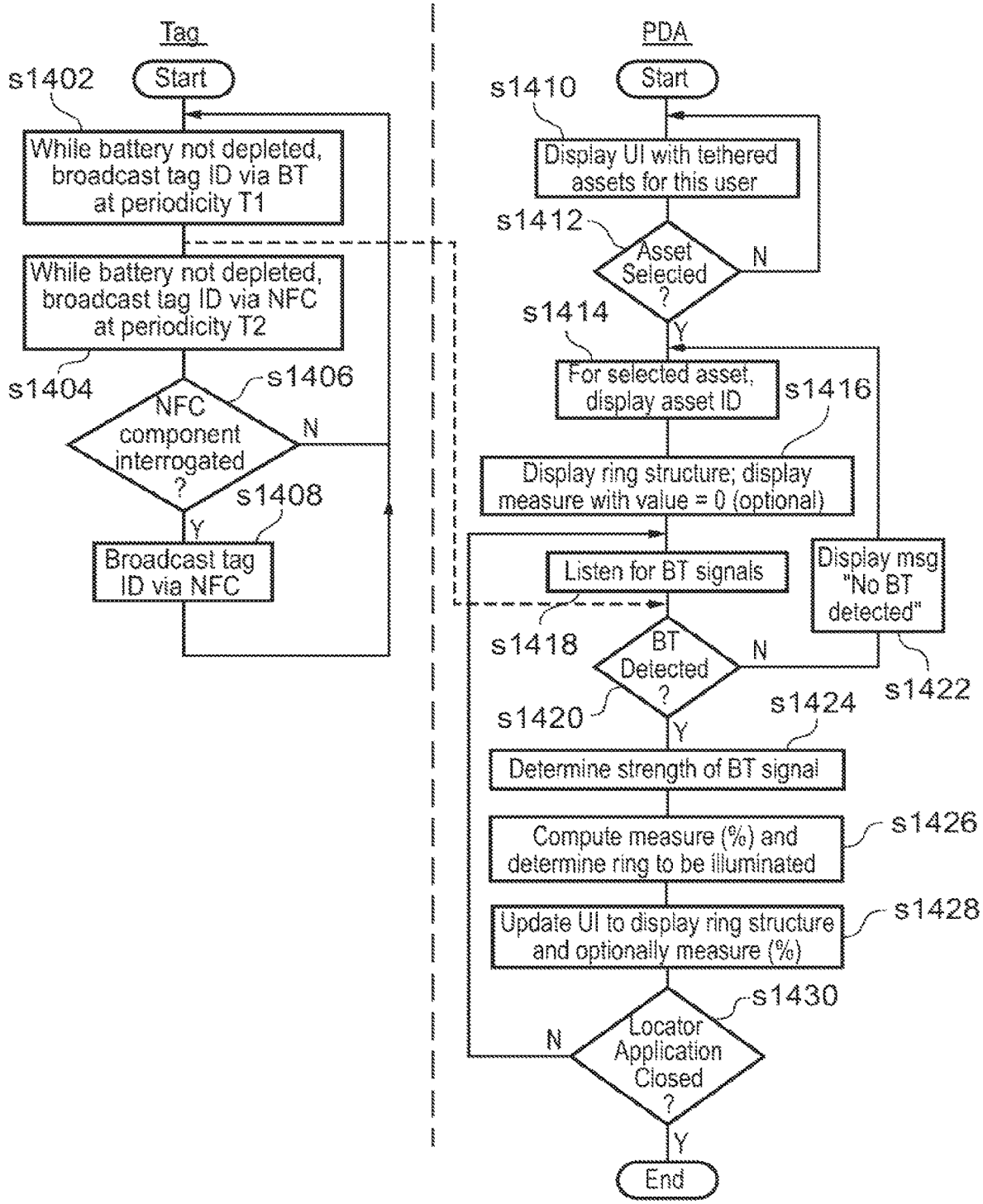
FIG. 14 illustrates the process for providing graphical indications to the user of a wireless portable device for locating an asset, according to one embodiment.

FIG. 14 illustrates the process for providing graphical indications to the user of a wireless portable device for locating an asset. At the composite tag on the asset (not shown), the tag ID (BTID; FIG. 10) is broadcast via the wireless Bluetooth (BT) interface with a periodicity T1, while the battery powering the Bluetooth component 140 is not depleted (step s1402). The NFC wireless interface of NFC component 902 may also broadcast the tag ID (NFC ID; FIG. 10) with a periodicity T2 under power of the battery of the tag 602 (step s1404). Otherwise, while the NFC is operable in passive mode, if it is determined (step s1406) that the NFC component 902 has been interrogated by an NFC reader (not shown), then the tag ID (NFC ID; FIG. 10) is broadcast (step s1408) by NFC component 902. Processing then returns to step s1402.

The processing at the PDA 130 commences (step s1410) with the display in the user interface of the tethered assets for the user of this PDA 130. (FIG. 15 shows examples of user interface views during the process of FIG. 14.) A check is made as to whether a user input has been received selecting an asset (step s1412). If not, processing returns to step s1410. Also displayed (step s1416) is a graphical element in the form of a ring structure 1502, as shown in FIG. 15(*a*) to 15(*f*), which depict examples of user interface views during the process of FIG. 14. (Optionally, a measure or meter 1510 is displayed within the user interface of PDA 130.)

As seen in FIG. 15(*a*), the ring structure 1502 comprises concentric rings (1504 to 1512) and a central disc 1514. Thus, in this embodiment, five rings are used, however, it will be appreciated that any suitable number may be employed, e.g. 2 to 8 rings, 3 to 7 rings, 4 to 6 rings, or more preferably 5 rings. In this embodiment, the ring structure 1502 comprises a first ring 1504 (i.e., outer ring), a second ring 1506 (i.e., second outer ring), and a third ring 1508 (i.e., middle ring). The ring structure further 1502 comprises a fourth ring 1510 (i.e., second inner ring) and a fifth ring 1514 (i.e., inner ring).

Returning to FIG. 14, at step s1416, it is assumed that the measure (value), i.e. signal strength as a percentage of a maximum, is 0, and the ring structure 1502 as depicted in FIG. 15(*a*) is displayed.

At any given instant, the ring structure as depicted in one of FIGS. 15(*a*) to 15(*f*) is displayed. (Optionally, the measure is simultaneously displayed adjacent the ring structure 1502.)

Next (step s1418), the PDA 130 listens for Bluetooth signals. A check is made (step s1420) as to whether Bluetooth signals are detected by PDA 130. If not, a message such as "no Bluetooth detected" is displayed (s1422) and processing returns to step s1414.

If, on the other hand, Bluetooth signals have been detected, the strength of the Bluetooth signal is determined at step s1424. A measure is then (optionally) computed, e.g. as a percentage, based on the determined strength of the Bluetooth signal (step s1426).

More particularly, step s1426 comprises computing the (current) measure (value) and determining which of the rings 1504 to 1512 is to be illuminated. This may comprise determining, in respect of each of a plurality of successively higher thresholds, each threshold corresponding to one of a plurality of concentric rings in the ring structure 1502, whether the measure lies between that threshold and an immediately lower threshold. There may be 2 to 8 thresholds, 3 to 7 thresholds, 4 to 6 thresholds, or more preferably 5 thresholds. Each of the plurality of concentric rings in the ring structure 1902 may be illuminated in a respective, different colour.

In the present embodiment, the procedure for this step s1426 may be described as follows.

If (measure unavailable OR measure=0) then display ring structure 1502 of FIG. 15(*a*) with no rings illuminated and only central disc 1516 illuminated Else if (0≤measure≤t1) then display ring structure 1502 of FIG. 19(*b*) with only the first ring 1504 illuminated in a first colour and central disc 1516 illuminated Else if (t1≤measure≤t2) then display ring structure 1502 of FIG. 15(*c*) with only the second ring 1506 illuminated in a second colour and central disc 1516 illuminated Else if (t2≤measure≤t3) then display ring structure 1502 of FIG. 15(*c*) with only the third ring 1508 illuminated in a third colour and central disc 1516 illuminated Else if (t3≤measure≤t4) then display ring structure 1502 of FIG. 15(*c*) with only the fourth ring 1510 illuminated in a fourth colour and central disc 1516 illuminated Else if (t4≤measure≤t5) then display ring structure 1502 of FIG. 15(*c*) with only the fifth ring 1512 illuminated in a fifth colour and central disc 1516 illuminated.

In this embodiment, the thresholds t1, t2, t3, t4, t5 are, respectively 10, 40, 60, 80 and 100. In this embodiment, the plurality of concentric rings (1504-1512) in the ring structure 1502 are illuminated respectively, in the colours blue, purple, pink, orange and red.

Next, the user interface (FIG. 15) is updated to (optionally) display the computed measure as a percentage together with ring structure 1502. Then, until it is detected (step s1430) that the locator application has been closed by the user, steps s1418 to s1428 are repeated as the user changes his orientation in order to detect the location of the asset. This is illustrated in FIGS. 15*b*-15*e*.

According to aspects of the invention, there are provided the following.

An asset supply arrangement 1100 as described above is provided on a vehicle of a user (e.g. workman's van). Assets are booked out and returned by the user through the use of his PDA 130, with transactions performed as discussed above, via short-range (e.g. NFC) communication between the PDA 130 and the composite tag 602 on the front of a bin 1102 of the asset supply arrangement 1100. In addition, a composite tag 602 is provided on each asset 1110. A wireless access point (e.g. Bluetooth enabled tablet or reader tile) is also mounted on the van and polls the tags 602 on the assets 1110 at regular intervals, via wireless communication (e.g. Bluetooth). In the event that the user removes an asset 1110 without booking out the asset (by tapping his PDA on the composite tag 602) or otherwise, then a subsequent polling attempt by the access point 120 returns a negative result. A combination of "non-booked out" status plus the negative polling result, as determined by the access point, causes a message to be sent to a central control computer 110 indicating that the asset if booked out to the user.

The PDA 130 includes an app enabling the user to search for an asset 1110, e.g. including a GUI enabling selection of the asset 1110 and/or inputting of a search request identifying the asset 1110. The search request may be communicated wirelessly to the access point 120 and/or central control computer 110, including via a composite tag 602 with which the PDA 130 is in wireless communication. As a result, an illumination message is sent to a specific tag 602 (i.e. of a bin 1102) in which the searched asset is stored. The illumination message may be routed in dependence upon a location identifier indicating the current location of the PDA 130 and may originate from the central control computer 110 and/or access point 120 and/or the PDA 130. Upon receipt of the illumination message, the specific tag 602 illuminates in a specific colour (e.g. blue) thereby assisting in guiding the user to the appropriate bin.

According to aspects of the invention, there are provided the following.

A tag 602 (Bluetooth IOT device with NFC and Bluetooth module) has a tactile button and RGB LED and a reed switch/magnetometer.

A tag 602 is applied to a bin/shelf (Adhesive/magnetic/fastened), the NFC component and mac address having the same number or being associated in the CCC 110 (cloud based software) database. The tag 602 is associated with a product type for that location, e.g. m8×10 mm stainless steel bolts (part Number M8x10SS). A predetermined restock quantity is defined in the CCC 110 for the nominated distributor replenishing that product to replenish when a user notices that the contents of the SKU (Bin/Shelf) is running low. Pressing the button twice activates the tag 602 to send a reorder message via Bluetooth to a reader (that can read Bluetooth messages) from significant distances (a minimum of 30 metres in open air). The reader has processing capability for reading messages including sensor messages, e.g. temperature, movement, pressure for condition monitoring of assets. In this application, the reader is a processing and communication device that processes the restock messages from tags 602 and sends them to the CCC 110 via 3G or a wireless network. On the user pressing the tag's button twice, the LED flashes orange (quickly) to indicate to the user that a reorder message is being sent. When the CCC 110 acknowledges the message, the LED flashes purple (slower rate). When the re-stocker delivers product into the SKU, simply scanning the tag 602 with the PDA's app and clicking restock resets the tag 602 and turns the LED green to signify a completed restock. If the re-stocker is not delivering the full predetermined quantity they also have the option to key in the quantity on the app they are delivering to that location.

The tag is green when pressed once to signify it has been restocked that day. After midnight on the day of restock, if pressed, it turns blue to indicate normal status. As the users deplete the inventory in the location and it looks low to a user, the tag's button can again be pressed twice to send a restock message and the process is repeated.

Additional aspects:

1. An automated replenishment solution using Bluetooth wireless technology, a fixed Bluetooth reader with 3G/wireless connectivity to the CCC 110, cloud based software.

2. Low cost retrofit solution.

3. Two-way communication with the tag to the CCC 110 via the fixed reader. Allowing procurement status to be displayed via LED lights/LCD display/e-ink.

4. Two-way communication also allows firmware updates from the CCC 110/apps over the air. It also allows an administrator with the right authority to disable/block reorders from a tag if the item becomes obsolete. If an item is changed for a new product, this can be done over the air or with the NFC of the app.

5. The NFC component allows the tag to be addressable with an app and a location and product assigned to the tag/SKU.

6. An app can also be used to issue and restock specific quantities of product to/by specific users, with job number allocation and batch control using NFC.

7. The app is used to restock using the NFC component and can communicate directly with the CCC 110. The restock process with the app automatically resets the tag so product can again be reordered by pressing the button twice.

8. Usage can be monitored by item.

9. KPI's on order fulfilment in the cloud by item—multi company multi-site, by distributor branch/restocker.

10. The solution can be on mobile trolleys due to its wireless and battery powered technology but still automates the replenishment process.

11. The trolley of bins or individual bins can be tracked with strategically placed fixed readers or the PDA's app.

12. On restock the re-stocker can select the item to be restocked on a restock list and it will light up the bin to ensure the correct product goes in the right bin and speed up the restock process.

13. If the status button is repeatedly pressed after a reorder, it will deactivate the status display to conserve battery in the composite tag for a predetermined period.

Dual Bin Asset Supply Arrangement

A tag 602 (Bluetooth IOT device with NFC and Bluetooth module) has a tactile button and RGB LED and a reed switch/magnetometer.

A tag is applied to a vertical bin (Adhesive/magnetic/fastened) with two chambers that open at the front. The top chamber is lockable and can only be accessed by the re-stocker. The two chambers of the bin are separated vertically with a horizontal slider. The NFC component and mac address will have the same number or be associated in the CCC 110 database. The tag is associated with a product type for that location e.g. m8×10 mm stainless steel bolts (Part Number M8x10SS). A predetermined restock quantity is defined in the CCC 110 for the nominated distributor replenishing that product to replenish. When a user notices that the contents of the lower chamber of the dual bin is running low, they pull the slider which empties the contents of the top part of the bin into the lower part of the bin. The act of pulling the slider breaks the contact between the magnet in the slider and the reed switch in the tag and automatically reorders the predetermined quantity for replenishment in the upper chamber of the dual bin. The tag sends a reorder message via Bluetooth to a reader (that can read Bluetooth messages) from significant distances (a minimum of 30 metres in open air and up to 100 metres—depending on the power output of the tag). The reader has processing capability for reading messages including sensor messages, e.g. temperature, movement, pressure for condition monitoring of assets. In this application, the reader is a processing and communication device that processes the restock messages from tags and sends them to the CCC 110 (cloud based software) via 3G or a wireless network. It also sends acknowledgment messages from the CCC 110 and firmware updates for the tags. If for some reason the reorder message is not sent and the tag does not go orange, the user can press the tag twice which will reorder the material. This is a contingency if something goes wrong with the reed switch or the polling of messages from the reed switch.

When the slider is pulled out, the LED flashes orange (quickly) to indicate to the user that a reorder message is being sent. When the CCC 110 acknowledges the message, the LED flashes purple (slower rate). When the re-stocker delivers product into the SKU, he simply restocks the top bin, scans the tag with the PDA's app and clicks restock which resets the tag and turns the LED green to signify a completed restock. If the re-stocker is not delivering the full predetermined quantity, they also have the option to key in the quantity they are delivering to the upper chamber of the dual bin. This ensures an accurate record of usage through the dual bin.

Procurement Status Indication:

The tag is green when pressed once to signify it has been restocked that day. After midnight on the day of restock, if pressed, it will turn blue to indicate normal status. As the users deplete the inventory in the location and it looks low to a user, the slider can again be pulled to empty the contents of the upper chamber into the lower chamber of the dual bin to restart the replenishment process.

Additional aspects:

1. An automated replenishment solution using Bluetooth wireless technology, a fixed Bluetooth reader with 3G/wireless connectivity to the CCC 110, cloud based software on a vertical bin with two chambers separated with a horizontal slider. The slider has a magnet and forms a made switch with the reed switch at the base of the tag. Only the re-stocker can open the top bin.

2. Automated replenishment trigger when the slider is pulled. The act of obtaining more inventory automatically breaks the switch and activates the tag to reorder the predetermined quantity in the top of the dual bin.

3. Two-way communication with the tag to the CCC 110 via the fixed reader. Allowing procurement status to be displayed via LED lights/LCD display/e-ink.

4. Two-way communication also allows firmware updates from the CCC 110/apps over the air. It also allows an administrator with the right authority to disable/block reorders from a tag if the item becomes obsolete. If an item is changed for a new product, this can be done over the air or with the NFC of the app.

5. The NFC component allows the tag on the dual bin to be addressable with an app and a location and product assigned to the tag/SKU.

6. An app can also be used to issue and restock specific quantities of product to/by specific users, with job number allocation and batch control using NFC.

7. If the predetermined quantity is not available for the upper chamber but a lower or different quantity is restocked, the app can be used to inform the CCC 110 of the precise quantity restocked in the upper chamber. This ensures accurate usage information is maintained against the item in the CCC 110 cloud based software.

8. The solution can be on mobile trolleys due to its wireless and battery powered technology but still automates the replenishment process.

9. Usage can be monitored by item.

10. KPI's on order fulfilment in the cloud by item—multi company multi-site, by distributor branch/restocker.

11. The trolley of bins or individual bins can be tracked with strategically placed fixed readers 120 or the PDA's 130 app using the Bluetooth network.

12. On restock the re-stocker can select the item to be restocked on a restock list and it will light up the bin to ensure the correct product goes in the right bin and speed up the restock process.

13. If the status button is repeatedly pressed after a reorder, it will deactivate the status display to conserve battery on the tag for a predetermined period.

14. The top chamber is lockable and can be accessed using the app with an NFC (Near Field communication) operated lock using the induced power of the battery on the phone to unlock.

While embodiments have been described by reference to embodiments of stock monitoring systems having various components in their respective implementations, it will be appreciated that other embodiments make use of other combinations and permutations of these and other components.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms "comprising", "comprised of" or "which comprises" is an open term that means including at least the elements/features that follow, but not excluding others. Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means including at least the elements/features that follow the term, but not excluding others. Thus, "including" is synonymous with and means "comprising".

Similarly, it is to be noticed that the term "coupled", when used in the claims, should not be interpreted as being limitative to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other. For example, in the context of airflow, where an outlet of A is coupled to an inlet of B it may be that one or more additional devices are provided between the outlet of A and the inlet of B.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A wireless portable device comprising a cellular transceiver, a display, an input device and first processing circuitry, coupled to the cellular transceiver, display, and input device, the wireless portable device being linked in real time through a cellular link using the cellular transceiver to a central control computer;
   wherein the first processing circuitry is configured for
   (i) receiving one or more user inputs via the input device, the one or more user inputs identifying an asset, a tag ID being associated in a database with the asset; and
   (ii) displaying an asset ID associated with the asset, in association with the location ID for the location at which the asset is stored and/or available; and
   (iii) in response to an input by the user indicating a desire to illuminate the tag corresponding to the asset, transmitting an illumination request with the tag ID to the central control computer via the cellular link.

2. An asset tracking system for use with the wireless portable device of claim 1, the asset tracking system comprising:
   a central control computer, the central control computer storing at least a copy of the database, the database storing, for each tag ID associated therewith, a location ID for a location at which an asset corresponding to the tag ID is stored and/or available; and
   a wireless access point coupled in a network to the central control computer;
   wherein the central control computer is configured to (i) receive the illumination request from the wireless portable device via the cellular link and (ii) in response the illumination request, transmit an illumination message with the tag ID to the wireless access point;
   wherein the wireless access point is configured to receive the illumination message with the tag ID from the central control computer and forward the illumination message.

3. The asset tracking system of claim 2, wherein the illumination message incorporating the tag ID includes the location ID.

4. The asset tracking system of claim 3, wherein the wireless access point is configured for forwarding, in response to receipt of the illumination message, the illumination message to a tag associated with a tag ID in the search message via a short-range wireless transceiver of the wireless access point, the illumination message being configured to command the tag associated with a tag ID to illuminate a visual indicator element thereof.

5. An asset supply arrangement, the asset supply arrangement comprising a plurality of bins for holding assets, wherein an asset tag is mounted to a respective asset or to a surface of each bin, the asset tag being configured for use with the asset tracking system according to claim 2, each asset tag comprising:
   a first component encoded with a first ID unique to the asset tag, the first component having a first wireless interface and being adapted to transmit first broadcast signals via said first wireless interface over a first range, the first broadcast signals including the first ID; and
   a visual indicator element, the visual indicator element being configured to be illuminated;
   wherein second processing circuitry of the asset tag is configured for (i) receiving the illumination message via the first wireless interface and (ii) in response, illuminating the visual indicator element in a predetermined colour to facilitate finding by the user.

6. The wireless portable device of claim 1, in the form of a personal digital assistant (PDA).

7. The wireless portable device of claim 1, wherein the PDA is in the form of a phone, tablet or other portable computing device.

8. The wireless portable device of claim 1, wherein the illumination request includes the location ID.

9. The wireless portable device of claim 1, wherein:
   the wireless portable device has stored thereon a copy of the database;
   the one or more user inputs received by the first processing circuitry include, prior to step (ii), a mode selection selecting a search function;
   the one or more user inputs identifying an asset include, after the mode selection and prior to step (ii), a search request in which a part ID is indicated, the part ID being associated with the asset; and
   the first processing circuitry is further configured to:
   in response to the mode selection selecting a search function, perform a sync process such that the database of the wireless portable device mirrors the corresponding database of the central control computer, in response to the search request, perform a search in the database on the wireless portable device for the part ID indicated in the search request.

10. The wireless portable device of claim 9, wherein, in the sync process, any new data representing part IDs and/or location IDs is received from the central control computer via the 3G, 4G or 5G link and is written to the database of the wireless portable device.

11. The wireless portable device of claim 1, wherein:
the input device comprises a touchscreen; and
the one or more user inputs are received via a graphical user interface on the touchscreen.

12. The wireless portable device of claim 11, wherein the user input indicating a desire to illuminate the tag comprises selecting an element of the graphical user interface.

* * * * *